United States Patent
Enomoto et al.

(10) Patent No.: US 9,088,547 B2
(45) Date of Patent: Jul. 21, 2015

(54) CONNECTION METHOD, COMMUNICATION SYSTEM, DEVICE, AND PROGRAM

(75) Inventors: Nobuyuki Enomoto, Tokyo (JP); Youichi Hidaka, Tokyo (JP); Hideo Yoshimi, Tokyo (JP); Atsushi Iwata, Tokyo (JP); Akira Arutaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1548 days.

(21) Appl. No.: 11/572,496

(22) PCT Filed: Jul. 26, 2005

(86) PCT No.: PCT/JP2005/013617
§ 371 (c)(1),
(2), (4) Date: Jan. 22, 2007

(87) PCT Pub. No.: WO2006/011464
PCT Pub. Date: Feb. 2, 2006

(65) Prior Publication Data
US 2008/0098472 A1 Apr. 24, 2008

(30) Foreign Application Priority Data

Jul. 28, 2004 (JP) .................................. 2004-220902
Jul. 21, 2005 (JP) .................................. 2005-211799

(51) Int. Cl.
*G06F 15/173* (2006.01)
*H04L 29/06* (2006.01)

(52) U.S. Cl.
CPC ........... *H04L 63/029* (2013.01); *H04L 63/0272* (2013.01)

(58) Field of Classification Search
USPC .................................................. 709/225, 229
See application file for complete search history.

(56) References Cited

U.S. PATENT DOCUMENTS 7,222,228 B1 * 5/2007 Stephens et al. .................. 713/1
2003/0035139 A1 * 2/2003 Tomita et al. ................ 358/1.15
(Continued)

FOREIGN PATENT DOCUMENTS

CN 1474564 A 2/2004
JP 10-126437 5/1998
(Continued)

OTHER PUBLICATIONS

"SSL-VPN appliance multi-application portable SAFEBORDER AP 100", http://ccsd.biglobe.ne.jp/security/lineup/SAFEBORDER (retrieved Jun. 8, 2004).
(Continued)

*Primary Examiner* — Scott B Christensen
(74) *Attorney, Agent, or Firm* — Arent Fox LLP

(57) ABSTRACT

A VPN connection method and a communication system are provided, each which can omit the setting of a firewall and the installation of a relay server and can establish communications from the outside of a firewall to the inside thereof. The internal network 2 is connected to the external network 1 via the firewall 13. The internal network 2 enables communications by an e-mail from the external network 1 (outside the firewall) to the mail server 21 in the internal network 2 (inside the firewall) or communications by telephone or radio, which is not via the firewall 3. The feature of the firewall 3 is utilized that access from the outside to the inside of the firewall through VPN connection is very difficult but the access in the reverse stream can be simply performed. Using the mail server, telephone line or radio line, the internal network 2 receives an e-mail, which requires for VPN connection from the external network 1, or control information through the telephone line. Thus, the internal network 2 sends callback for VPN connection to the e-mail transmission source. As a result, the callback allows the external network 1 to pass through the firewall 3.

15 Claims, 51 Drawing Sheets

(56) References Cited

U.S. PATENT DOCUMENTS

2003/0037177 A1* 2/2003 Sutton et al. .............. 709/316
2004/0187028 A1* 9/2004 Perkins et al. ............. 713/201

FOREIGN PATENT DOCUMENTS

| | | |
|---|---|---|
| JP | 2000-134207 A | 5/2000 |
| JP | 2002-055895 A | 2/2002 |
| JP | 2002-135858 | 5/2002 |
| JP | 2002-358274 | 12/2002 |
| JP | 2003-8661 | 1/2003 |
| JP | 2004-147195 | 5/2004 |
| JP | 2004-362116 | 12/2004 |
| JP | 2005-80003 | 3/2005 |

OTHER PUBLICATIONS

"SoftEther.com-SoftEther Web page, safe, simple, high-performance VPN SoftEther Virtual Ethernet System", http://www.softether.com/jp (retrieved Jun. 8, 2004).

Hirooka, Toshihiko et al.; "Audio Stream Encryption System for Secure IP Telephone"; vol. 27, No. 51, Sep. 25, 2007, pp. 31-36.

English translation of SIPO Search Report issued for Application No. 2005800222006, dated Oct. 12, 2013.

* cited by examiner

US 9,088,547 B2

CONNECTION METHOD, COMMUNICATION SYSTEM, DEVICE, AND PROGRAM

TECHNICAL FIELD

The present invention relates to a firewall passing technique. Particularly, the present invention relates to a communication method for establishing a VPN (virtual private network) to a specific internal network, such as the Intranet, in response to an access from an external network, a communication system therefor, and a device therefor, and a program therefor.

BACKGROUND OF THE RELATED ART

VPN connection is known (for example, refer to non-patent documents 1 and 2) that is utilized as a private dedicated network an open external network such as the Internet. That is, a firewall and a dedicated router or a bridge (a VPN gateway (VPN-GW) that link a connection between the outsides of companies and an intra-company connection) are disposed between an internal network (such as intranet) and an open external network (such as the Internet). The firewall manages data, protects the internal network from attack or illegal access from the outside, and links the Internet and intranet. Moreover, personal computers (take-out PCs), such as notebook computers, compatible with the internal network, can access from an external network to the internal network.

FIG. 37 is a diagram illustrating a network configuration in a prior art. This network configuration includes a firewall/VPN gateway (Firewall & VPN-GW) 30, which has an authentication device (an authentication module) disposed between the intranet 2 in "A" company (or "A" company's intranet) and the Internet 1, and a business server 23 on the "A" company intranet. A staff member of the "A" company can access the intranet 2, using a PC (personal computer) 102, in which a dedicated VPN software is installed via the Internet, taken out from his company.

An application (or a business client application) for realizing a linkage to the in-house business server 23 and the processing of predetermined affairs is installed to the (take-out) PC 102. An application (or a business server application), corresponding to the business client application in the PC 102, is installed into the in-house business server 23. (Both applications may be called a business application) The firewall & VPN-GW 30 is installed with an application (a relay application) having the function of linking the authentication module and the PC and the business server.

The procedure of the VPN connection in the prior art is as follows:

In the PC 102 taken out with a staff member of "A" company, a high-level administrator provides the member with a predetermined ID and a password to access the "A" company's intranet. At the same time, a default setting process (a), such as authentication setting regarding ID or password, is previously performed to the firewall & VPN-GW 30 to authorize access from the PC 102.

A staff member uses the PC 102 to access from his home or the outside of the "A" company's intranet to the intranet 2 using the ID and password. Thus, the PC 102 implements VPN connection to firewall & VPN-GW 30, for example, VPN connection (SSL connection) (b) where encryption between WWW browser and the WWW server and encryption based on the protocol (SSL (secure sockets layer)) regarding authentication function is performed.

When the authentication module performs the authentication process (c) to the access and determines that the password is correct, the firewall & VPN-GW 30 permits connection to the "A" company's Intranet 2, thus performing the address/frame conversion of packets through the VPN connection. Thus, the business application of PC 102 can bi-directionally communicate with the business application of the business server 23.

FIG. 38 is a diagram illustrating another network configuration in the prior art. The network configuration includes a firewall 30 disposed between an "A" company's intranet 2 and the Internet 1, a VPN gateway (VPN-GW) 210 connected to the firewall 30, and a business server 23 connected to the VPN-GW 210. Moreover, the Internet side includes a PC 102 including a VPN-GW, and a relay server (virtual HUB, SIP server and the like) 101 disposed for VPN connection of the Intranet 2.

The take-out PC 102 is installed with a business client application for connecting an office business server 23 and processing predetermined business, a relay application for relaying VPN connection to the business client application, and an application (setting application) for setting VPN connection with VPN-GW 210. The office business server 23 is installed with an application (business server application) corresponding to the business client application of the PC 102. The VPN-GW 210 is installed with a setting application for setting VPN connection to the PC 102 and a relay application for relaying VPN connection to the business server application for the business server 23. The vertical hub 101 is installed with an authentication module and a relay application.

The procedure of the VPN connection in the prior art is as follows:

The VPN connection (a) between the VPN-GW 210 and the relay server 101 is established previously. When the PC 102 provides access for VPN connection to the relay server 101, using the setting application and the relay application, the relay server 101 performs authentication (c) to the access. If the authentication is correct, the VPN connection from the VPN-GW 210 and the VPN connection (b) from the PC 102 are linked. Thus, the VPN connection between the PC 102 and the VPN-GW 210 is established. Using the two VPN connections, the relay application enables communications between the business application in PC 102 and the business application in the business server 23.

FIG. 39 is a diagram illustrating a further another network configuration in the prior art. The network configuration is similar to that in FIG. 38. The network configuration includes a firewall 30 disposed between the "A" company's Intranet 2 and the Internet 1 and a VPN gateway (VPN-GW) 220 and a business server 23, compatible with UPnP, which are connected to the firewall 30 on the Intranet. Moreover, the network configuration includes a relay server 103, such as a directory server, for VPN connection between the PC 102, including VPN-GW on the Internet side, and the VPN-GW 220 of the "A" company's Intranet 2.

The office business server 23 is installed with a business server application. The VPN-GW 220 is installed with a setting application for setting VPN connection, an UPnP application for receiving a universal plug and play (UPnP) advertisement to hardware connected thereto and capturing necessary setting information and performing the perforation setting to the firewall 30, and a relay application for relaying VPN connection to the business server application of the business server 23. The directory server 103 is installed with an authentication module. The PC 102 taken out of the company is installed with a setting application for setting VPN connection, a business client application corresponding to the business server 23, and a relay application for establishing the connection between business applications through VPN connection.

The procedure of VPN connection in the prior art is as follows:

The firewall 30 is previously set to perform UPnP advertisement where address information on the firewall itself and information on access operational procedure are transmitted to a UPnP compatible device such as VPN-GW 220 connected to the intranet, through an IP broadcast.

When being connected to the "A" company's intranet, the VPN-GW 220 receives (a) an UPnP advertisement from the firewall 30 and captures the setting address of the firewall 30 itself to set the firewall 30 based on the received information. Moreover, the VPN-GW 220 previously establishes connection (b) between the VPN-GW 220 and the relay server 103.

When the connection (c) is set up between the PC 102 and the relay server 103, using the VPN software, the relay server 103 authenticates the PC 102. When the authentication is correct, the relay server 103 links the connection from the VPN-GW 220 to the connection from the PC 102 (d).

Next, when the PC 102 requests VPN connection (a VPN connection request) (e) through a series of connections linked to the VPN-GW 220 via the relay server 103, the VPN-GW 220 performs the perforating setting (f) to the firewall 30 using the setting address obtained with the UPnP advertisement. Moreover, when the setting is completed, the VPN-GW 220 posts a completion of the perforating setting via the relayed connections to the PC 102. When the PC 102 receives the completion of the perforating setting (f), it performs the new VPN connection (g), through which the firewall 30 can pass through externally, based on the result of the perforating setting to the VPN-GW 220. Thus, the communication between business applications can be established via the VPN connection (g).

[Non-Patent Document 1]
"SSL-VPN appliance multi-application portable SAFEBORDER AP 100", retrieved on Jun. 8, 2004" and Internet <URL:http//ccsd.biglobe.ne.jp/security/lineup/SAFE-BORDER/#top>

[Non-Patent Document 2]
"SoftEther.com-SoftEther Web page, safe, simple, high-performance VPN SoftEther Virtual Ethernet System", retrieved on Jun. 8, 2004, Internet <URL:http://www.soft-ether.com/jp/>

DISCLOSURE OF THE INVENTION

Problems to be Solved by the Invention

In the prior art shown in FIG. 37, the management of the firewall is under the strict control of a high-level administrator (or a firewall manager) in the intranet management department. Hence, even staff members of the "A" company cannot set the firewall, allowing access from the outside of the company, with no permission of the firewall administrator. In other words, the setting of the firewall requires a district, vexatious approval procedure to obtain the firewall administrator's approval. Moreover, the setting of firewall, requiring an advanced technique, makes the work difficult and time-consuming.

The prior art shown in FIG. 38 can simply built VPN connection (VPN establishment) with the outside of a company, without performing the setting of firewall requiring the strict approval procedure. However, this prior art requires installation of a relay server outside the company. The installation of the relay server requires acquisition of a global IP address and reservation of a spot for server installation.

Moreover, an official approval has to be obtained from predetermined facilities to obtain one global IP address and requires a more difficult, complicated procedure requiring an application procedure including confirmation of an applicant. Moreover, in order to utilize the relay server, some VPN application for PC often requires transmission and reception of large amount of data and the burden of data transfer by the relay server becomes very heavy. Moreover, there is the problem that utilizing the relay server of an existing dealer causes a large amount of expenses according to the data transfer amount.

In contrast, the prior art shown in FIG. 39 is a communication system recently in widespread use. This art can realize the original data transfer without the relay server due to VPN connection by the perforating setting of the firewall and can relieve the burden in data transfer of the relay server installed outside the company. However, there is the problem that the communication system has to be compatible with UPnP, such as an introduction of the procedure of UPnP advertisement to the firewall and that the relay server is required.

Object

The present invention aims at solving the above-mentioned problems. An object of the present invention is to provide a communication method capable of eliminating the setting of a firewall and the installation of a relay server and establishing communications with the inside of the firewall in response to a connection request from the outside of the firewall. Another object of the present invention is to provide a communication system, a device, and a communication program, each which realizes the above method.

Means to Solve the Problems

An aspect of the present invention relates to a connection method that establishes connection between an information processing terminal on an external network and a gateway device on an internal network connected to the external network via a firewall. The connection method comprises the step of issuing a connection request from the information processing terminal on the external network to the internal network by means of accessible means and the step of performing such that the gateway device calls back a connection request to the information processing terminal, which has issued the connection request via the firewall, in response to the connection request.

Another aspect of the present invention relates to a connection method for establishing connection (for example, VPN connection) between an information processing terminal on an external network and a gateway device (for example, 20 in FIG. 1) of an internal network connected to the external terminal via a firewall. The connection method comprises the step of transmitting a control mail issuing a connection request from the information processing terminal on the external network to a mail server of the internal network and the step of performing such that the gateway device of the internal network calls back a connection request to the transmission source of the control mail via the firewall in response to the control mail.

Moreover, the connection method comprises the step of performing such that a gateway device regularly inquires about reception of a control mail from the mail server, the step of acquiring and authenticating a received control mail, and the step of performing connection to the information processing terminal based on the control mail when authentication is correct.

Moreover, the connection method comprises the step of transmitting control information requiring connection (for example, VPN connection) from the information processing terminal on the external network to the gateway device (for example, 20 in FIG. 1) on the internal network via a telephone line and the step of performing such that the gateway device of the internal network calls back connection (for example, VPN connection) to the transmission source of the control information via the firewall in response to transmission of control information. The connection method further comprises the step of transmitting control information requesting connection from the information processing terminal on the external network to the gateway device on the internal network via the radio line and the step of performing such that the gateway device on the internal network calls back connection to the transmission source of the control information via the firewall in response to transmission of the control information.

The connection method comprises the step of performing such that the gateway device on the internal network authenticates the control information and the step of performing connection to the information processing terminal based on the control information when authentication is correct.

In the connection method, a plurality of gateway devices are on the internal network or a gateway device is provided every person whose access to the internal network is permitted or one gateway device is provided for plural persons whose access to the internal network is permitted.

A plurality of firewalls are disposed the internal network.

The control mail posts an IP address acquired by UPnP and the information processing terminal performs service registration to the firewall.

The control mail posts VLAN information of a desired connection source and the gateway device inserts or deletes a tag of VLAN described on the control mail.

In another aspect of the present invention, a communication system establishes connection between an information processing terminal on an external terminal and a gateway device on an internal network connected to the external network via a firewall. Accessible means issues a connection request from the information processing terminal on the external network to the internal network. The gateway device calls back a connection request to the information processing terminal, which has issued the connection request, via the firewall in response to the connection request. Thus, connection between the information processing terminal and the gateway device is established.

Moreover, in another aspect of the present invention, a communication system establishes communication between an information processing terminal on an external network and a gateway device of an internal network connected to an external network via a firewall. The information processing terminal transmits a control mail requiring connection to a mail server on the internal network. The gateway device acquires a control mail from the mail server and calls back connection to the information processing terminal via the firewall based on the control mail. Thus, the connection between the information processing terminal and the gateway device is established.

Moreover, in the communication system, a plurality of gateway devices are disposed on the internal network. The gateway device is provided for each person whose access to the internal network is allowed. One gateway device is provided for plural persons to the internal network whose access is allowed.

In the communication system, plural firewalls are on the internal network.

In the communication system, the control mail posts an IP address acquired by UPnP and the information processing terminal performs service registration to the firewall.

In the communication system, the control mail posts VLAN information of a desired connection destination and the gateway device inserts or deletes a tag of VLAN described in the control mail.

According to the present invention, the gateway device and the information processing terminal have the following means (functions), respectively.

That is, the gateway device has the function of receiving access requiring connection from an information processing terminal on an external network and the function of calling back a connection request to the information processing terminal, which has issued a connection request via the firewall, in response to the access, and performing connection with the information processing terminal. As to the access means, the gateway device regularly inquires of the mail server about reception of an e-mail addressed to self. The gateway device acts as the mail server. The gateway device decides whether or not the e-mail is a control mail, every time the mail server receives an e-mail, and captures an e-mail to self, decides whether or not the e-mail is a control mail, and authenticates the control mail. Whether or not the e-mail is a control mail depends on whether or not the main body or header of the mail includes a predetermined arbitrary letter string.

Moreover, the information processing terminal requires connection with means accessible from a terminal on the external network to the internal network and makes the gateway device call back connection via the firewall in response to the connection request, thus establishing connection between the information processing terminal and the gateway device. The information processing terminal transmits control information requiring connection to the gateway device via a telephone line. The gateway device calls back connection to the information processing terminal via the firewall based on the control information. Thus, the connection between the information processing terminal and the gateway device is established. The information processing terminal transmits control information requiring connection to the gateway device via a radio line. The gateway device calls back connection to the information processing terminal via the firewall based on the control information. Thus, the connection between the information processing terminal and the gateway device is established. The gateway device authenticates the telephone number of the information processing terminal or the control information, captured with a caller ID.

Another aspect of the present invention relates to a control program for a gateway device on an internal network connected to an external network via a firewall to establish connection between the external terminal and information processing terminal. The control program instructs a controller of the gateway device to realize the function of receiving access requiring connection from the information processing terminal and the function calling back the connection request to the information processing terminal, which has issued the connection request via the firewall, in response to the connection request.

The control program instructs the controller of the gateway device to realize the function of capturing from a mail server a control mail requiring connection transmitted from the information processing terminal and the function of calling back connection to the information processing terminal via the firewall based on the control mail.

The program instructs the mail server to realize the function of regularly inquiring reception of an e-mail to self and the function of capturing the e-mail to self and deciding whether or not the e-mail is a control mail, and the function of authenticating the control mail.

The program instructs the controller to realize, as the function acting as the mail server, the function of deciding whether or not the e-mail is a control mail every time the mail server receives an e-mail and the function of authenticating the control mail.

Another aspect of the present invention relates to a control program for a gateway on an internal network connected to an external network via a firewall to establish connection between the gateway device on the internal network and the information processing terminal on the external network. The control program instructs the controller of the gateway device to realize the function of receiving control information requiring connection transmitted from the information processing terminal via a telephone line and the function of calling back connection to the information processing terminal via the firewall based on the control information.

The program realizes the function of performing authentication based on a telephone number captured based on a caller ID from the information processing terminal.

Another aspect of the present invention relates to a control program for a gateway device on an internal network connected to an external network via a firewall to establish connection between the information processing terminal on the external network and the gateway device on the internal network. The control program instructs the controller of the gateway device to realize the function of receiving control information requiring connection transmitted from the information processing terminal via a radio line and the function of calling back connection to the information processing terminal via the firewall based on the control information.

The control program instructs the controller to realize the function of authenticating the control information and the function of performing connection to the information processing terminal when authentication is correct.

Another aspect of the present invention relates to a control program for an information processing terminal on an external network to establish connection between the external network and a gateway device on the internal network connected via a firewall. The control program instructs the controller in the information processing terminal to realize the function of requiring connection by means of means accessible to the internal network and the function of instructing the gateway device to call back a connection request to the information processing terminal, which has issued the connection request via the firewall in response to the connection request.

The program instructs the controller in the information processing terminal to realize the function of transmitting a connection request control mail to a mail server and the function of calling back connection to the gateway device via the firewall based on the control mail of the mail server.

Another aspect of the present invention relates to a control program for an information processing terminal on an external network to establish connection between the external network and a gateway device on the internal network connected via a firewall. The program instructs the controller in the information processing terminal to realize the function of transmitting control information requiring connection via a telephone line and the function of instructing the gateway device to call back connection via the firewall based on the control information.

Another aspect of the present invention relates to a control program for an information processing terminal on an external network to connect the external network and a gateway device on the internal network connected via a firewall. The program instructs the controller in the information processing terminal to realize the function of transmitting control information requiring connection via a radio line and the function of instructing the gateway device to call back connection via the firewall based on the control information.

The control mail notifies an IP address captured with UPnP and the information processing terminal performs a service registration to the firewall.

The control mail notifies VLAN information of a desired connection destination and the gateway device inserts or deletes a tag of VLAN described in the control mail.

(Function)

The firewall disposed at the junction with the external network on an internal network can gain access by an e-mail from the outside of the firewall (an external network) to a mail server in the firewall (an internal network). The firewall can also gain access by a telephone line or radio, which does not pass through the firewall. As to the firewall, access through connection from the outside of the firewall to the inside thereof is very difficult but access through connection in the reverse direction can be simply performed. In this configuration, using access means such as mail servers, telephone lines or radio lines, the internal network receives access by an e-mail for control or control information requiring connection from the external network and calls back connection to the transmission source of the e-mail. As a result, that configuration enables access passing through the firewall from the external network (or establishing VPN connection).

Effect of the Invention

The present invention does not require the setting operation for the firewall itself to establish connection from the firewall to the outside of the firewall. The information processing terminal (a take-out PC) and the gateway device are directly linked via the firewall. This feature eliminates the setting of the firewall and the installation of the relay server. This can solve the problems involved in approval of the firewall administrator, capture of global IP address, and expenses corresponding to the data transfer amount.

By transmitting a connection request into the firewall using an e-mail for control, connection from the firewall to the inside of the firewall can be realized as a result. Particularly, there is the significant advantage in that an extra communication charge is not charged because the use of an e-mail does not require the telephone line upon connection.

Because the control information on a connection request is transmitted to the inside of the firewall using a telephone line or radio line, on behalf of e-mails, the connection from the outside of the firewall to the inside thereof can be realized.

Moreover, according to the present invention, one gateway device may be installed for each staff member or for plural staff members (e.g. of 2 to 50 or 2 to 100) in the Intranet. Moreover, the gateway may be constructed such that access from the outside of the firewall is authenticated and the gateway device rewrites IDs for authentication and the setting of passwords for each staff member. Thus, the communication system with high convenience can be realized to secure security and to enable connection from the outside of a company with PCs comparatively simplified.

EXPLANATION OF SYMBOLS

Figure 1:
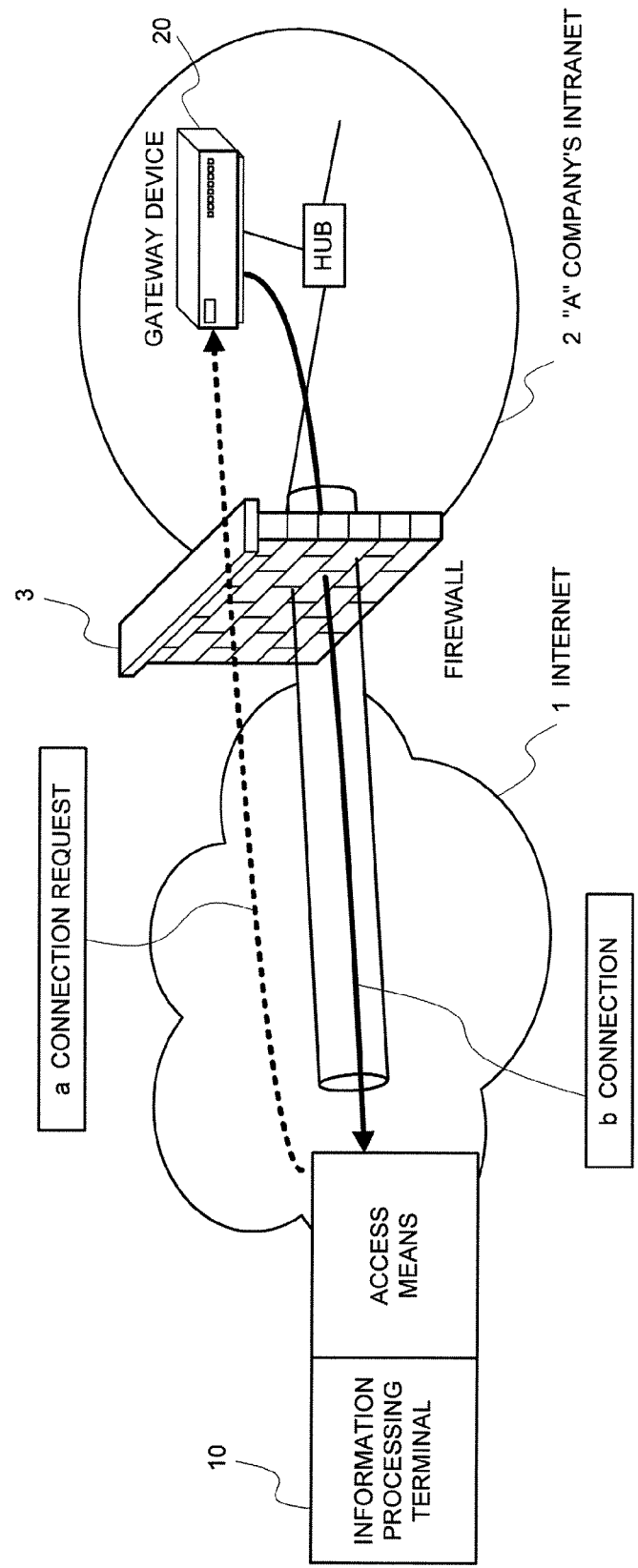
FIG. 1 is a diagram illustrating a network configuration, according to a first embodiment of the present invention.

1 Internet
2 Intranet
3 Firewall
4 Firewall
5 Department intranet
6 Firewall

7 Domestic LAN
10 Information processing terminal
11 External SMTP server
12 Take-out PC (a mode of information processing terminal)
13 External POP server
20 Gateway device
21 Office POP server
22 Gateway device (for IP telephones)
23 Business server
24 Office POP server and gateway device
25 Gateway device (compatible with telephone lines)
26 Gateway device (compatible with radio lines)
27 HUB
28 HUB
30 Firewall and VPN-GW (firewall with gateway function)
51 HUB
71 HUB
101 Relay server (virtual HUB)
102 Take-out PC (a mode of information processing terminal)
103 Relay server (directory server, SIP server)
210 VPN gateway (VPN-GW)
220 VPN gateway (compatible with UPnP)
1001 Input (take-out PC)
1002 Memory (take-out PC)
1003 Access means (take-out PC)
1004 Interface (take-out PC)
1005 Recording media (take-out PC)
1006 Control (CPU) (take-out PC)
2001 Input (gateway device)
2002 Memory (gateway device)
2003 Access means (gateway device)
2004 Interface (gateway device)
2005 Recording media (gateway device)
2006 Controller (CPU) (gateway device)
A1 Business client application (take-out PC)
A2 Relay server application (take-out PC)
A3 Control mail transmission application (take-out PC)
A4 SSL (take-out PC)
A5 TCP (take-out PC)
A6 IP routing (take-out PC)
A7 IP stack (Private IP) (take-out PC)
A8 Virtual driver (take-out PC)
A9 Virtual NIC (take-out PC)
A10 SSL (take-out PC)
A11 TCP (take-out PC)
A12 IP stack (Global IP) (take-out PC)
A13 Driver (take-out PC)
A14 NIC (take-out PC)
A15 SSL (take-out PC)
A16 TCP (take-out PC)
A21 Handset (take-out PC)
A22 IP telephone server application (take-out PC)
A23 UPnP client application (Firewall)
A24 TCP (Firewall)
B1 Control mail reception application (gateway device)
B2 Relay client application (gateway device)
B3 SSL (gateway device)
B4 TCP (gateway device)
B5 IP routing (gateway device)
B6 IP stack (Private IP) (gateway device)
B7 Bridge (gateway device)
B8 Driver (gateway device)
B9 NIC (gateway device)
B10 SSL (gateway device)
B11 TCP (gateway device)
B12 Virtual driver (gateway device)
B13 Virtual NIC (gateway device)
B14 Authentication module (gateway device)
B15 Driver (gateway device)
B16 NIC (gateway device)
B21 Handset (gateway device)
B22 IP telephone client application
C1 Business server application
C2 SSL (business server)
C3 TCP (business server)
C4 IP routing (business server)
C5 IP stack (Private IP) (business server)
C6 Driver (business server)
C7 NIC (business server)
D1 SMTP server application (SMTP server)
D2 SSL (SMTP server)
D3 TCP (SMTP server)
D4 IP routing (SMTP server)
D5 IP stack (Global IP) (SMTP server)
D6 Driver (SMTP server)
D7 NIC (SMTP server)
E1 POP server application (POP server)
E2 SSL (POP server)
E3 TCP (POP server)
E4 IP routing (POP server)
E5 IP stack (Global IP) (POP server)
E6 Driver (POP server)
E7 NIC (POP server)
F1 IP routing (Firewall)
F2 IP stack (Global IP) (Firewall)
F3 Driver (Firewall)
F4 NIC (Firewall)
F5 IP stack (Private IP) (Firewall)
F6 Driver (Firewall)
F7 NIC (Firewall)
F8 UPnP server application (Firewall)
F9 TCP (Firewall)
P1 Connection (A3→D1)
P2 Connection (D1→E1)
P3 Connection (B1→E1)
P4 VPN connection (B2→A2)
P5 Connection (A1→A2)
P6 Connection (B2→C1)
P7 Connection (B1→B14)
P8 Connection (A23→F8)

BEST MODE FOR CARRYING OUT THE INVENTION

A connection method, communication system, communication device, and program, according to embodiments of the present invention, will be explained below for VPN connection.

First Embodiment

Explanation of Configuration

FIG. 1 is a diagram illustrating a network configuration according to a first embodiment of the present invention. The network configuration comprises the Internet 1, an intranet 2 ("A" company's intranet), and a firewall 3 disposed between the Internet 1 and the intranet 2. The intranet 2 includes a gateway device 20 connected to the firewall 3 through a HUB and to which an object application, which establishes connection to the Internet according to a connection request, is installed. An information processing terminal 10 is provided on the Internet side. The information processing terminal can be taken out of "A" company by a staff member employer (to which access to the "A" company's intranet is authorized). The information processing terminal is installed with dedicated software, including a setting application (often called a connection request application) that requires connection to the gateway device 20 and an object application that receives connection from the gateway device 20 to execute certain processing. An information processing terminal 10 has access means for delivering a connection request to the gateway device 20. The firewall 3 may be configured with a proxy server. This is applicable to the following embodiments.

Here, the information processing terminal 10 is a portable terminal such as a notebook PC. The information processing terminal 10 may be used in the Internet 1, as shown in FIG. 1. The information processing terminal 10 may be used in the intranet 2, in place of the gateway device 20, as shown in FIG. 1. When the information processing terminal 10 is used in the intranet 2, it communicates with the firewall 3 or a business server in the intranet via HUB. In the use of the information processing terminal 10 on the Internet (or outside the intranet), the gateway device 20 is disposed in the intranet 2 via the HUB and the connection between the gateway device 20 and the information processing terminal 10 is set via the firewall 3. Thus, communication between the information processing terminal 10 and the gateway device 20 can be established.

In the present embodiment, the connection request application installed in the outside information processing terminal 10 is the software issuing a connection request by means (access means) accessible to the inside of the firewall from the Internet. For example, an application for transmitting an e-mail accessible via the firewall or an application for transmission, such as telephone lines or radio lines, accessible via no the firewall is applicable. An object application installed in the gateway device 20 can establish the connection state via the firewall in response to access of a connection request from the outside information processing terminal 10. Various applications including address conversion for VPN, Web proxy, IP telephone, video streaming, file server, FTP, and file swapping, in addition to encapsulation for VPN (a relay client application, a relay server application, or the like), being frame conversion software for the Internet and intranet, are applicable as the object application.

Using a connection request application in the information processing terminal 10, the gateway device 20 is accessed for connection request (a). Using the object application, the connection (b) between the gateway device 20 and the information processing terminal 10 is established in response to the access.

In various applications according to the present invention, the client means an application on a connection requiring side and the server means an application on a connection receiving side.

(Explanation of Operation)

Figure 2:
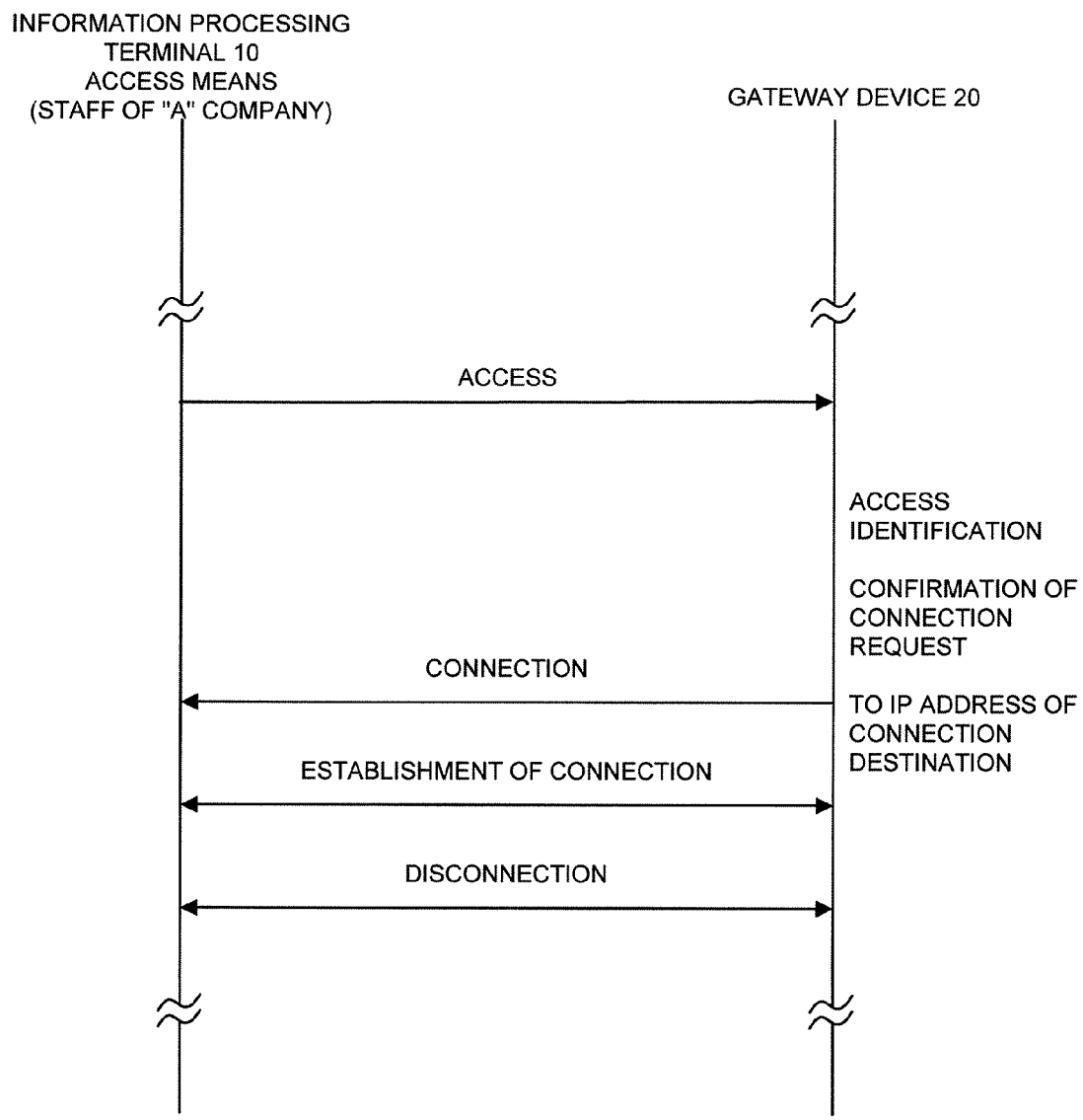
FIG. 2 is a diagram illustrating an operational procedure in the first embodiment.

FIG. 2 is a diagram illustrating the procedure of the present embodiment. The operation of the present embodiment is as follows:

(1) Using the connection request application in the information processing terminal 10, a staff member of "A" company sends a connection request to the gateway device 20 via access means such as an e-mail or telephone line (or to the mail address of the staff member when the access means is an e-mail). Information necessary for connection from the gateway device installed on the "A" company's intranet side to the information processing terminal 10, such as ID information representing an access for a connection request, IP address of the information processing terminal 10, and the like, are added to the connection request (a).

(2) When receiving access for a connection request, the gateway device 20 establishes connection to the IP address of a connection request source based on information contained in the connection request, using the connection application (b). In this case, in order to establish connection between the inside of the intranet 2 and the Internet 1, the firewall 3 can be passed through without any special setting.

(3) After establishment of the connection, the object application in the information processing terminal 10 can communicate bi-directionally with the object application in the gateway device 20 inside the intranet till the connection is cut.

Figure 3:
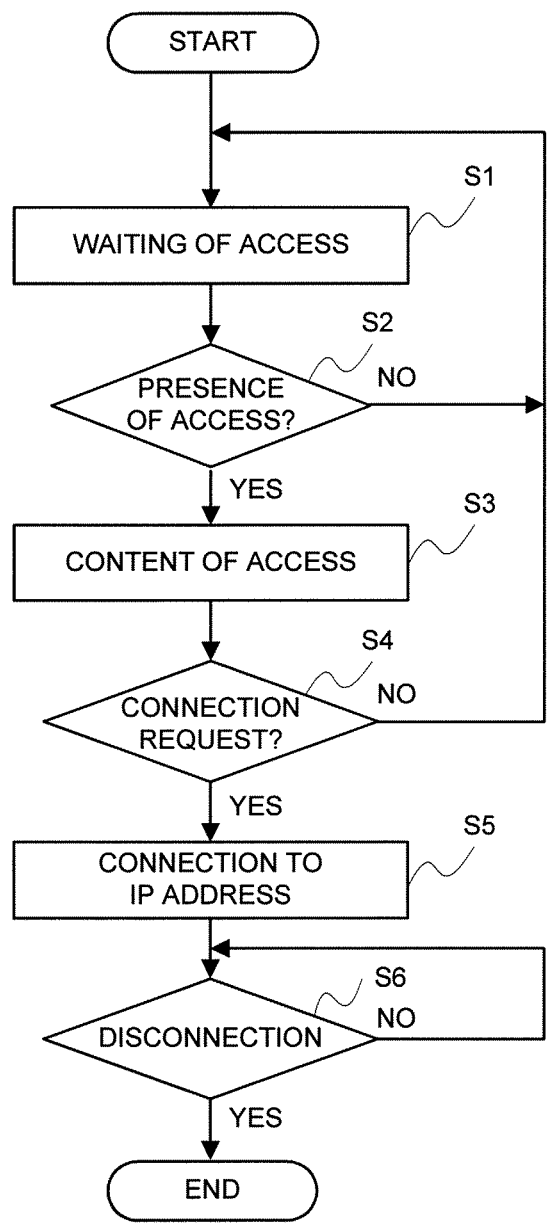
FIG. 3 is a flowchart showing an operation of a gateway device, in the first embodiment.

FIG. 3 is an operational chart of the gateway device according to the first embodiment. The gateway device 20 waits for access from other equipment (steps S1 and S2) and decides the ID information of the access (steps S3 and S4) when it receives the access (step S2, YES). When there is access for a connection request (step S4, YES), the gateway device 20 connects to the IP address of the information processing terminal 10, being a connection requesting source, based on information contained in the connection request (S5). After the connection, the object application in the information processing terminal 10 can be communicated with the object application in the gateway device 20 or the connection device in the intranet till the connection is disconnected. When there is no connection request in the step S4 (NO), the gateway device 20 becomes a waiting state (step S1).

As described above, according to the present invention, the Internet 1, or an outside network, can connect to the intranet 2, in response to a connection request from the Internet 1, without changing the setting of the firewall 3 and the gateway device or without installing a relay server in the outside network. Hence, there is no difficulty in an approval procedure of the firewall administrator or the installation and use of a relay server.

Second Embodiment

Figure 4:
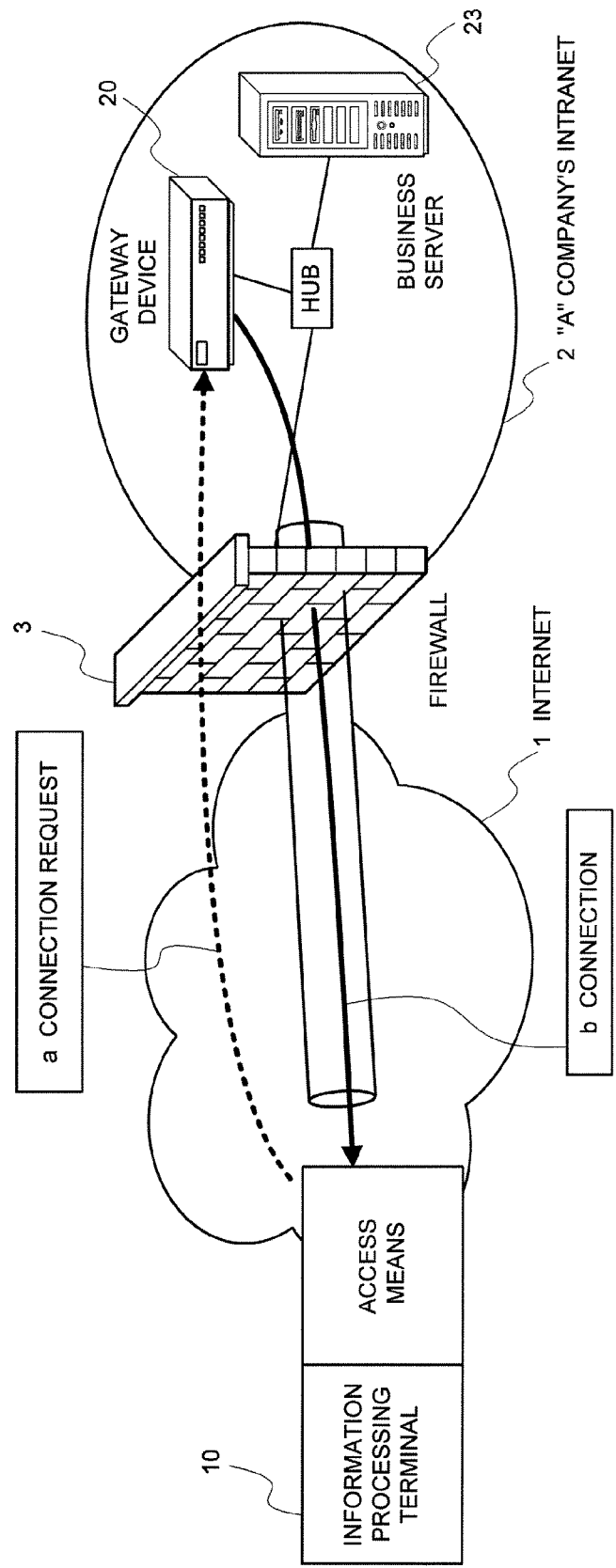
FIG. 4 is a diagram illustrating VPN connection in a second embodiment.

FIG. 4 is a diagram illustrating VPN connection having a relay connection function (relay application) as an object application, according to a more concrete example of the first embodiment. The configuration of the present embodiment is similar to that of the first embodiment shown in FIG. 1. However, the intranet 2 includes the gateway device 20, which is connected to the firewall 3 via the HUB and is installed with an object application. The object application includes a setting application for establishing connection to the Internet side based on a connection request from the Internet side and a relay application having a relay connection function to equipment in the intranet 2. The gateway device 20 connects the information processing terminal 10 to a device, for example, the business server 23, in the intranet 2 wherein the business application in the gateway device 20 can be communicated to the business application in the information processing terminal 10.

The information processing terminal 10 has a connection request application, a business application, and a relay application (called a relay server application) for relaying the business application and the gateway device. The gateway device 20 has a relay application (called a relay client application) for relaying the information processing terminal 10 and the business server 23.

The operation of the present embodiment is as follows. The gateway device 20 is accessed for a connection request (a) using the connection request application of the information processing terminal 10. In response to the access, the gateway device 20 establishes VPN connection (b) to the information processing terminal 10 using the relay client application. Next, using the relay client application, the gateway device 20 relays packets exchanged between the information processing terminal 10 and the business server 23 through the VPN connection (b). The business client application in the information processing terminal 10 and the business server application in the business server 23 can be communicated bi-directionally.

Third Embodiment

Figure 5:
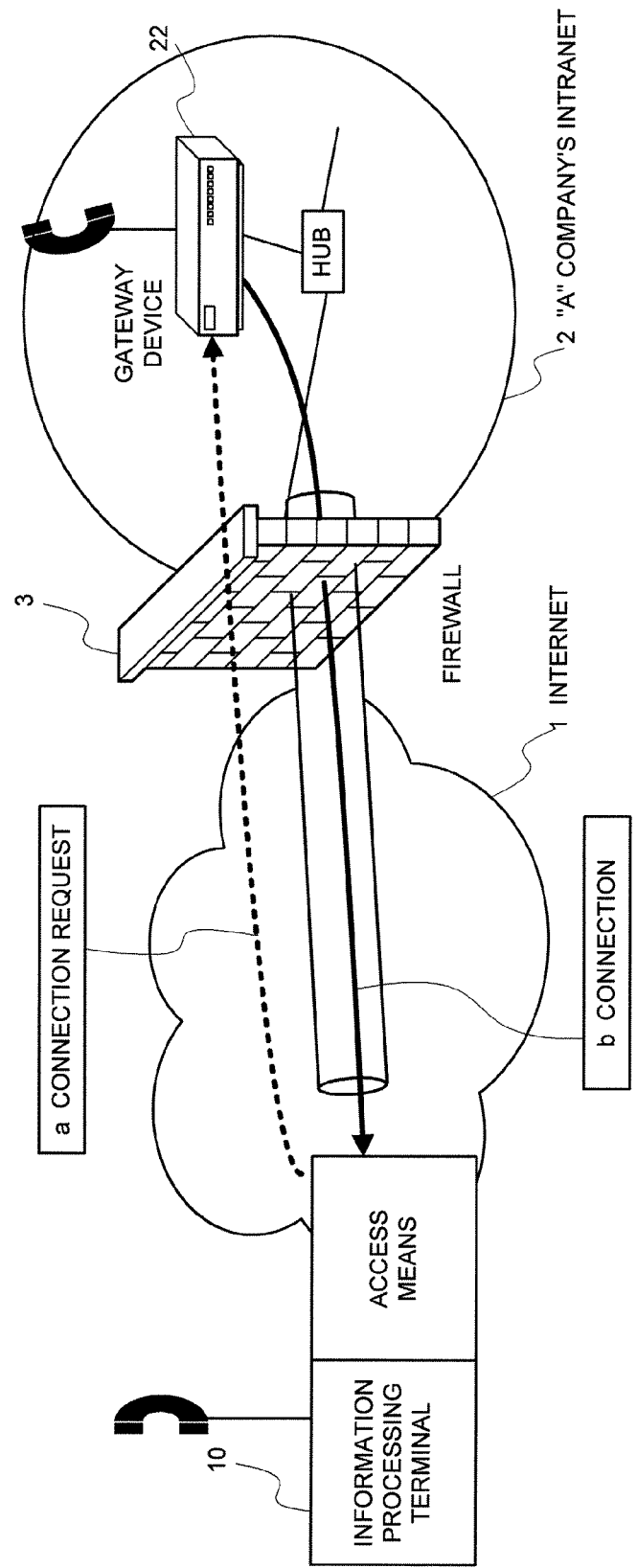
FIG. 5 is a diagram illustrating VPN connection for IP telephones in a third embodiment.

FIG. 5 is a more concrete example of the first embodiment and illustrates an example of VPN connection for an IP telephone between the information processing terminal 10 and the gateway device 22 when an IP telephone application is used as an object application. In the gateway device 22, a handset or a telephone set is connected to the gateway device 20 shown in FIG. 4. The configuration of the present embodiment is similar to that shown in FIG. 1. However, the information processing terminal 10 and the gateway device 22 have object applications for IP telephones, respectively, and are connected to the IP telephone handset or telephone (called handset). Thus, the IP telephone call enables through the connection between the information processing terminal 10 and the gateway device 22. The information processing terminal 10 has a connection request application and an object application for IP telephone. The gateway device 22 has a connection acceptance application (such as a control mail reception application) and an object application for IP telephone to the information processing terminal 10.

The operation of the present embodiment is as follows. Using the connection request application of the information processing terminal 10, the gateway device 22 is accessed for a connection request (a) by e-mail or by telephone line or a radio line. Using the IP telephone application, the gateway device 22 establishes the connection (b) to the information processing terminal 10 in response to the access. The connection between the information processing terminal 10 and the gateway device 22 is established, so that the call between the handset of the information processing terminal 10 and the handset of the gateway device 22 enables.

Fourth Embodiment

Explanation of Configuration

Figure 6:
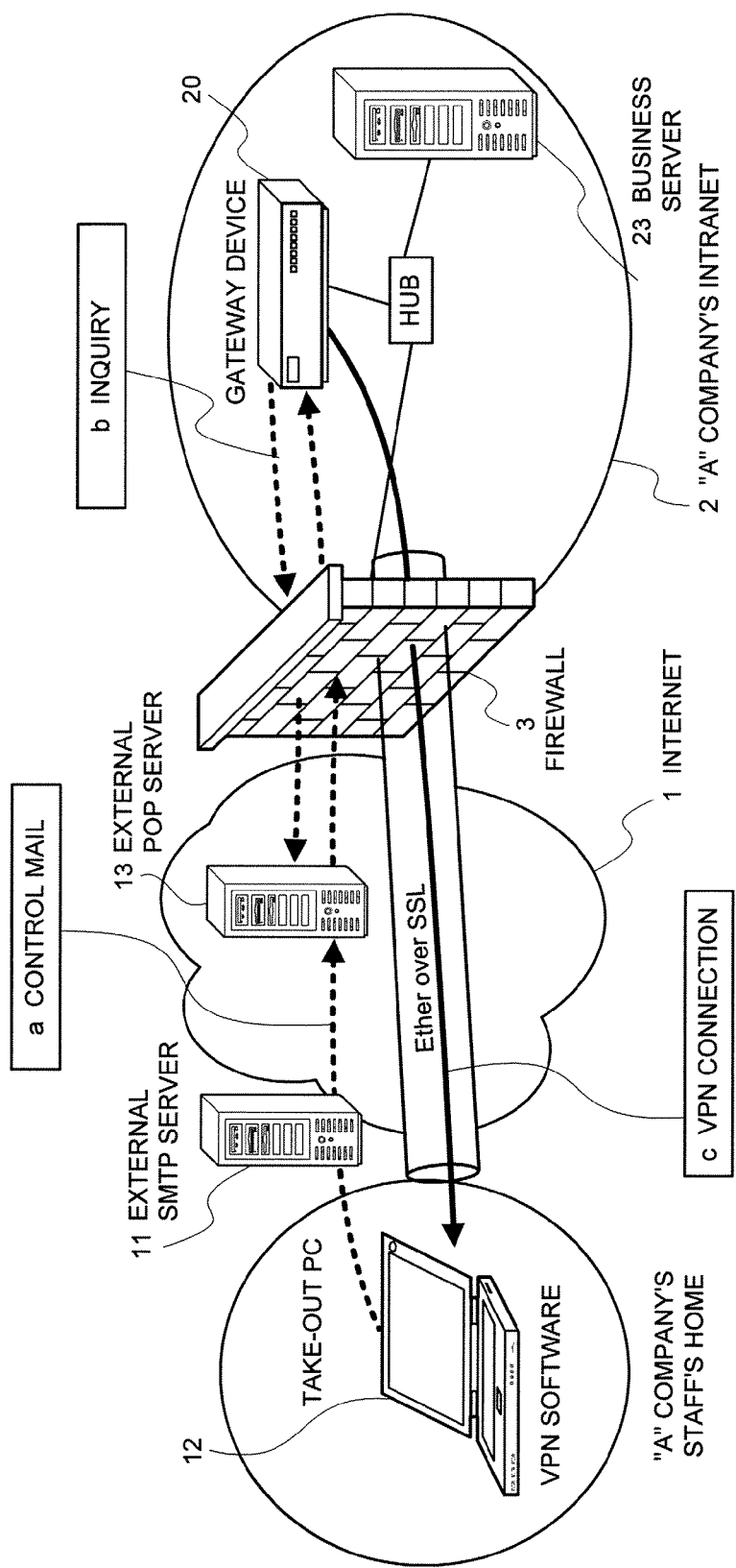
FIG. 6 is diagram illustrating a network configuration according to a forth embodiment of the present invention.

FIG. 6 is a diagram illustrating a network configuration according to a fourth embodiment of the present invention. This network configuration is configured of the Internet 1, an intranet 2 (in "A" company intranet), and a firewall 3 disposed between the Internet 1 and the intranet 2. The intranet 2 includes a gateway device 20, for VPN connection to the Internet, connected to the firewall 3 via HUB, and a business server 23 connected to the gateway device 20 via HUB. The Internet further includes a SMTP server 11 for e-mail transmission (or an outside SMTP server), a POP server (an outside POP server) 13 for e-mail reception, an information processing terminal 12 (called a take-out PC), such as a personal computer, which can be taken out by a staff member of "A" company. The PC 12 is a mode of the information processing terminal 10 according to the first to third embodiments.

The gateway device 20 can be installed at any point of the intranet. Typically, a single gateway device is disposed in an office or on a server rack in a department and for each staff member or for plural staff members (e.g. 2 to 50 or 2 to 100).

At the use in the intranet, the PC 12 is connected to the firewall 3 and the business server 23 via the HUB. At the use on the Internet (outside the intranet), the gateway device 20 is connected to the firewall 3 and the business server 23 of the intranet 2 via HUB and the VPN connection between the gateway device 20 and the PC 12 are set. Thus, communications can be established between the business sever 23 and the PC 12.

Figure 7:
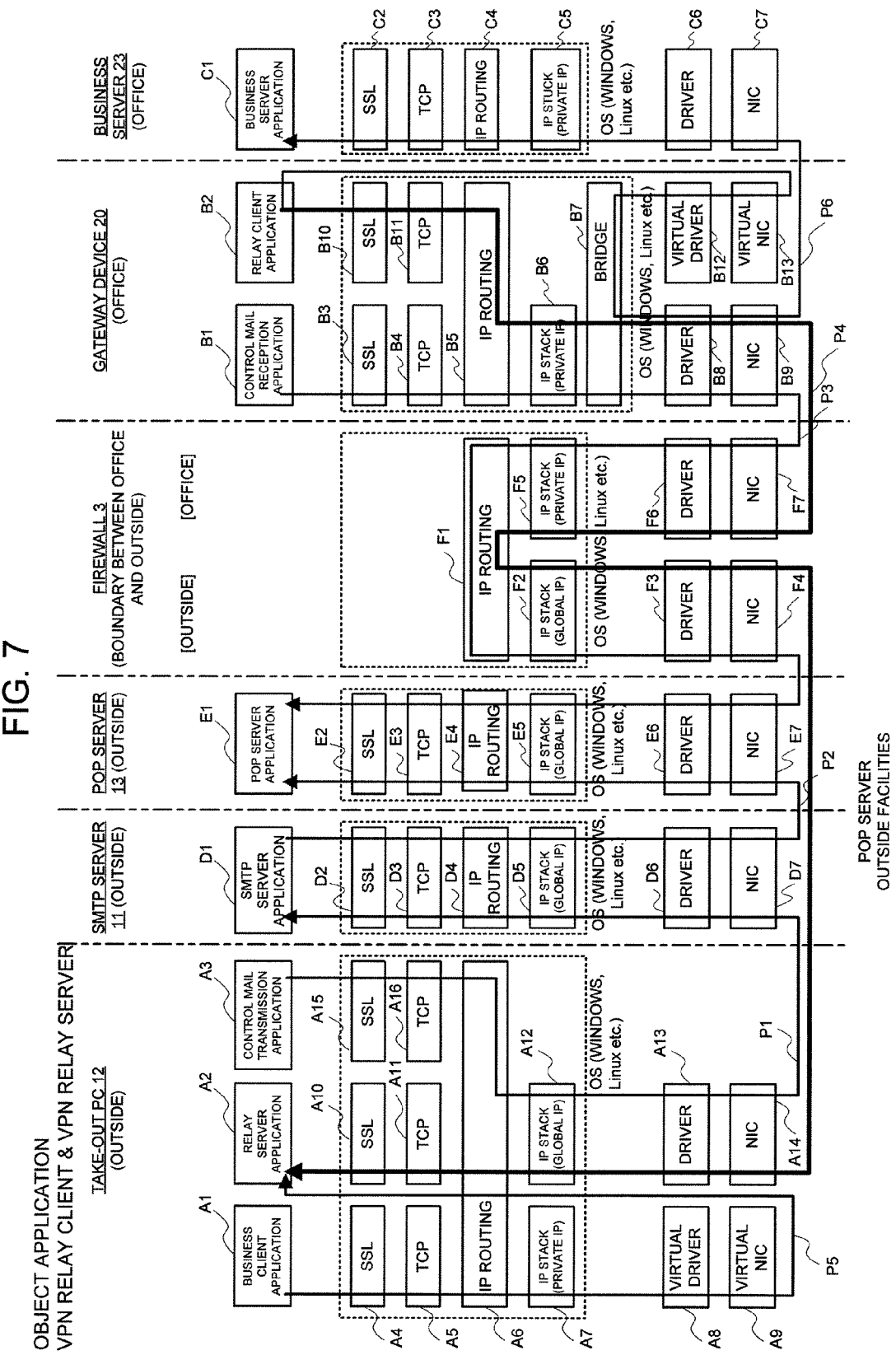
FIG. 7 is a diagram showing software installed in the fourth embodiment and a communication processing on a protocol.

FIG. 7 is a diagram illustrating software installed in each device of the present embodiment and a communication process on a protocol.

Each of the PC 12, the gateway device 20, the SMTP server 11, the POP server 13, the business server 23, and the firewall 3, according to the present embodiment, has a predetermined OS, an application for realizing various functions, a NIC (network interface card) of hardware for OS-to-OS communications, and a software driver. Each of the PC 12 and the gateway device 20 has a virtual driver and a virtual NIC for software.

FIG. 7 illustrates VPN connection established between the PC 12 and the gateway device 20 and a communication process on in-house business between the PC 12 and the business server 23. The PC 12 is installed with the in-house business application A1 (called a business client application) and the business server 23 is installed with a corresponding application C1 (called a business server application). Each of the PC 12 and the gateway device 22 are installed with transmission/reception software for e-mails for enabling access from the Internet to the firewall. The software includes an application (called a control mail transmission application) A3 for realizing an e-mail transmission function, an application (called a control mail reception application) B1 for realizing an e-mail reception function, an application (called a relay server application) A2 for realizing a relay function to the business client application A1, and an application (called a relay client application) B2 for realizing a relay function to the business server application C1.

The business client application A1 is an application for communicating bi-directionally with the business server application C1. The WEB browser software is typically applicable to the business client application A1. In this case, the WEB server application is applied to the business server application C1. In addition to the WEB browser software, various applications, including TELNET client software, FTP client software, accounting client software, file shared client software, database client software, and the like, are applicable as the business client application A1. In this case, the business server application C1 corresponds to the business application A1. TELNET server software, FTP server software, accounting server software, file shared server software, database server software, and the like are applicable as the business server application C1.

The relay server application A2 executes the following operations.

(1) The relay server application A2 carries the frame arriving from the virtual NIC A9 as data over the communication through VPN connection P4 between the relay server application A2 and the relay client application B2 and then transfers it to the SSL A10.

(2) The relay server application A2 transfers data arriving over communication through VPN connection P4 from SSL A10 as a frame to the virtual NIC A9.

(3) The relay server application A2 receives an instruction for waiting communication through the VPN connection P4, using the control mail transmission application A3, and posts it to the control mail transmission application A3 after completion of the VPN connection P4.

(4) The relay server application A2 receives an instruction for cutting communication through the VPN connection P4, using the control mail transmission application A3 and transmits a disconnection signal to the relay client application B2.

The control mail transmission application A3 executes the following operations.

(1) When receiving a connection command from a user, the application A3 creates a control mail for connection request and then transmits it to SSL A15. This mail is transferred to the SMTP server application D1 via the connection P4. At the same time, the application A3 issues a connection waiting instruction to the relay server application A2 and instructs to wait communication connection via the VPN connection P4.

(2) When receiving a disconnection instruction from the user, the application A3 sends it to the relay server application A2.

The SMTP server application D1 has the function for transferring an e-mail received, according to a SMTP (Send Mail Transfer Protocol), to a suitable SMTP server or POP server. Referring to FIG. 7, the SMTP server D1 directly transfers an e-mail to the POP server E1. However, another SMTP server may be disposed between the servers D1 and E1, such that the e-mail arrives at POP server E1 through several transfer operations. Referring to FIG. 7, the mail received from the control mail transmission application A3 is transferred through the connection P1 by referring to destination mail address and using the connection P2 to the POP server E1.

The POP server application E1 performs the following operations.

(1) The application E1 saves an e-mail from the SMTP server D1 through connection P2.

(2) When the control mail reception application B1 requires a list of e-mails saved through the connection P3, the saved e-mail list is transferred through the connection P3.

(3) When the POP server application E1 receives a reception request specifying part of e-mails from the control mail reception application B1 through the connection P3, the specified e-mail is transferred through the connection P3.

(4) When the POP server application E1 receives a deletion request specifying part of e-mails from the control mail reception application B1 through the connection P3, the specified e-mail is deleted.

(5) When the POP server application E1 receives a batch reception request of all archived e-mails (or all saved e-mails) from the control mail reception application B1 through the connection P3, all the saved e-mails are transferred through the connection P3.

(6) When the POP server application E1 receives a batch deletion request of all saved e-mails from the control mail reception application B1 through the connection P3, all the saved e-mails are deleted.

The control mail reception application B1 performs the following operation.

(1) The control reception application B1 regularly requests a list of saved e-mails from the POP server application E1 through the connection P3. When the list includes a control mail, the control mail reception application B1 sends a control mail reception request to the POP server application E1 through the connection P3, in response to a reception request of part of specified e-mails. At the same time, the control mail is deleted by a request of partially deleting the specified e-mails.

(2) When the control mail includes a connection request, the control mail reception application B1 instructs the relay client application B2 to set communication through the VPN connection P4 to the destination included in the mail (the relay server application A2 in FIG. 7).

The relay client application B2 is performed the following operation.

(1) The relay client application B2 receives a connection instruction from the control mail reception application B1 and sets communication through the VPN connection P4 to the destination (A2 in FIG. 7) included in the connection instruction.

(2) The relay client application B2 caries a frame arriving from the virtual NIC B13 as data over the communication through the VPN connection P4 between the relay server application A2 and the relay client application B2 and transfers the data to SSL B10.

(3) The relay client application B2 transfers data, as a frame, received over the communication through the VPN connection P4 from the SSL B10 to the virtual NIC B13.

(4) When the relay client application B2 receives the disconnection signal through the VPN connection P4 from the relay server application A2, the communication through the VPN connection P4 ends. The relay client application B2 informs the control mail reception application B1 of the end of the communication.

The business server application C1 is an application communicating bi-directionally with the business client application A1. A WEB server application is typically applied to the business server application C1. The business server application C1 corresponds to the business client application A1. Various applications including TELNET server software, FTP server software, accounting server software, file shared server software, database server software and the like are applicable as the business server application C1.

According to the present embodiment, the SMTP server 11, or a mail server on the e-mail transmission side, and the POP server 13, or a mail server on an e-mail reception side, are installed as outside servers. The SMTP server is installed with a SMTP server application as an application realizing the e-mail relay function and the POP server is installed with a POP server application as an application realizing the e-mail reception function. In addition to the outside POP server, the mail news server, DNS server, SIP server, bulletin board (WWW) server, and FTP server may be utilized as the outside server 13 so long as the firewall 3 does not limit access from the office.

Next, the PC 12 may be installed with various modules, as OS contained software, including SSL A4, SSL A10, SSL A15, TCP A5, TCP A11, TCP A16, IP routing A6, IP stack (Private IP) A7, IP stack (Global IP) A12.

The gateway device 20 may be installed with various modules, as OS included software, including SSL B3, SSL B10, TCP B4, TCP B11, IP routing B5, IP stack (Private IP) B6, and bridge B7.

The SMTP server 11 includes various modules, as OS included software, including SSL D2, TCP D3, IP routing D4, and IP stack (global IP) D5.

The POP server 13 includes various modules, as OS included software, including SSL E2, TCP E3, IP routing E4, and IP stack (global IP) E5.

The business server 23 includes various modules, as OS contained software, including SSL C2, TCP C3, IP routing C4, and IP stack (private stack) C5. The firewall 3 includes various modules, as OS contained software, including IP routing F1, IP stack (global IP) F2, IP stack (private IP) F5.

The PC 12 includes as software other than OS, a virtual driver A8, a virtual NIC A9, and a driver A13. The gateway device 20 includes a virtual driver B12, a virtual NIC B13, and a driver B8. The SMTP server 11 includes a driver D6.

The POP server 13 includes a driver E6. The business server 23 includes a driver C6. The firewall 3 includes a driver F3 and a driver F6.

The PC 12 includes, as hardware, NIC A14. The gateway device 20 includes NIC B9. The SMTP server 11 includes NIC D7. The POP server 13 includes NIC E7. The business server 23 includes NIC C7. The firewall 3 includes NIC F4 and NIC F7.

Outline of each module shown in FIG. 7 will be explained below. In the following explanation, business client applications, relay server applications, control mail transmission applications, SMTP server applications, POP server applications, control mail reception applications, relay client applications, and business server applications are included as applications to be described with various module functions.

(SSL)

SSL has the function of receiving and encrypting data from an application and transmitting it to TCP and receiving and decrypting data from TCP and transmitting it to the application and the function of exchanging certificates or information about as secret keys and public keys used for encryption. Whether or not to use SSL depends on the setting from the application. When SSL is not used, data from the application is not encrypted and is sent without any change. Moreover, data from the TCP is not decoded and is sent to the application without any change.

(TCP)

TCP data are arranged and packetized in a fixed formatted frame through the following process (1) to (4), or are decoded from the packet into data.

(1) TCP receives data from SSL or from the application, when SSL is not used, and adds a TCP header to detect a missing of a packet or a reversed order, thus sending the resultant data to the IP routing. When data is large, a division (fragmentation) process is carried out.

(2) TCP receives packets from the IP routing and detects a reversed order or a missing of a packet is detected by referring to the TCP header. When there is not a reversed order or an occurrence of missing, TCP removes the header from the packet and sends the resultant packet to the SSL or sends it to the application when SSL is not used. In this case, an ACK packet, which acknowledges an arrival of a packet, is sent back to the packet transmission source.

(3) In the item (2), if missing of a packet occurs, TCP transmits a retransmission request packet. If reversed order or fragmentation occurs, TCP wait for subsequent packets and decodes data.

(4) TCP receives an ACK packet and adjusts the transmission rate of the packet in the item (1).

(IP Routing)

The IP routing module receives a packet from TCP and transfers the packet to the IP stack (private IP), IP stack (global IP) or TCP by referring to the destination IP address and destination port number. Moreover, the IP routing module receives a packet from the IP stack (private IP) and sends the packet to the IP stack (global IP) or TCP by referring to the destination IP address and the destination port number. Moreover, the IP routing module receives a packet from the IP stack (global IP), refers to a destination IP address and a destination port number, and transfers the packet to the IP stack (private IP) or TCP.

(Bridge)

The bridge module receives a frame from the IP stack, refers to a destination MAC address, and transfers the frame to the driver or virtual driver. The bridge module also receives a frame from the driver, refers to a destination MAC address, and transfers the frame to the virtual driver or IP stack. The bridge module receives a frame from the virtual driver, refers to a destination MAC address, and transfers the frame to the driver or the IP stack.

Moreover, the bridge module refers to a transmission source MAC address upon reception of a frame, learns the MAC address, and records whether or not which terminal having the MAC address are connected to which NIC. If the MAC address is not learnt in the reference of the destination MAC address upon reception of a frame, the bridge module broadcasts the frame to the IP stack, to which a frame is input, or to a driver other than the driver or to IP stack.

(Driver)

The driver is software inter-mediating NIC and OS. The driver receives a packet from NIC. The driver also sends it to OS, and receives packets from OS and them to NIC.

(NIC)

NIC (network interface card) is hardware installed into a computer to connect a network cable such as Ethernet (trademark). NIC sends data received from the cable, to the driver, and transmits data received from the driver, to the cable.

(Virtual Driver)

A virtual driver is software inter-mediating the virtual NIC with OS. The virtual driver receives a frame from the virtual NIC, sends it to OS. The virtual driver also receives the frame from OS and sends back it to the virtual NIC.

(Virtual NIC)

A virtual NIC is software inter-mediating the virtual driver with the relay server application or the relay client application (hereinafter referred to as relay applications). The virtual NIC receives a frame from the virtual driver and hands over it to the relay application. Moreover, the virtual NIC receives a frame from the relay application and sends it to the virtual driver. Originally, NIC is formed of hardware but the virtual NIC is formed of software. OS recognizes the virtual NIC as if it is hardware.

As understood from the following function of each module, each device has the communication processing function of executing the downstream process output from the application. That is, SSL encrypts data output from the application and sends it to TCP. TCP checks the data and adds a TCP header to the data and sends it to the IP routing. The IP routing compares the packet received from the TCP with the destination IP address and the destination port number and then sends it to the IP stack (private IP) or the IP stack (global IP). NIC sends data stored in the IP stack (private IP) or the IP stack (global IP) to a cable such as Ethernet via the driver.

Moreover, each device has the communication processing function as an up-stream processing function. That is, the NIC stores the frame received from the cable such as Ethernet into the IP stack (private IP) or IP stack (global IP) of OS via the driver. The IP routing refers to the IP header based on the packet received from the IP stack (private IP) or IP stack (global IP) and transfers it to a suitable TCP. TCP refers to the TCP header of the packet received from the IP routing, checks the packet, removes the header from the normal packet, and sends the resultant packet to SSL. SSL decodes the received data and sends it to the application.

Each device shown in FIG. 7 does not execute the communication process of the module function in the communication via the module (not described) or in the communication not streamed via the module. For example, the firewall 3 does not include application itself, SSL, and TCP but uses only the function of IP routing F1 between IP stack (private IP) and IP stack (global IP).

The gateway device 20 includes the bridge B7, having a MAC address learning function, that records whether or not a terminal having which MAC address is connected to which NIC, between IP stack (private IP) B6 and driver B8 (virtual driver B12). The gateway device 20 bridges three bridges, that is, the virtual driver B12, NIC B9, and IP stack B6.

Paying attention to the IP stack, each of the SMTP server 11 and the POP server 13 includes only the IP stack (global IP). The business server 23 includes only the IP stack (private IP).

In the embodiment described above, the communication through VPN connection P4 between the relay server application A2 and the relay client application B2, each being a mode of an object application, is set such that encryption is basically performed with the SSL protocol (via SSL) even in an office or at the outside. The setting is performed to prevent a leakage of secret information because VPN connection P4 is configured via the outside facilities such as the Internet. Generally, the encryption (SSL) is performed over the zone of the outside (the outside of the firewall) but is not essential in the present invention.

Both the region between the business client application A1 and the relay server application A2 and the region between the relay client application B2 and the business server application C1 belong to the office area (the inside of the firewall). Therefore, the encryption is optional. The setting of encryption is determined every use. The encryption is not essential because the connection P5 is used for the communication within the PC and the possibility of a leakage of the secret information in the office is low. The connection P6 is used for communication within the Intranet and the possibility of a leakage of secret information in the office is low. Therefore, encryption is not essential.

(Explanation of Operation)

Figure 8:
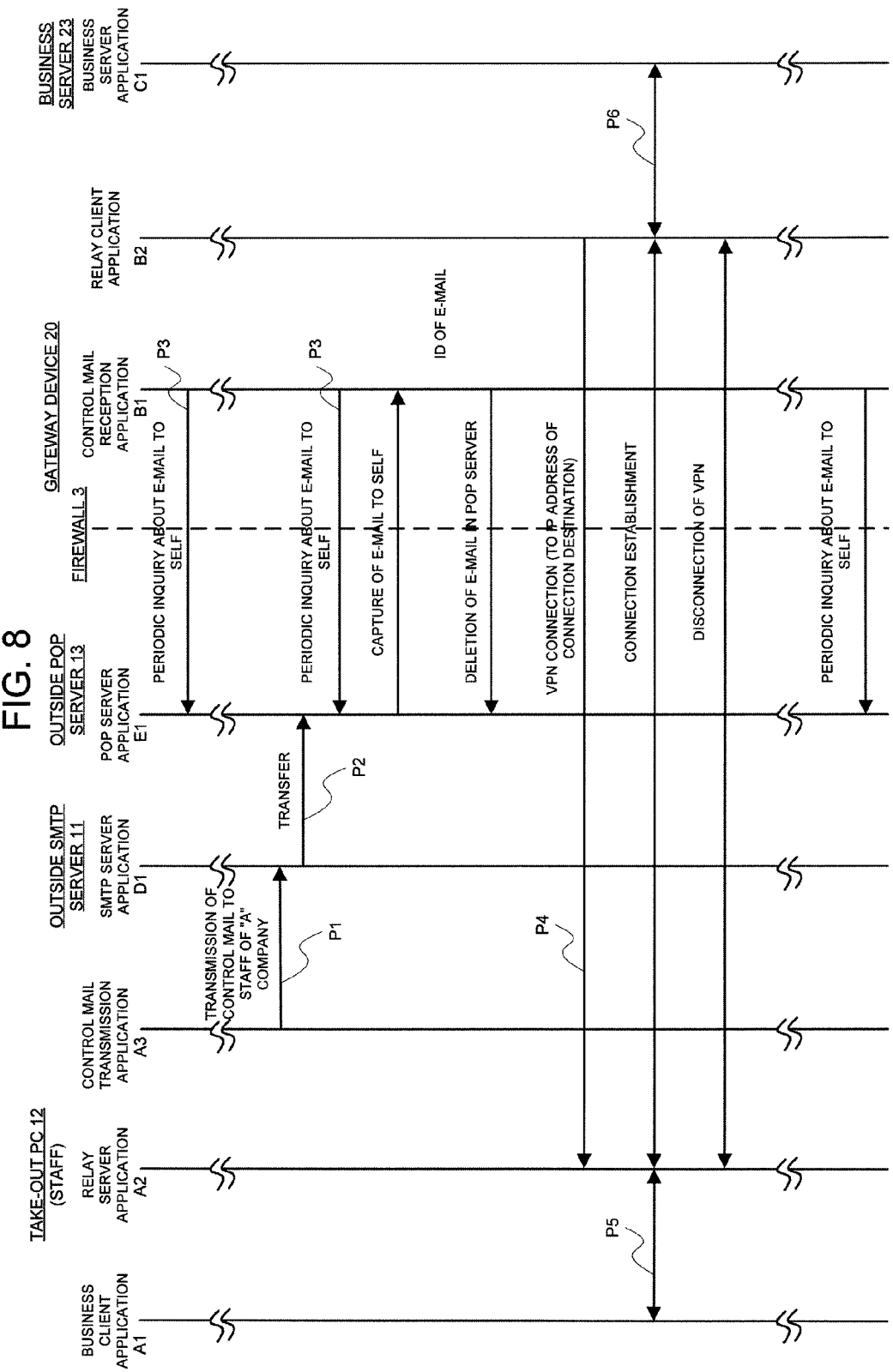
FIG. 8 is a diagram showing an operational procedure in the fourth embodiment.

FIG. 8 is a diagram illustrating the operational procedure of the present embodiment. The operation of the present embodiment will be described below by referring to FIGS. 7 and 8.

(1) Using the control mail transmission application (e-mail transmission software) A3 in the PC 12, a staff member of "A" company transmits a control mail to the mail address of the staff's himself set in the POP server 13 via the outside SMTP server 11. The control mail includes VPN connection request ID information (for example, VPN connection request ID information may be included to a header) to distinguish from ordinary e-mails. Moreover, information, such as IP address of the PC 12, necessary for VPN connection is added to the PC 12 carried out of the "A" company's intranet. That mail is first transferred to the SMTP server application D1 through the connection P1.

(2) Using the SMTP server application D1, the outside SMTP server 11 receives the control mail via the connection P1 and transfers the control mail to the outside POP server 13 through the connection P2 by referring to the header information. When the outside POP server 13 receives the e-mail (control mail) transmitted from the outside SMTP server, it memorizes and stores the e-mail (control mail) by mail address, using the POP server application E1.

(3) On the other hand, the gateway device 20 regularly accesses the outside and the office POP servers 13 via the firewall 3 using the control mail reception application B1 and inquires the e-mail whether or not the e-mail to self has arrived, through the connection P3. Moreover, the gateway device 20 captures the e-mail when the e-mail to self has arrived, and decides whether or not the e-mail is a control mail (only the header is checked when the header includes ID information about a VPN connection request).

(4) When the e-mail to self is a control mail, the control mail reception application B1 inside the gateway device 20 instructs the outside POP sever 13 to delete the control mail.

The authentication module B14 authenticates through the connection P7 based on the ID and password in the captured control mail. When the authentication is correct, the application B1 instructs the relay client application B2 to set the VPN connection P4 of the relay server application A2 to the IP address of the VPN connection request source (PC 12). The relay client application B2 sets the VPN connection P4 with the relay server application A2 to the IP address, to the VPN connection request source (PC 12) based on the instruction from the control mail reception application B1.

(5) When the VPN connection P4 is established, the relay server application A2 in the PC 12 relays the connection P5 and the VPN connection P4 and relays communication between the business client application A1 and the business server application C1 through the connection P4. The relay client application B2 in the gateway device 20 relays the connection P6 and the VPN connection P4 and relays the communication between the business server application C1 and the business client application A1 of the business server 23 through the VPN connection P4.

As a result, till the VPN communication P4 is cut, the PC 12 enables the communication between the business applications of the business servers 23 in "A" company's intranet.

Figure 9:
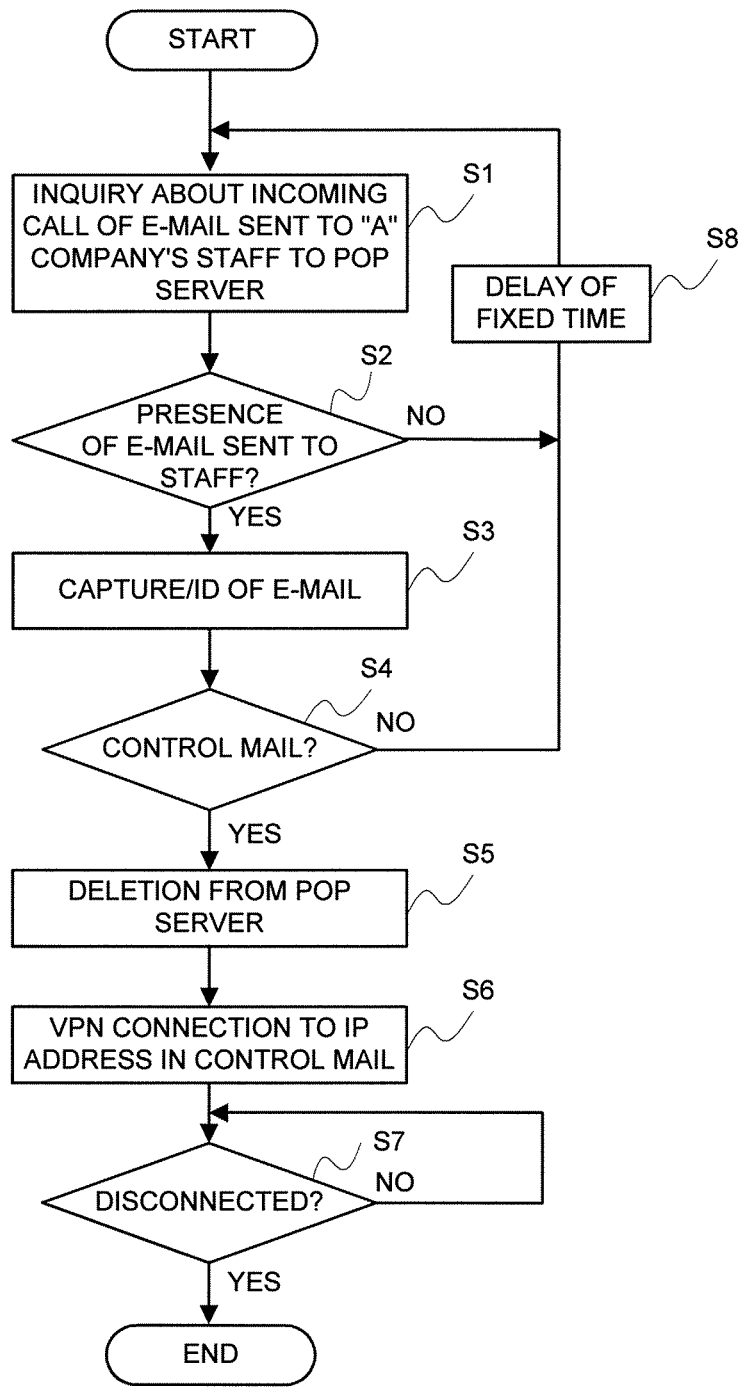
FIG. 9 shows an operational flowchart of a gateway device in the fourth embodiment.

FIG. 9 is an operational flowchart of the gateway device according to the fourth embodiment. The gateway device 20 inquires of the outside POP server 13 about whether or not an e-mail to self ("A" company's staff) has arrived (step S1). When the e-mail to self has arrived (YES in step S2), the gateway device 20 captures a list of the subjects (headlines) of e-mails or the whole of e-mail and decides whether or not an e-mail is a control mail (steps S3 and S4). When the e-mail to self is a control mail (YES in step S4), the gateway device 20 deletes the control mail from the office POP server 21 (step S5) and establishes the VPN connection to the IP address of a VPN connection request source based on the control mail (step S6). After the VPN connection, till the connection is cut (step S7), the business application of the PC 12 can communicate with the business application of the connection device inside the "A" company's intranet. When the mail to self ("A" company's staff) does not exist in the step S2 (NO) and is not a control mail in the step S4 (NO), the inquiry in the step S1 is repeated again after a fixed period of time (step S8).

As described above, without changing the setting of the firewall 3 and VPN-GW or without installing the relay server in the external network, the VPN connection can be established between the Internet 1, or an external network, and the "A" company's intranet 2, or an office network. Hence, the VPN connection can be simply constructed using e-mails, which are advantageous in communication charges, without difficulties in the approval procedure of a firewall's administrator and the installation and use of a relay server. Servers used for an exchange of ordinary e-mails can be utilized as the outside POP server 13 and the outside SMTP server 11, without any change. Accounts used for an exchange of ordinary e-mails can be utilized as the account of the POP server 13 without any change. However, this is limited to the case where the firewall 3 is set in such a way that the company authorizes an access from the intranet 2 to the outside POP server 13.

Fifth Embodiment

Next, as a specific embodiment of the present invention, the case will be explained below where e-mails are utilized as access means and VPN connection is established between an information processing terminal and a gateway device having an authentication function.

(Explanation of Configuration)

Figure 10:
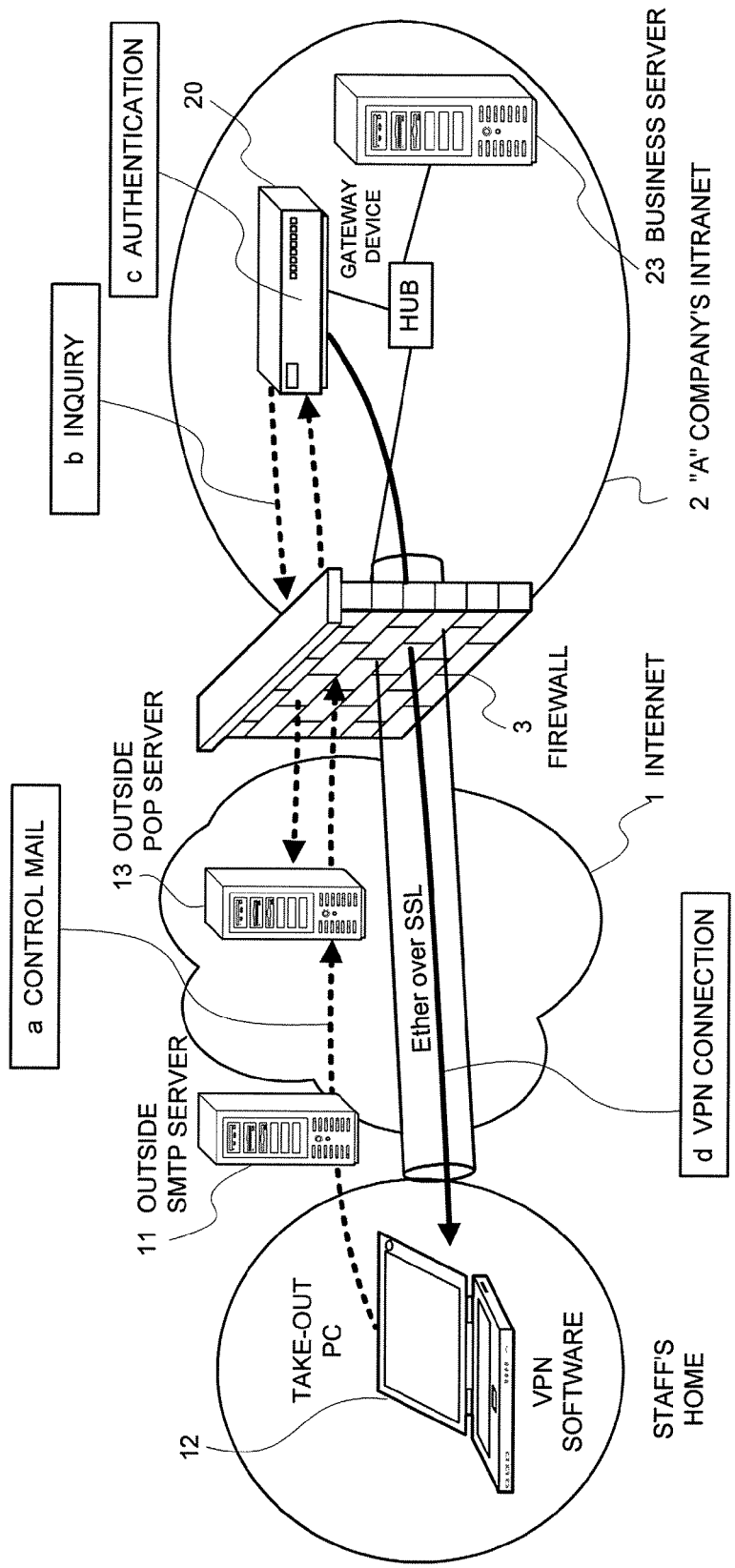
FIG. 10 is a diagram illustrating a network configuration according to a fifth embodiment of the present invention.

FIG. 10 is a diagram illustrating a network configuration according to the fifth embodiment of the present invention. The network configuration comprises the Internet 1, an intranet 2 of "A" company, and a firewall 3 disposed between the Internet 1 and the intranet 2. The intranet 2 comprises a gateway device 20 connected to the firewall 3 via the HUB and having a VPN connection authentication function for VPN connection to the Internet side and a business server 23 connected to the gateway device 20 via the HUB. The Internet side includes an outside SMTP server 11, an outside POP server 13 and a PC 12 taken out by "A" company's staff member.

The gateway device 20 may be installed in any place within the Intranet. Typically, a single gateway device 20 is installed in the office for each staff member or for plural staff members (of, for example, 2 to 50 or 20 to 100). In each gateway device 20, the user (a staff member) can set the authentication function and can set ID and password for authentication for access from the PC 12. When being used on the intranet, the PC 12 is connected to the firewall 3 and the business server 23 via HUB. When being used on the Internet 1 (outside the intranet 2), the gateway device 20 is connected to the firewall 3 and the business server 23 in the Intranet 2 via HUB. Thus, VPN connection is established between the PC 12 and the gateway device 20. The VPN connection can relay communication between the PC 12 and the business server 23.

Figure 11:
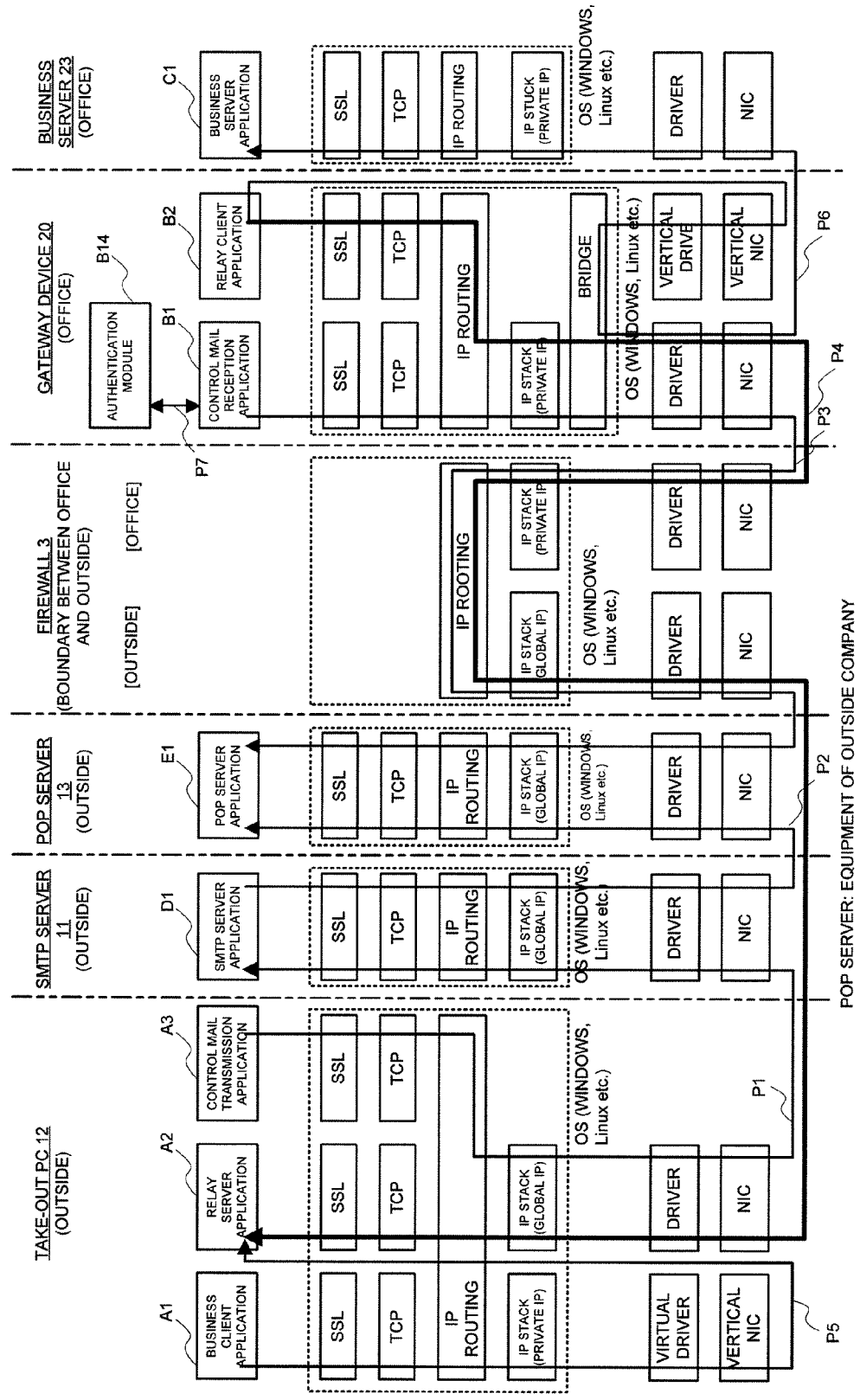
FIG. 11 is a diagram showing software installed in each device in the fifth embodiment and a communication processing on a protocol.

FIG. 11 is a diagram illustrating software installed in each device and a communication process on a protocol, according to the present embodiment.

The present embodiment is similar to the fourth embodiment (FIG. 7). That is, each of the PC 12, the gateway device 20, the SMTP server 11, the POP server 13, the business server 23, and the firewall 3 includes a predetermined OS, applications realizing various functions, hardware NIC for performing communication between OSs, a software driver, a virtual driver, and a virtual NIC. However, in the present embodiment, the gateway device 20 includes an authentication module B14 that realizes the authentication function in response to an access by an e-mail from the PC 12.

FIG. 11 illustrates an example of establishing VPN connection after authentication by both the PC 12 and the gateway device 20 and performing communication processes on office affairs between the PC 12 and the business server 23. The PC 12 is installed with the business client application A1 for office affairs and the business server 23 is installed with the corresponding business server application C1. Moreover, the PC 12 is installed with the control mail transmission application A3 for realizing an e-mail transmission function enabling access from the Internet to the firewall 3 for realizing a relay function to the business client application A1. The gateway device 20 is installed with the control mail reception application B1 for realizing an e-mail reception function and the relay client application B2 for realizing a relay function to the business server application C1.

In a manner similar to the fourth embodiment show in FIG. 7, the VPN capsulation application, or frame conversion processing software for the Internet and the Intranet, is applied to the relay server application A2. In the present embodiment, the SMTP server 11, or a mail server on the e-mail transmission side, and the POP server 13, or a mail server on the e-mail reception side, are installed as outside servers. The SMTP server 11 is installed with the SMTP server application D1 as an application realizing the e-mail transfer/reception function. The POP server 13 is installed with the POP server application E1 as an application realizing the e-mail reception/reception function.

The outline of each module and the function shown in FIG. 11 is similar to those in the fourth embodiment. However, the present embodiment differs from the fourth embodiment in that the control mail reception application B1 in the gateway device 20 extracts the ID and the password stored in a captured control mail and in that the authentication module B14 authenticates the IP and the password previously set by the user.

(Explanation of Operation)

Figure 12:
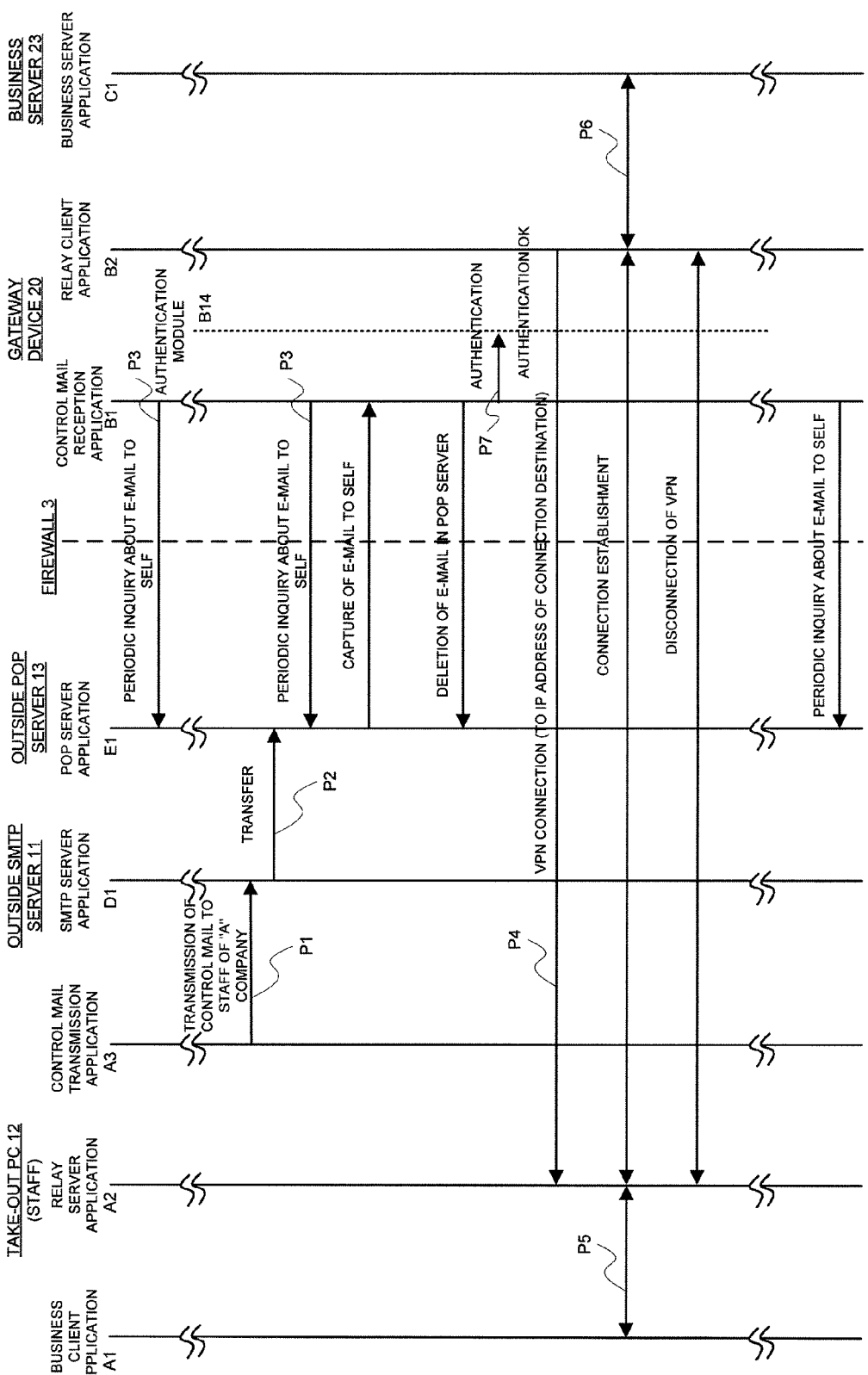
FIG. 12 shows an operational procedure in the fifth embodiment.

FIG. 12 is a diagram illustrating the procedure of the operation of the present embodiment. The operation of the present embodiment will be explained below by referring to FIGS. 11 and 12.

(1) In the control mail transmission application (e-mail transmission software) A3 of the PC 12, a staff member of "A" company transmits a control mail to the mail address of the staff member set to the POP server 13 via the outside SMTP server 11. The control mail includes information including ID information for VPN connection request (for example, the header includes ID information for a VPN connection request) to distinguish from ordinary e-mails. Moreover, information, such as the IP address, ID, and password of the PC 12, necessary for authentication on the intranet side and for VPN connection from the intranet side to the PC 12 are added to the control mail. That mail is first transferred to the SMTP server application D1 through the connection P1.

(2) The outside SMTP server 11 receives the control mail via the connection P1 using the SMTP server application D1, refers to the header information, and transfers the control mail to the outside POP server 13 via the connection P2. When receiving the e-mail (control mil) transmitted from the outside SMTP server, the outside POP server 13 records and stores it by mail address using the POP server application E1.

(3) The gateway device 20 regularly accesses the outside and office POP server 13 via the connection P3 and via the firewall 3, using the control mail reception application B1. Moreover, the gateway device 20 inquires whether or not there is an e-mail to self and captures it when there is the e-mail, and decides whether or not the e-mail is a control mail (when the header includes VPN connection request ID information, only the header is checked).

(4) When the e-mail to self is a control mail, the control mail reception application B1 in the gateway device 20 instructs the outside POP server 13 to delete the control mail. The authentication module B14 executes authentication via the connection P7 based on the ID and password of the captured control mail. When the authentication is correct, the control mail reception application B1 instructs the relay client application B2 to set the VPN connection P4 to the relay server application A2 to the IP address of the VPN connection request source (or PC 12). The relay client application B2 sets the VPN connection P4 to the relay server application A2 to the IP address of the VPN connection request source (PC 12) according to the instruction from the control mail reception application B1.

(5) When the VPN connection P4 is established, the relay server application A2 in the PC 12 relays the connection P5 and the VPN connection P4 and relays communication between the business client application A1 and the business server application C1 via the VPN connection P4. The relay client application B2 in the gateway device 20 relays the connection P6 and the VPN connection P4 and relays communication between the business server application C1 of the business server 23 and the business client application A1 via the VPN connection P4.

As a result, till the VPN connection P4 is cut, the PC 12 enables connection between the business applications of the business servers 23 in the intranet.

Figure 13:
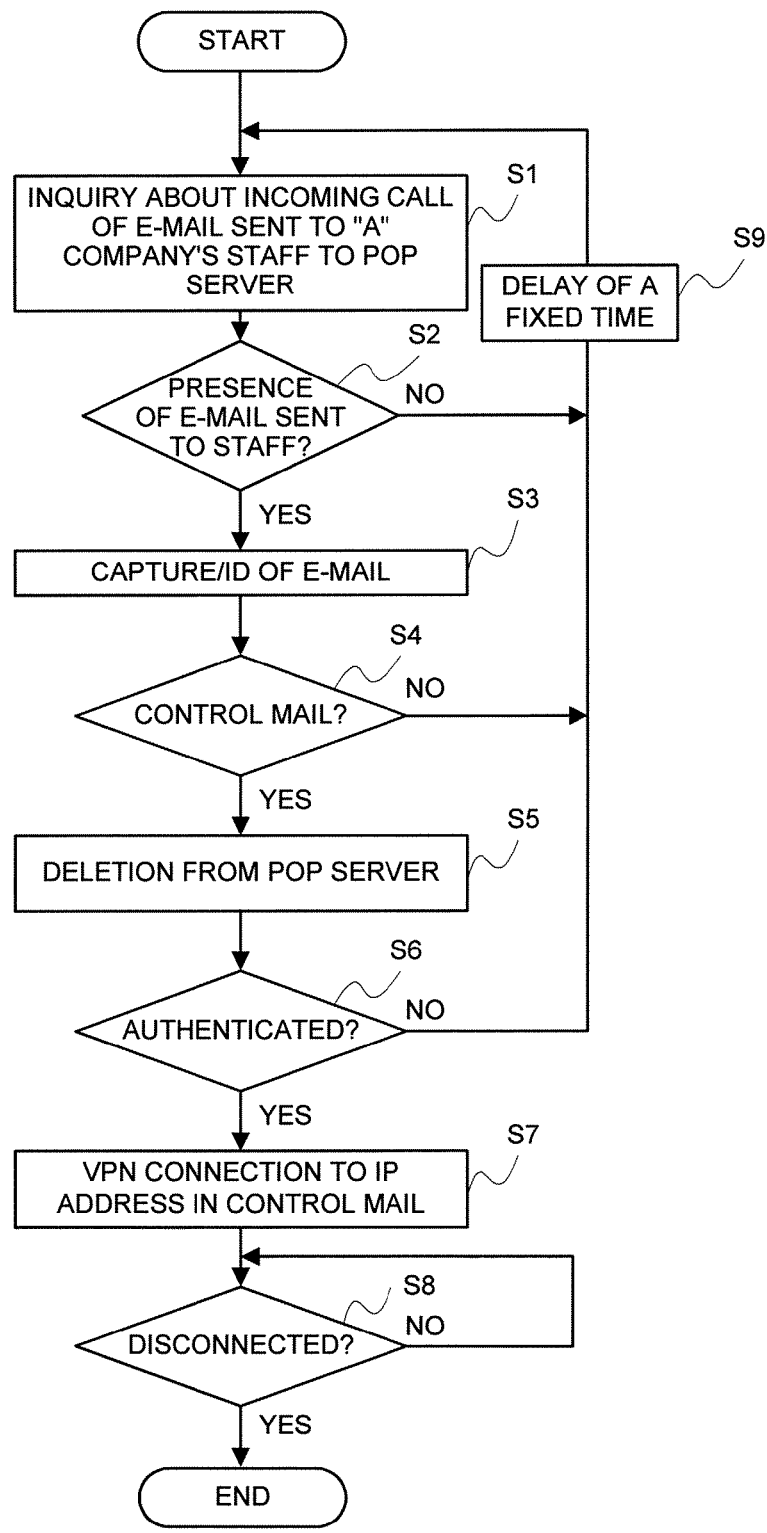
FIG. 13 shows an operational flowchart of a gateway device in the fifth embodiment.

FIG. 13 shows the operational chart of the gateway device 20 according to the fifth embodiment. The gateway device 20 inquires of the outside POP server 13 about whether or not there is an e-mail to self (a staff member of "A" company) (step S1). The gateway device 20 captures a list of the subjects (headlines) of the e-mail or the whole of e-mails when there is the e-mail (YES in step S2) and decides whether or not the e-mail is a control mail (steps S3 and S4). When the e-mail is a control mail (YES in step S4), the gateway device 20 deletes the control mail from the outside POP server 13 (step S5) and the authentication module B14 performs authorization based on the captured control mail (step S6). When the authentication is correct (YES in step S6), VPN connection is established to the IP address of the VPN connection request source based on the control mail (step S7). Thereafter, until the VPN connection is cut (step S8), the PC 12 enables connection between the business applications for the connection devices in the intranet. When there is not e-mails to self (a staff member of "A" company) in the step S2 (NO), when the e-mail is not a control mail in the step S4 (NO), and when authentication is not correct in the step S6 (NO), the inquiry operation in the step S1 is repeated after a fixed period of time (step S9).

As described above, VPN connection can be established between the Internet 1, or an external network, and the intranet 2, or an intra-network, without changing the setting of the firewall 3 and VPN-GW or without installing a relay server to the external network. Hence, VPN configuration can be simply performed through the e-mails advantageous in communication charge, without an approval procedure of the firewall administrator and without installation and use of the relay server. Particularly, the present embodiment can retain the security through authentication. Conventional means used for the exchange of e-mails may be utilized for the outside POP server 13 and the outside SMTP server 11, without any change. Conventional means for exchange of e-mails may be utilized for the account of the POP server 13, without any change. However, that is limited to the case where the firewall 3 is set such that the company authorizes access from the intranet 2 to the outside POP server 13.

Sixth Embodiment

Next, the example where the VPN connection for IP telephones is established between the information processing terminal and the gateway device by utilizing e-mails as access means will be explained below as a specific embodiment of the present invention.

(Explanation of Configuration)

Figure 14:
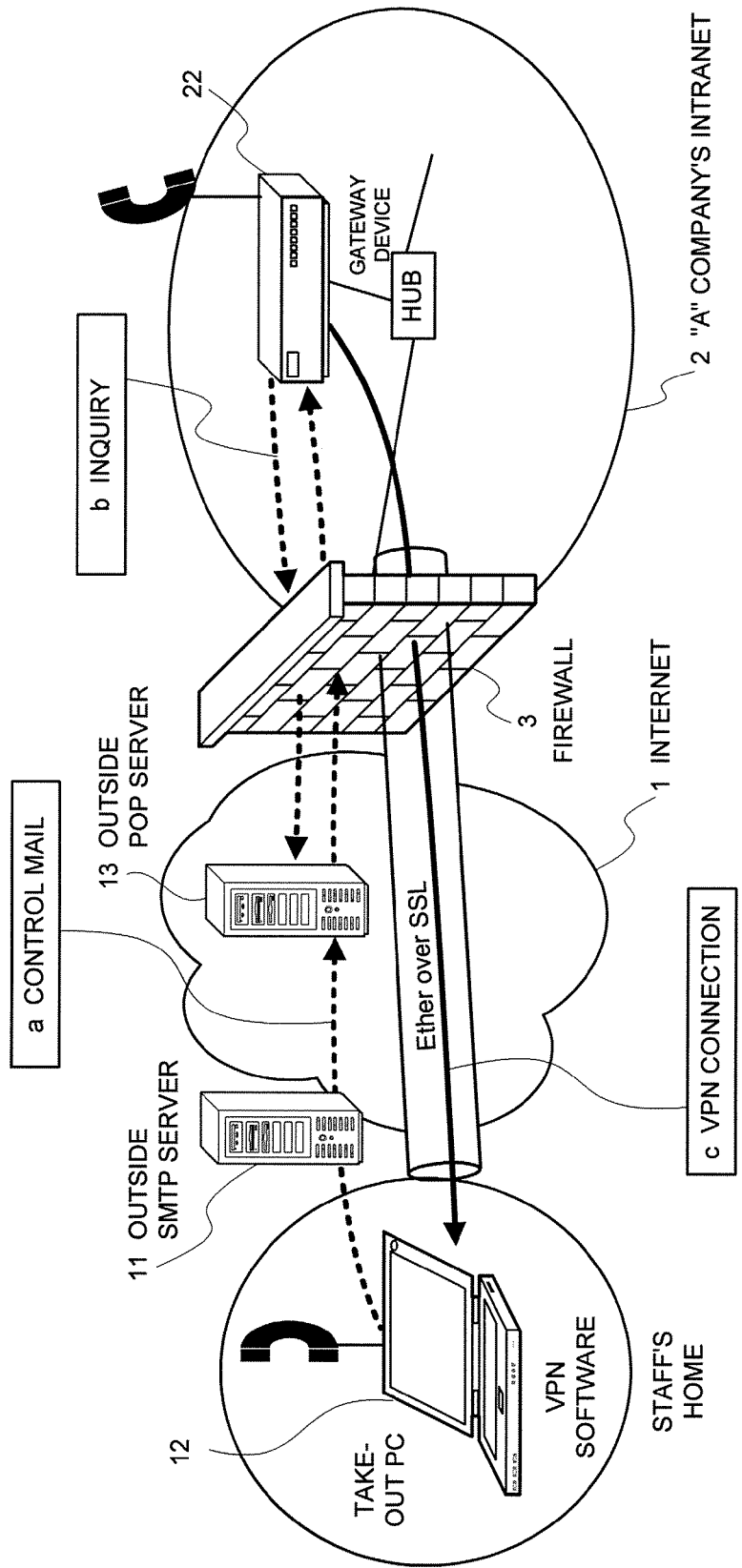
FIG. 14 is a diagram illustrates a network configuration according to a sixth embodiment of the present invention.

FIG. 14 is a network configuration according to the sixth embodiment of the present invention. The network configuration comprises the Internet 1, an intranet 2 of "A" company, and a firewall 3 disposed between the Internet 1 and the intranet 2. The intranet 2 includes the gateway device 22 connected to the firewall 3 via HUB and has a handset for an IP telephone to the Internet side. The Internet side includes an outside SMTP server 11 for e-mail transmission, an outside POP server 13 for e-mail reception, and a PC 12 with a handset, which is carried out by a staff member of "A" company.

The gateway device 22 with an IP telephone handset can be installed in any place within the intranet. Typically, a single gateway device 22 is installed for each staff member or plural staff members (of, for example, 2 to 50 or 2 to 100) in the office. In the use within the intranet, the PC 12 with an IP telephone handset is connected to the firewall 3 via HUB. In the use within the Internet (outside the Intranet 2), the gateway device 22 is connected to the firewall 3 in the intranet 2 via the HUB. Thus, the IP telephone can be constructed through the VPN connection between the PC 12 and the gateway device 22.

Figure 15:
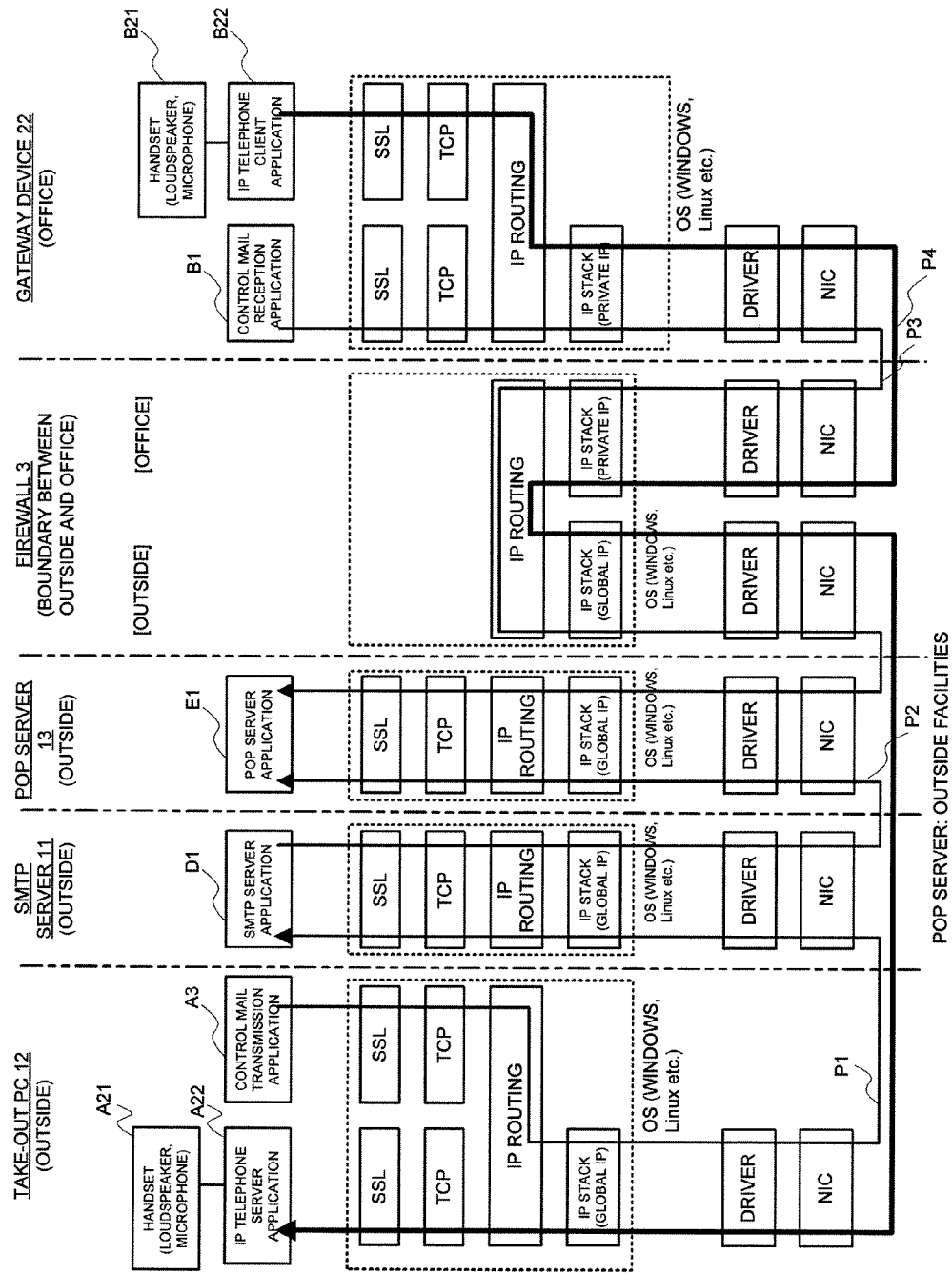
FIG. 15 shows software installed in each device in the sixth embodiment and a communication processing on a protocol.

FIG. 15 is a diagram illustrating a software installed in each device according to the present embodiment and a communication process on protocol.

According to the present embodiment, each of the PC 12, the gateway device 22, and the SMTP server 11, and the POP server 13, and the firewall 3 has a predetermined OS, an application realizing various functions, NIC of hardware for OS to OS communications, and a software driver.

FIG. 15 shows an example of establishing VPN connection for an IP telephone between the PC 12 and the gateway device 22 to perform IP telephone communications therebetween. The PC 12 is installed with the IP telephone server application A22 that receives audio from the telephone transmitter of the handset A21 or transmits audio to the telephone receiver of the handset A21. The gateway device 22 is installed with the IP telephone client application B22 for receiving audio from the telephone transmitter of the handset B21 or issuing audio to the telephone receiver of the handset B21. Both the IP telephone client application B22 and the IP telephone server application A22 are connected together through the VPN connection and exchanges audio data bi-directionally. Moreover, the PC 12 is installed with the control mail transmission application A3 realizing an e-mail transmission function, which is transmission/reception software for e-mails accessible from the Internet to the firewall. The gateway device 22 is installed with the control mail reception application B1 realizing an e-mail reception function, which is transmission/reception software for e-mails accessible from the Internet to the firewall.

In the present embodiment, the SMTP server 11, which is a mail server on the e-mail transmission side, is installed as an outside server. The POP server 13, which is a mail server on the e-mail reception side, is installed as an outside server. The SMTP server 11 is installed with the SMTP server application D1 as an application which realizes an e-mail transmission function. The POP server 13 is installed with the POP server application E1 as an application which realizes an e-mail reception function.

The present embodiment can employ the configuration similar to those in the above-mentioned embodiments, as software inside and outside OS. However, the IP stack of the PC 12 may include only the IP stack (global IP). The gateway device 22 does not require the bridge because the relay processing is unnecessary. In the explanation of the present embodiment, the configuration through the VPN connection for IP telephone based on the IP telephone server application A22 and the IP telephone client application B22 of the object application is set such that encryption is performed with the SSL protocol even inside and outside the company. However, encryption by SSL is not essential.

(Explanation of Operation)

Figure 16:
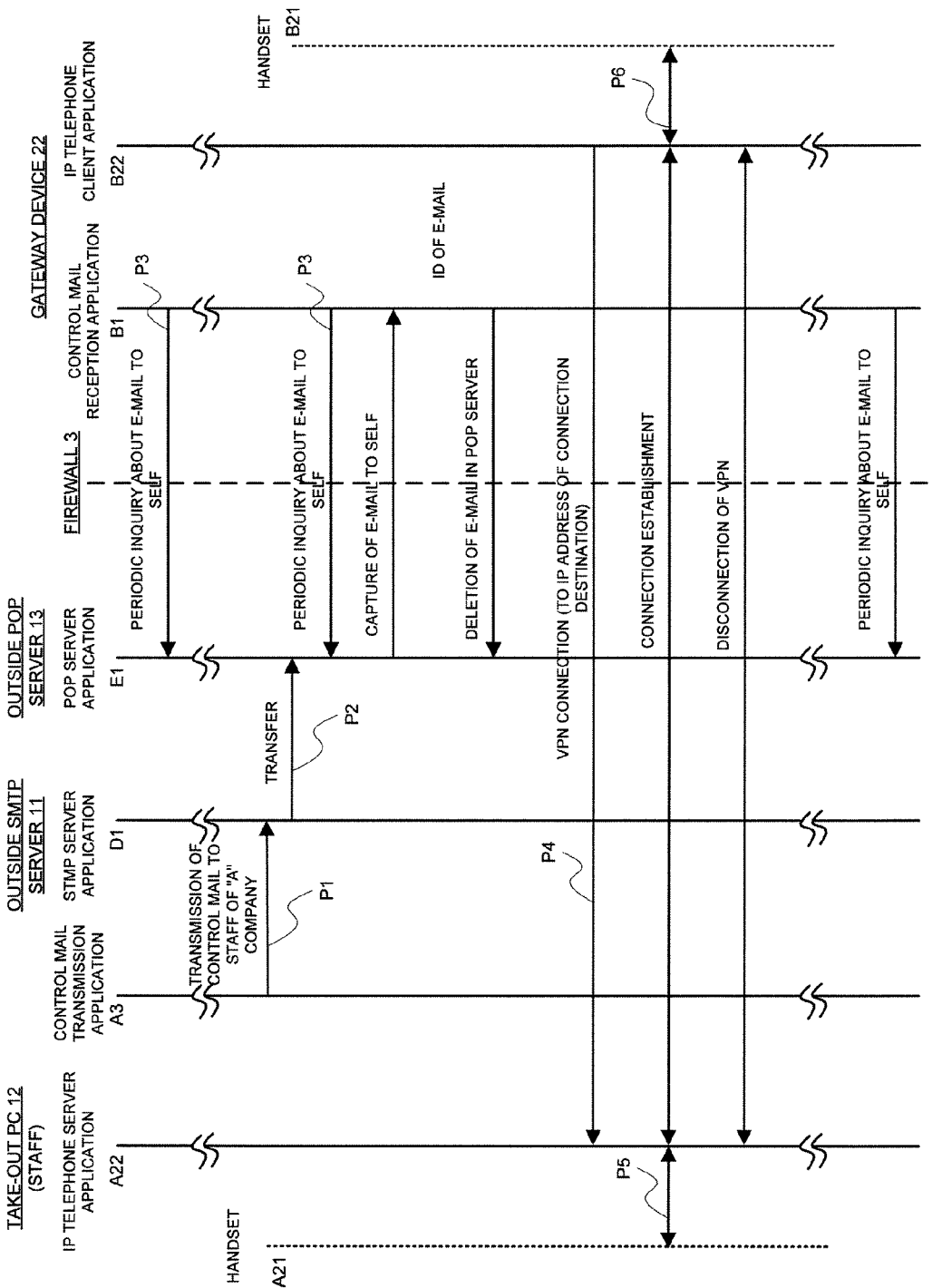
FIG. 16 shows an operational procedure in the sixth embodiment.

FIG. 16 is a diagram illustrating the procedure of the operation of the present embodiment. The operation of the embodiment will be explained below by referring to FIGS. 15 and 16.

(1) Using the control mail transmission application (e-mail transmission software) A3 of the PC 12, the staff member of the "A" company transmits a control mail to the mail address to the staff set to the POP server 13 via the outside SMTP server 11. The control mail includes ID information about a VPN connection request for IP telephone (for example, ID information about a VPN connection request for the Intranet relay like the fourth embodiment may be added to the header) to distinguish from common e-mails. Necessary information for VPN connection by IP telephone from the intranet side to the PC 12, such as the IP address of the PC 12, is added to the control mail. This mail first is transferred to the SMTP server application D1 through the connection P1.

(2) The outside SMTP server 11 receives the control mail through the connection P1 using the STMP server application D1. By referring to the header information, the outside SMTP server 11 transfers the control mail to the outside POP server 13 through the connection P2. When receiving the e-mail (control mail) transmitted from the outside SMTP server, the outside POP server 13 records and stores it by mail address using the POP server application E1.

(3) The gateway device 22 regularly accesses the outside or office POP server 13 through the connection P3 and the firewall 3 using the control mail reception application B1, inquires whether or not the e-mail to self has arrived, and captures the e-mail when there is the e-mail. The gateway device 22 decides whether or not the e-mail is a control mail (only the header is checked when ID information about a VPN connection request is added to the header).

(4) When the e-mail is a control mail, the control mail reception application B1 in the gateway device 22 instructs the outside POP server 13 to delete the control mail and instructs the IP telephone client application B22 to set the VPN connection P4 to the relay server application A2 to the IP address of the VPN connection request source (PC 12). Based on the control mail captured by the instruction from the control mail reception application B1, the IP telephone client application B22 sets the VPN connection P4 for IP telephone with the IP telephone server application A22, to the IP address of an IP telephone VPN connection request source (PC 12).

(5) When the VPN connection P4 for the IP telephone is established, the PC 12 processes telephone calls by the handset A21 (P5), using the IP telephone server application A22. Using the IP telephone client application B22, the gateway device 22 processes telephone calls by the handset B21 (P6). Thus, till the VPN connection for IP telephone is cut, communications between the handsets A21 and B21 can be established.

Figure 17:
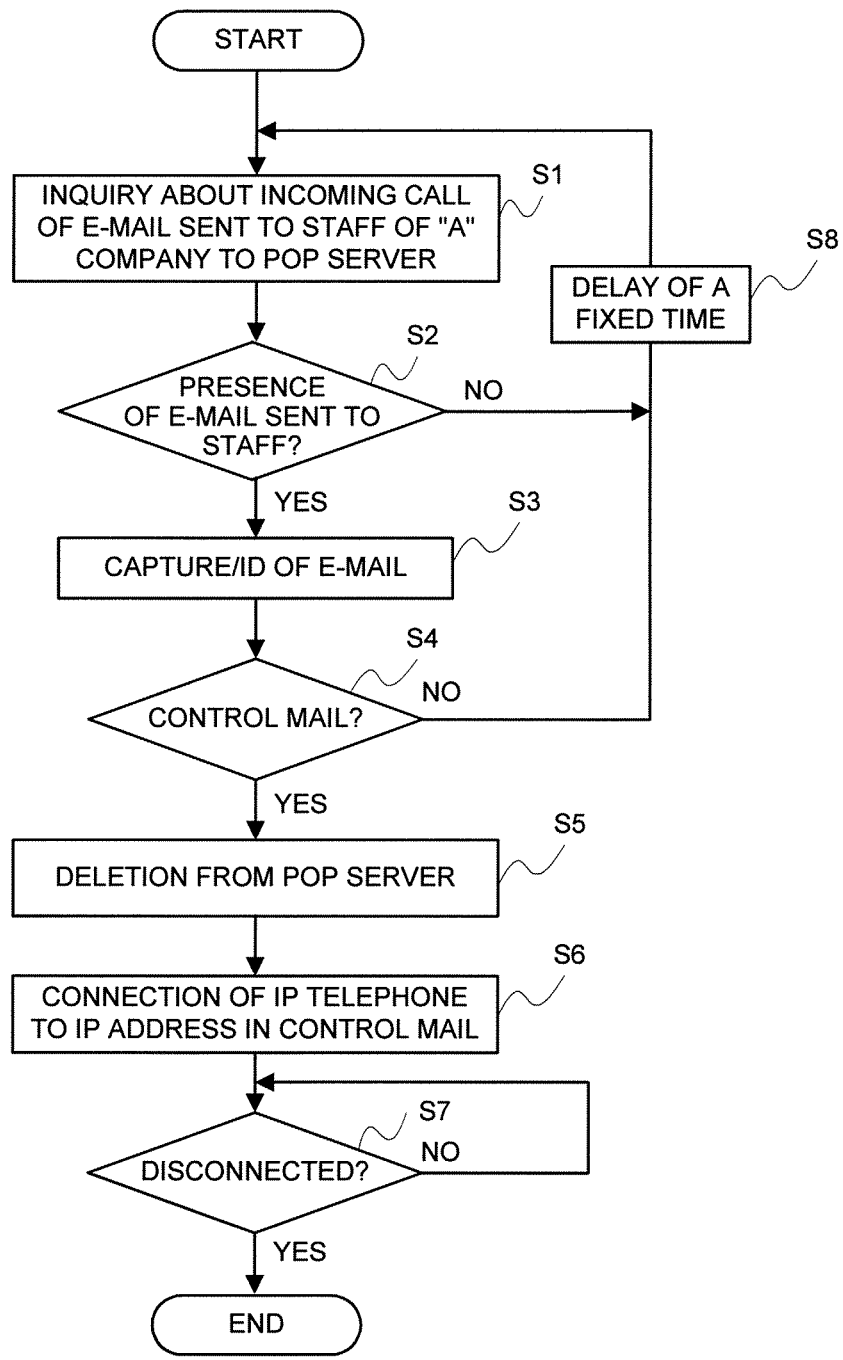
FIG. 17 shows an operational flowchart of a gateway device in the sixth embodiment.

FIG. 17 is an operational flowchart of the gateway device in the sixth embodiment. The gateway device 22 inquires whether or not the outside POP server 13 has received e-mail to self (the staff member) (step S1). The gateway device 22 captures a list of subjects (headlines) of e-mails or the whole of the e-mail when the e-mail has arrived (YES in step S2), and decides whether or not the e-mail is a control mail (steps S3 and S4). When the e-mail is a control mail (YES in step S4), the gateway device 22 deletes the e-mail from the office POP server 21 (step S5) and establishes the VPN connection for IP telephone to the IP address of a VPN connection request source, based on the control mail (S6). Until the VPN connection for IP telephone, established, is cut (step S7), an IP telephone call can be established between the handset B22 of the gateway device 22 and the handset A21 on the PC 12. When e-mail to self (the staff member of "A" company) does not exist in the step S2 (NO) and is not a control mail in the step S4 (NO), the inquiry operation in the step S1 is repeated again after a fixed period of time (step S8).

As described above, the VPN connection for IP telephone can be established between the Internet 1, or an external network, and the intranet 2, or an office network, without changing the setting of the firewall 3 and the VPN-GW or without installing the relay server in the external network. For that reason, the VPN connection for IP telephones can be simply established using e-mails advantageous in communication charge, without being involved in difficulties such as the approval procedure of a firewall administrator and the installation and use of the relay server. Servers for the exchange of common e-mails may be utilized as the outside POP server 13 or the outside SMTP server 11, without any change. An account for the exchange of common e-mails may be utilized as the account of the POP server 13, without any change. However, this is limited to only the case where the company sets the firewall 3 to permit an access from the intranet 2 to the outside POP server 13.

In the embodiment of the VPN connection for IP telephones, an authentication module is disposed to the gateway device 22, in a manner similar to that in the fifth embodiment (FIG. 10). An IP address is added to the control mail from the PC 12. For the purpose of authentication by the authentication module, information, such as ID and password, necessary for authentication on the "A" company's intranet side is added to the control mail. Thus, the authentication module can implement authentication to sustain the security.

Seventh Embodiment

In the specific embodiment described above, the case where the POP server is disposed outside the company will be explained below. However, the POP server may be disposed in the office. In such an embodiment, the example where the gateway device has an authentication function will be explained below. (Even when the POP server is disposed in the office, the authentication function of the gateway device is not essential and the gateway device is operable with no authentication function.)

A specific embodiment of the present invention will be explained below. The network configuration has the POP server disposed inside the company. E-mails are utilized as access means and the VPN connection is established between the information processing terminal and the gateway device, which has an authentication function.

(Explanation of Configuration)

Figure 18:
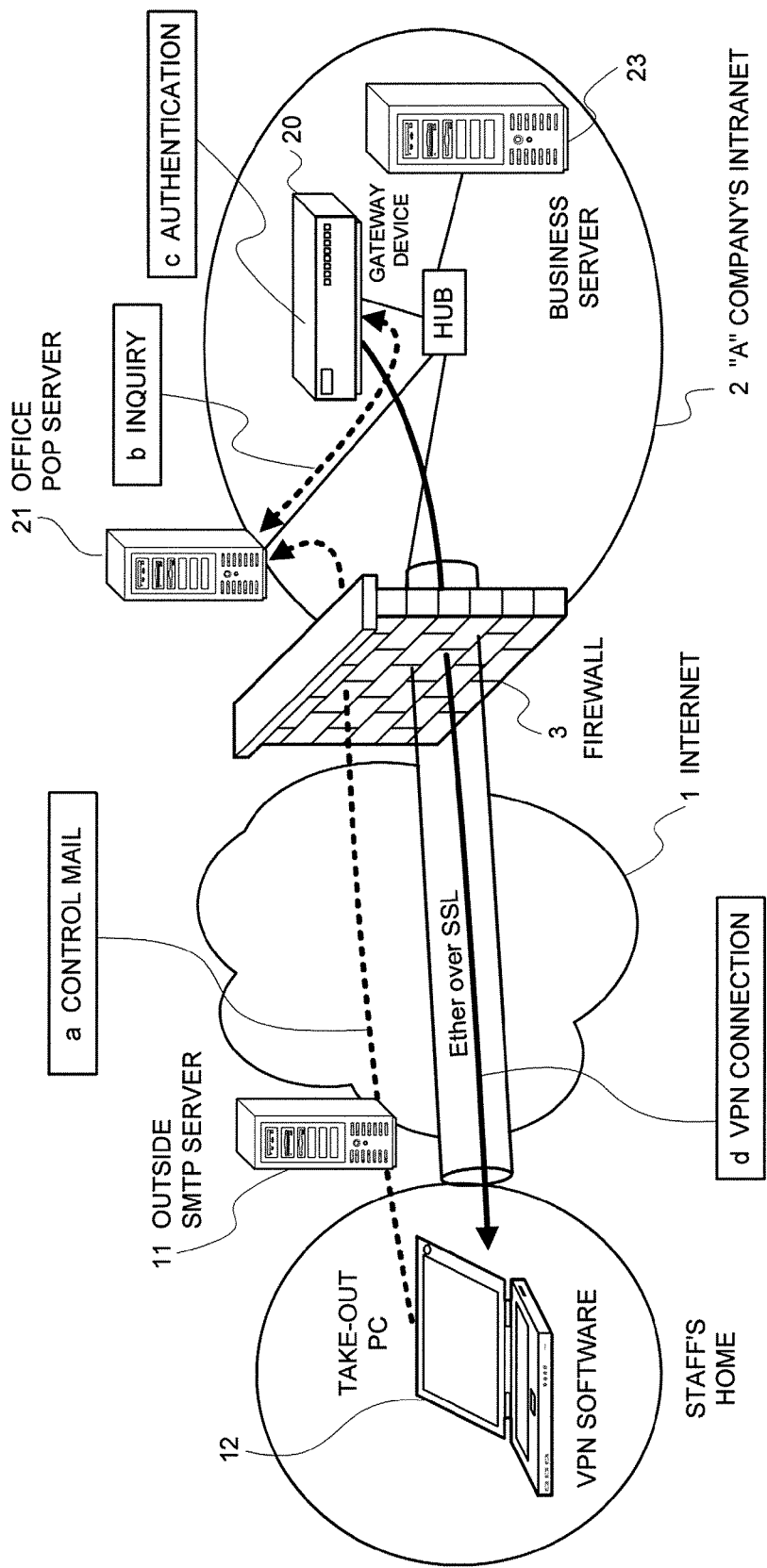
FIG. 18 is a diagram illustrating a network configuration (Internet) according to a seventh embodiment of the present invention.

FIG. 18 is a diagram illustrating a network configuration according to the seventh embodiment of the present invention. The network configuration comprises the Internet 1, an intranet 2 of "A" company, and a firewall 3 disposed between the Internet 1 and the intranet 2. The intranet 2 includes an office POP server 21 connected to the firewall 3 via HUB, a gateway device 20, connected to HUB, which has an authentication function for VPN connection to the Internet, and a business server 23 connected to the gateway device 20 via HUB. The internet 1 includes an outside SMTP server 11 and a PC 12 taken out by a staff member of "A" company.

The gateway device 20 may be installed in any place within the Intranet. Typically, a single gateway device is installed for each staff member or plural staff members (of, for example, 2 to 50 or 2 to 100) in the office. Each user (a staff member) can set an authentication function to each gateway device 20 and can set the ID and password for authentication to access from the PC 12. In the use in "A" company's intranet, the PC 12 is user with the firewall 3 and the business server 23 connected via HUB. In the use on the Internet 1 (outside the intranet 2), the gateway device 20 is connected to the firewall 3 and the business server 23 in the intranet via HUB. Thus, the VPN connection between the PC 12 and the gateway device 20 is established and enables communications by relay.

Figure 19:
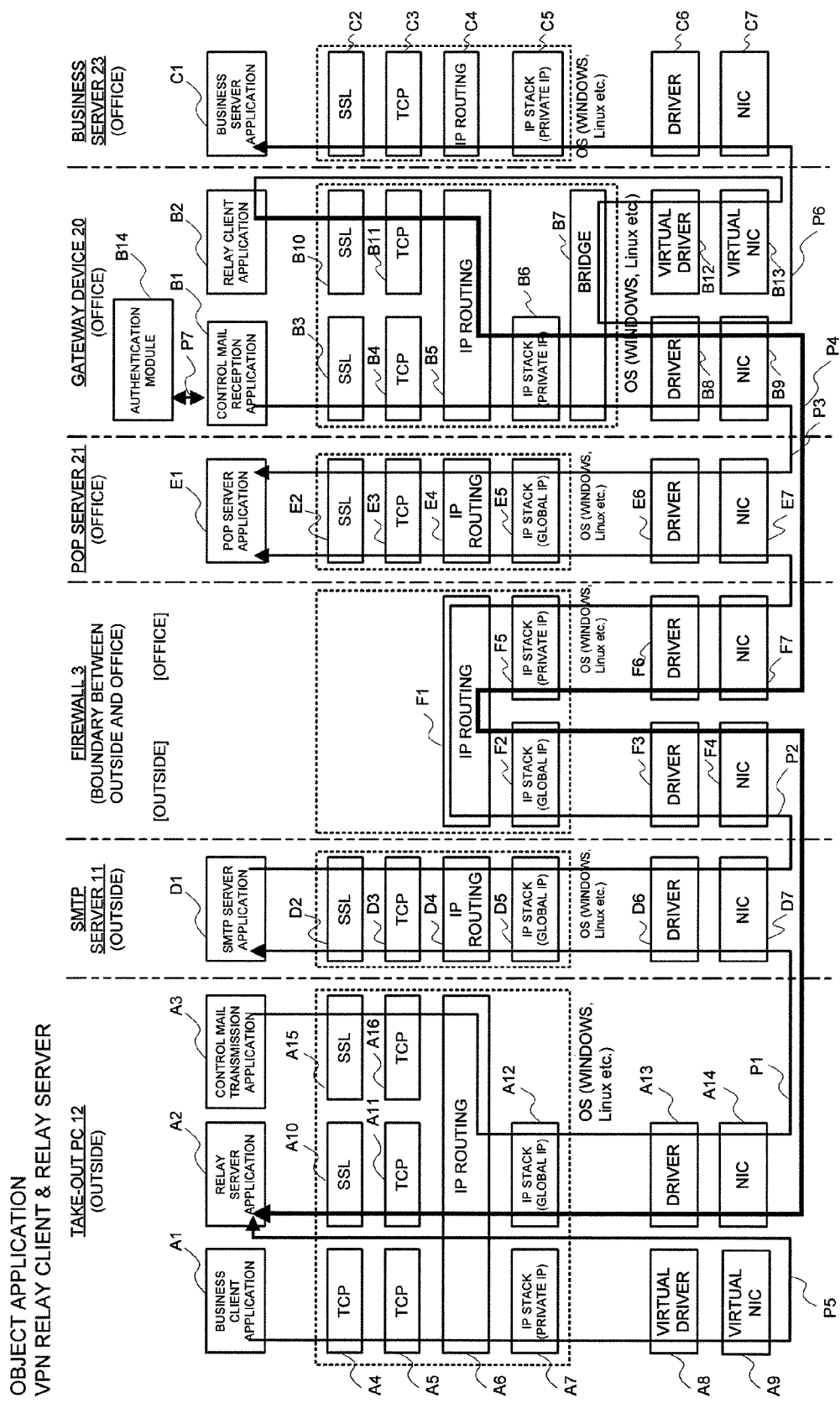
FIG. 19 is a diagram showing software installed in each device in the seventh embodiment and a communication processing on a protocol.

FIG. 19 is a diagram illustrating software installed in each device and a communication process on a protocol, according to the present embodiment.

In the present embodiment, each of the PC 12, the gateway device 20, the SMTP server 11, the POP server 21, the business server 23, and the firewall 3 includes a predetermined OS, an application realizing various functions, NIC of hardware for communications between OSs, a software driver, and a virtual driver and a virtual NIC. The gateway device 20 includes an authentication module B14 realizing the authentication function in response to an access by an e-mail from the PC 12.

FIG. 19 shows an example where VPN connection between the PC 12 and the gateway device 20 is established after authentication and the office business communication process is performed between the PC 12 and the business server 23. The PC 12 is installed with the business client application A1 for the in-house works. The business server 23 is installed with the corresponding business server application C1. The PC 12 is installed with the control mail transmission application A3 realizing an e-mail transmission function enabling access from the Internet to the firewall and the relay server application A2 realizing a relay function to the business client application A1. The gateway device 22 is installed with the control mail reception application B1 realizing the e-mail reception function and the relay client application B2 realizing a relay function to the business server application C1.

The business client application A1 communicates with the business server application C1 bi-directionally. Typically, the WEB browser software is applied to the business client application A1. In this case, the WEB server application is applied to the business server application C1. Moreover, various applications, including TELNET client software, FTP client software, accounting client software, file shared client software, database client software, and others, are applicable to the business client application A1. In this case, the business server application C1 corresponds to the business client application A1. TELNET server software, FTP server software, accounting server software, file shared server software, database server software, and others are applicable to the business server application C1.

The relay server application A2 performs the following operation.

(1) The relay server application A2 carries a frame arriving from the virtual NIC A9 as data over the communication through the VPN connection P4 between the relay server application A2 and the relay client application B2 and then transfers it to SSL A10.

(2) The SSL A10 transfers data arrived over communication via the VPN connection P4 as a frame to the virtual NIC A9.

(3) The relay server application A2 receives the instruction for connection waiting of communication through the VPN connection P4 using the control mail transmission application A3 and informs the control mail transmission application A3 after a completion of connection.

(4) The relay server application A2 receives the instruction for disconnection of communication through the VPN connection P4 using the control mail transmission application A3 and transmits a disconnection signal to the relay client application B2.

The operation of the control mail transmission application A3 is as follows:

(1) When receiving a connection instruction from a user, the control mail transmission application A3 creates and transmits a control mail for a connection request and hands over it to SSL A15. This mail is transferred to the SMTP server application D1 via the connection P1. At the same time, the control mail transmission application A3 issues a connection waiting instruction to the relay server application A2 to maintain the waiting of the communication through the VPN connection P4.

(2) When receiving a disconnection instruction from a user, the control mail transmission application A3 issues the disconnection instruction to the relay server application A2.

The SMTP server application D1 has the function of transferring arrived e-mails to a suitable SMTP server or POP server in accordance with the SMTP (Send Mail Transfer) protocol. Referring to FIG. 19, the SMTP server D1 transfers e-mails directly to the POP server E1. However, other SMTP server may be installed between the servers D1 and E1 and the e-mail may arrive at the POP server E1 after several transfer operations. Referring to FIG. 19, the SMTP server application D1 refers to the destination mail address of an e-mail arrived from the control mail transmission application A3 through the connection P1 and transfers them to POP server E1 through the connection P2.

The operation of the POP server application E1 is as follows:

(1) The POP server application E1 saves e-mails received from the SMTP server D1 through the connection P2.

(2) When the control mail reception application B1 requires a stored e-mail list through the connection P3, the POP server application E1 transfers it through the connection P3.

(3) When a reception request for part of a specified e-mail is received from the control mail reception application B1 through the connection P3, the POP server application E1 transfers the specified e-mail through the connection P3.

(4) When a deletion request for part of a specified e-mail is received from the control mail reception application B1 through the connection P3, the POP server application E1 deletes the specified e-mail.

(5) When a batch reception request for all stored e-mails is received from the control mail reception application B1 through the connection P3, the POP server application E1 transfers all the saved e-mails through the connection P3.

(6) When a batch deletion request for all stored e-mails is received from the control mail reception application B1 through the connection P3, the POP server application E1 deletes all the saved e-mails.

The operation of the control mail reception application B1 is as follows:

(1) The control mail reception application B1 regularly requests the POP server application E1 to send a list of stored e-mails through the connection P3. When there is the control mail in the list, the control mail reception application B1 issues a control mail reception request to the POP server application E1 through the connection P3, in response to a request for reception of part of a specified e-mail. At the same time, the control mail reception application B1 deletes the control mail, in response to a request for deleting part of the specified e-mail.

(2) The authentication module B14 executes authentication via the connection P7 based on authentication information such as ID and password included in the control mail. When the authentication is correct, the control mail reception application B1 instructs the relay client application B2 to set communication to the destination (the relay server application A2 in FIG. 19) included in the control mail through the VPN connection P4 based on a connection request in the control mail.

The operation of the relay client application B2 is as follows:

(1) The relay client application B2 receives the connection instruction from the control mail reception application B1 and sets communication through the VPN connection P4 to the destination (A2 in FIG. 19) included in the connection instruction.

(2) The relay client application B2 carries the frame arriving from the virtual NIC B13 as data over communication through the VPN connection P4 between the relay server application A2 and the relay client application B2 and transfers it to the SSL B10.

(3) The relay client application B2 transfers data arriving over communication through the VPN connection P4 from the SSL B10 as a frame to the virtual NIC B13.

(4) When receives a disconnection signal through the VPN connection P4 using the relay server application A2, the relay client application B2 ends the communication through the VPN connection P4 and informs the control mail reception application B5 of the end of communication.

The business server application C1 communicates with the business client application A1 bi-directionally. Typically, WEB server application is applied to the business server application C1. The business server application C1 corresponds to the business client application A1. Various applications including TELNET server software, FTP server software, accounting server software, file shared server software, database server software, and the like, are applicable to the business server application C1.

According to the present embodiment, the SMTP server 11 is included with the SMTP server application D1 as an application realizing an e-mail transmission/reception function. The POP server 21 is included with the POP server application E1 as an application realizing an e-mail transmission/reception function. A mail news server, a DNS server, a SIP server, a bulletin board (WWW) server, and a FTP server are applicable to the office server 21, so long as the firewall 3 does not limit access from the outside of the company. In this case, the corresponding outside server 11 may be replaced with the mail news server, the DNS server, or the SIP server, or the PC 12 directly accesses the office server 21.

As shown in FIG. 19, the software itself, inside and outside OS of the present embodiment, is similar to that in other embodiments. In the gateway device 20, the control mail reception application B1 extracts ID and password stored in the control mail when the control mail is captured. The authentication module B14 performs the authentication function with ID and password predetermined by the user. These functions are similar to those in the fifth embodiment.

(Explanation of Operation)

Figure 20:
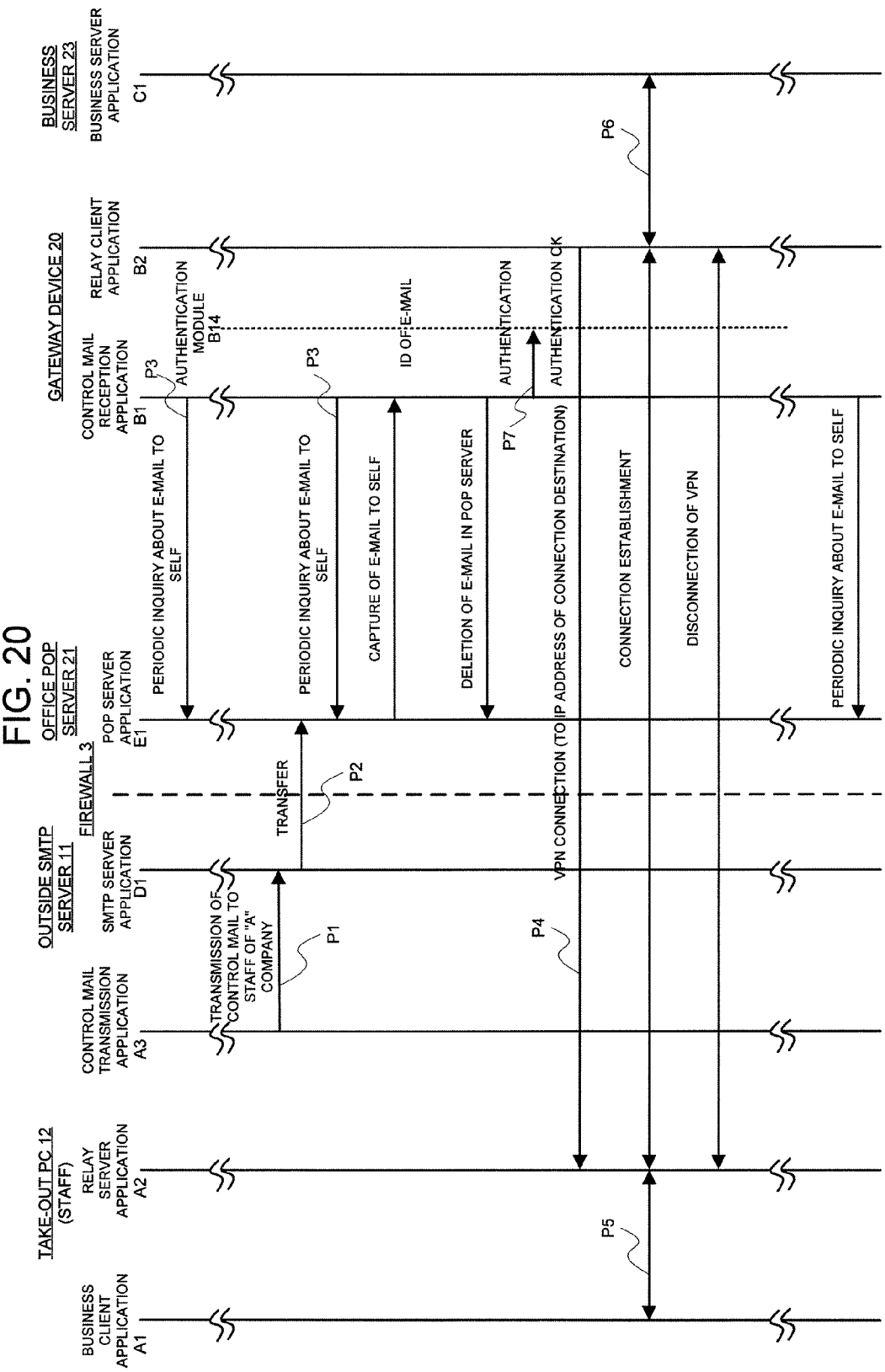
FIG. 20 shows an operational procedure in the seventh embodiment.

FIG. 20 is a diagram illustrating the operational procedure according to the embodiment. The operation of the present embodiment will be explained below by referring to FIGS. 19 and 20.

(1) Using the control mail transmission application (e-mail transmission software) A3 of the PC 12 carried out by a staff member of "A" company, the staff member transmits a control mail to the mail address set to the POP server 21 via the outside SMTP server 11. The control mail includes ID information for VPN connection request (for example, the header may be include the VPN connection request ID information), to distinguish from ordinary e-mails. Information necessary for authentication on the intranet side, such as IP address, ID and password of the PC 12, and for VPN connection from the Intranet side to the PC 12 are added to the control mail. That mail is first transferred to the SMTP server application D1 through the connection P1.

(2) The outside SMTP server 11 receives the control mail through the connection P1 using the SMTP server application D1, refers to the header information, and transfers the control mail to the office POP server 21 through the connection P2.

When receiving the e-mail (a control mail) transmitted from the outside SMTP server, the office POP server 21 records and stores the e-mail (a control mail) by mail address, using the POP server application E1.

(3) The gateway device 20 regularly accesses the office POP server 21 through the connection P3 and the firewall 3, using the control mail reception application B1, inquires whether or not there is a received e-mail to self, captures the e-mail when there is the arrived e-mail, and decides whether or not the e-mail is a control mail. (When the header includes information for VPN connection request identification, only the header is checked).

(4) When the e-mail is a control mail, the control mail reception application B1 in the gateway device 20 instructs the office POP server 21 to delete the control mail and authentication module B14 performed authentication through the connection P7 based on the ID and password of the captured control mail. When the authentication is correct, the control mail reception application B1 instructs the relay client application B2 to set the VPN connection P4 to the relay server application A2 to the IP address of the VPN connection request source (PC 12). The relay client application B2 sets the VPN connection P4 to the relay server application A2 to the IP address of the VPN connection request source (PC 12) in accordance with the instruction from the control mail reception application B1.

(5) When the VPN connection P4 is established, the relay server application A2 in the PC 12 relays the connection P5 and the VPN connection P4. The communication between the business client application A1 and the business server application C1 is relayed via the VPN connection P4. In the gateway device 20, the relay client application B2 relays the connection P6 and the VPN connection P4 and relays communications between the business server application C1 of the business server 23 and the business client application A1 through the VPN connection P4.

As a result, till the VPN connection P4 is cut, communication can be established between the business application of the PC 12 and the business application connection to the business server 23 in the intranet.

Figure 21:
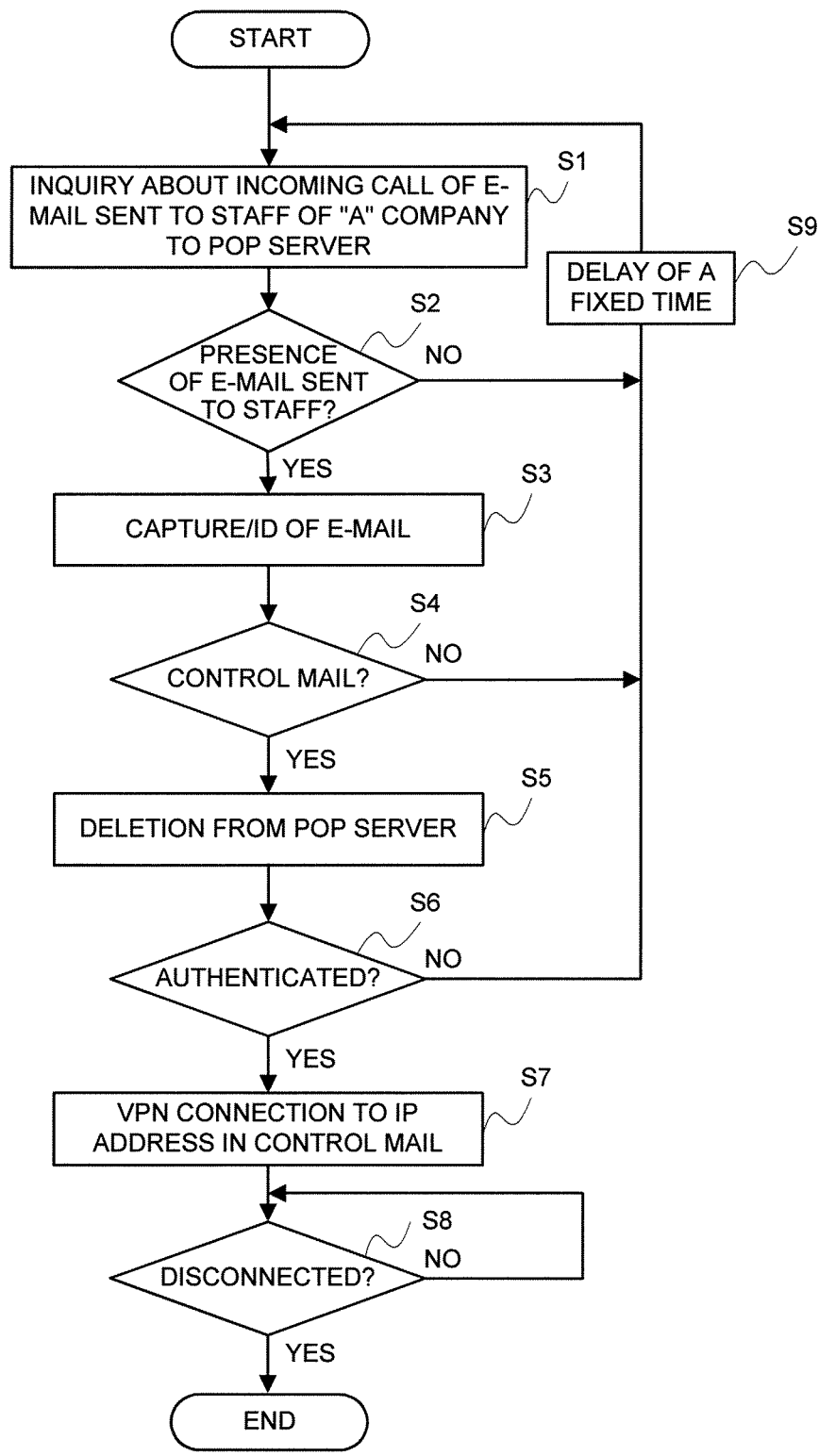
FIG. 21 shows an operational flowchart of a gateway device in the seventh embodiment.

FIG. 21 is a diagram illustrating the operational flowchart of the gateway device 20 according to the seventh embodiment. The gateway device 20 inquires of the office POP server 21 whether or not an e-mail to self (of a staff member of "A" company) has received (step S1). The gateway device 20 captures a list of subjects (headlines) of e-mails or the whole of e-mails when there is the arrived e-mail (YES in step S2), and decides whether or not the e-mail is a control mail (steps S3 and S4). When the e-mail to self is a control mail (YES in step S4), the gateway device 20 deletes the control mail from the office POP server 21 (step S5) and the authentication module B14 performed authentication based on the captured control mail (step S6). When the authentication is correct (YES in step S6), VPN connection is established to the IP address of the VPN connection request source based on the control mail (S7). Until the VPN connection established is disconnected (step S8), the PC 12 enables communications between the business application of the PC 12 and the business applications of the business server 23 in the intranet. When an e-mail to self (to the staff member) does not exist in the step S2 (NO), when an e-mail is not a control mail in the step S4 (NO), or when authentication proves illegal in the step S6 (NO), the inquiry operation in the step S1 is repeated after a fixed period of time (step S9).

As described above, VPN connection between the Internet 1, or an outside network, and the intranet 2, or an intra network, can be established without changing of the setting of the firewall 3 or the VPN-GW or without installing the relay server in the outside network. Hence, VPN connection can be simply constructed with e-mails advantageous in communication charges, without involving the difficulty in the approval procedure of a firewall administrator or in the installation and use of the relay server. Moreover, the security can be reserved by authentication. The conventional server used for exchange of e-mails may be utilized, without any change, as the office POP server 21 or the outside SMTP server 11. The conventional account used for exchange of e-mails may be utilized, without any change, as the account of the POP server 21. This embodiment may be utilized in the case where the POP server 21 is installed inside the company and the firewall 3 is set so as to authorize connection for mail transfer from the SMTP server 11 to the office POP server 21.

Eighth Embodiment

Next, a network configuration, including a POP server is installed in an intra network, will be explained below as a specific embodiment of the present invention. In this embodiment, an e-mail is utilized as access means and VPN connection for IP telephone is established between the information processing terminal and a gateway device having an authentication function.

(Explanation of Configuration)

Figure 22:
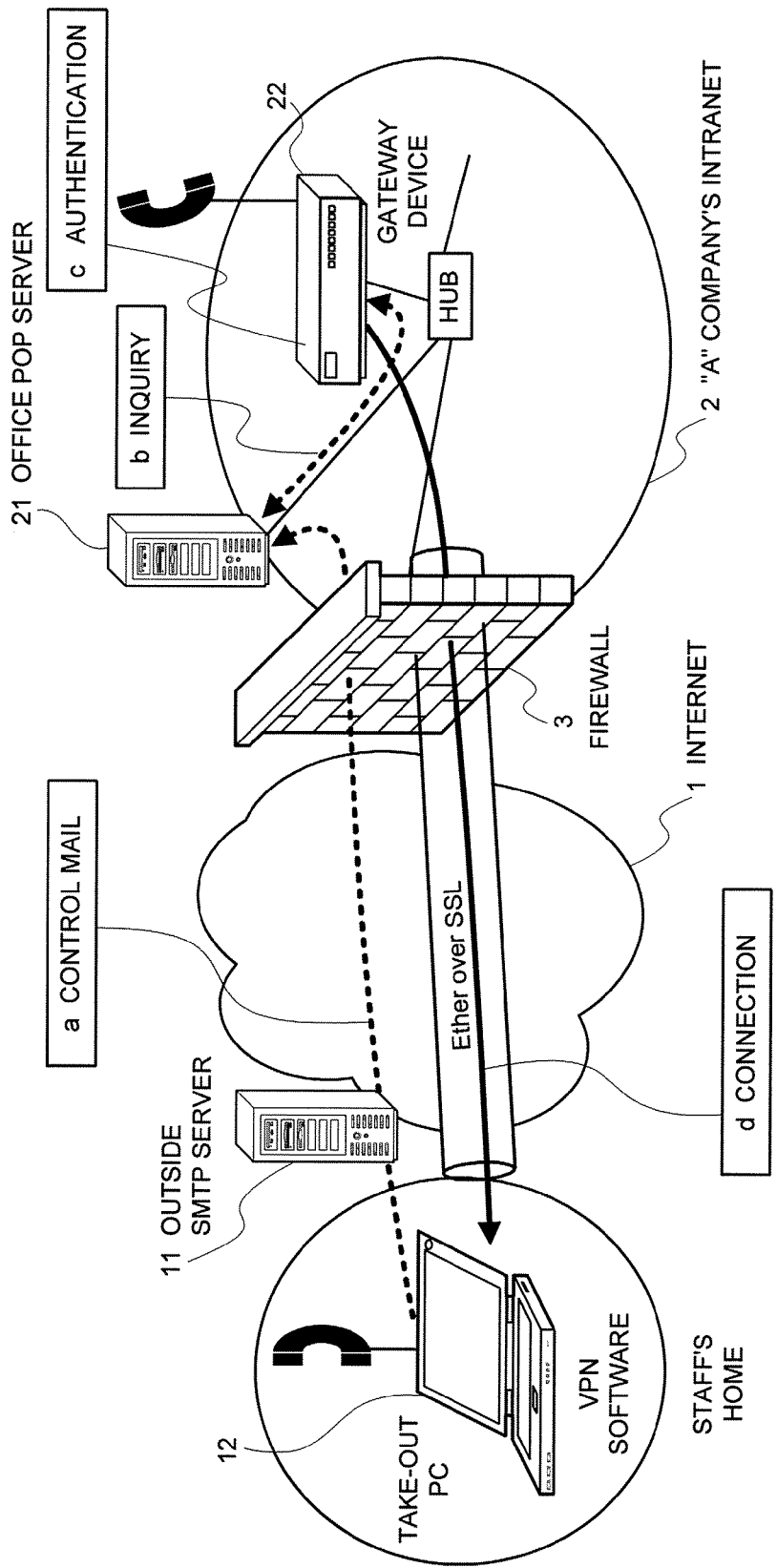
FIG. 22 is a diagram illustrating a network configuration according to an eighth embodiment of the present invention.

FIG. 22 is a diagram illustrating a network configuration according to the eighth embodiment of the present information. The network configuration comprises the Internet 1, an intranet 2 of "A" company, and a firewall 3 installed between the Internet 1 and the intranet 2. The intranet 2 includes an office POP server 21 for e-mail reception connected via the firewall 3 and the HUB and a gateway device 22 having the handset for an IP telephone to the Internet side. The Internet side includes an outside SMTP server 11 for e-mail transmission and a PC 12 having the handset of a staff member of "A" company.

The gateway device 22 having the handset of an IP telephone may be installed in any place of the intranet. Typically, a single gateway device 22 is installed for each staff member or plural staff members (of, for example, 2 to 50 or 2 to 100) in the office. When being used in the intranet, the PC 12, having the handset of an IP telephone, is connected to the firewall 3 via the HUB. When the PC 12 is used on the Internet (or outside the intranet 2), the gateway device 22 is connected to the firewall 3 of the intranet 2 via HUB. Thus, IP telephones can be used through the VPN connection for IP telephone between the PC 12 and the gateway device 22.

Figure 23:
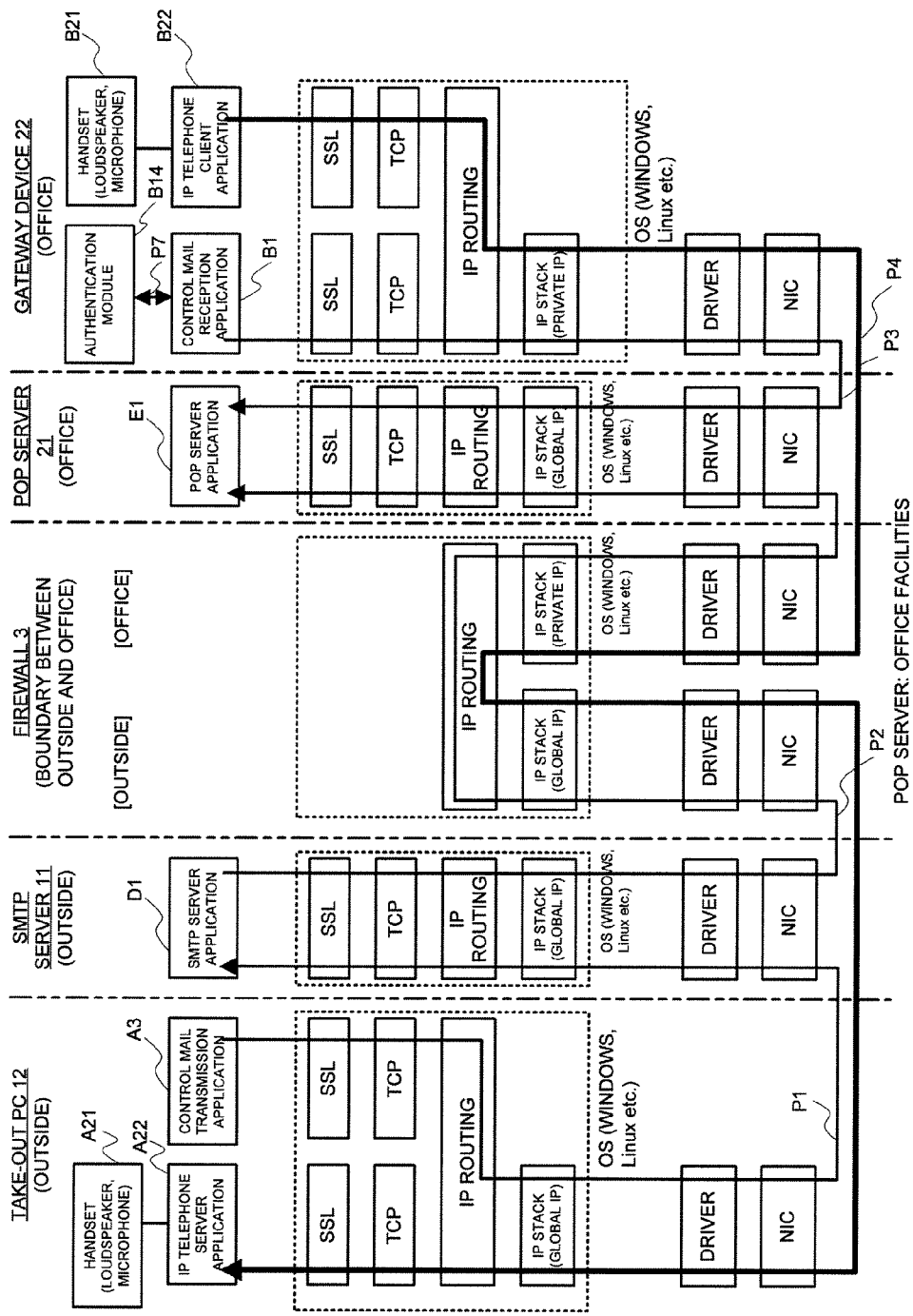
FIG. 23 is a diagram illustrating software installed in each device of the eighth embodiment and a communication processing on a protocol.

FIG. 23 is a diagram illustrating software installed in each device according to the present embodiment and the communication process on a protocol.

According to the present embodiment, each of the PC 12, the gateway device 22, the SMTP server 11, the POP server 21, and the firewall 3 includes a predetermined OS, an application realizing various functions, NIC of hardware for communication between OSs, a software driver, a virtual driver, and a virtual NIC.

FIG. 23 shows the example where VPN connection for an IP telephone is established between the PC 12 and the gateway device 22 having an authentication function and communication between the PC 12 and the gateway device 22 by an IP telephone is established. The PC 12 is installed with the IP telephone server application A22 that receives audio from the telephone transmitter of the handset A21 and outputs audio to the telephone receiver thereof. The gateway device 22 is installed with the IP telephone client application B22 that receives audio from the telephone transmitter of the handset B21 and outputs audio to the telephone receiver thereof.

The IP telephone client application B22 and the IP telephone server application A22 are connected together through the VPN connection to communicate audio data bi-directionally. The PC 12 is installed with the transmission/reception software for e-mails enabling access from the Internet to the firewall, or the control mail transmission application A3 realizing an e-mail transmission function. The gateway device 22 is installed with the transmission/reception software for e-mails enabling access from the Internet to the firewall, or the control mail reception application B1 realizing an e-mail reception function.

In the present embodiment, the SMTP server 11, acting as a mail server, on the e-mail transmission side, is installed as an outside server. The SMTP server 11 is installed with the SMTP server application D1 realizing an e-mail transmission function. The POP server 21, acting as a mail server, on the e-mail reception side, is installed as an office server. The POP server 21 is installed with the POP server application E1 realizing an e-mail reception function.

The present embodiment may employ a configuration similar to those in the above mentioned embodiments, as OS or software other than OS. However, the IP stack of the PC 12 can be managed with only the IP stack (global IP). The gateway device 22 does not require the relay process and hence omits the use of the bridge. In the present embodiment, the configuration is described that performs communication through the VPN connection for IP telephone based on the IP telephone server application A22 and the IP telephone client application B22 of the object application. That configuration is set such that encryption is performed with the SSL protocol outside and inside the company. However, the encryption by SSL is not needed necessarily.

(Explanation of Operation)

Figure 24:
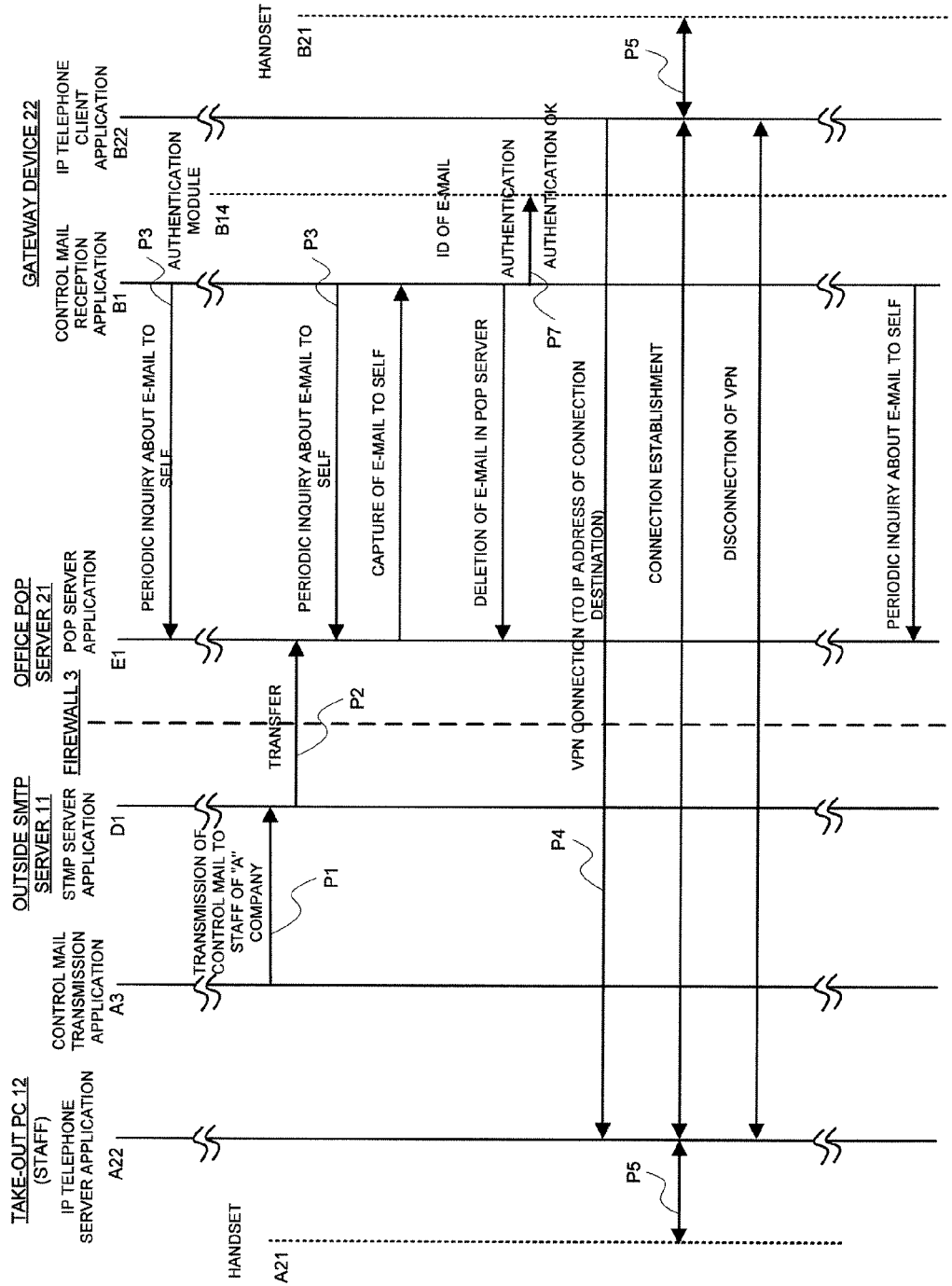
FIG. 24 shows an operational procedure in the eighth embodiment.

FIG. 24 is a diagram illustrating the procedure of operation of the present embodiment. The operation of the embodiment will be explained below by referring to FIGS. 23 and 24.

(1) Using the control mail transmission application (e-mail transmission software) A3 in the PC 12, a staff member of "A" company transmits a control mail to the mail address of the staff member himself set in the office POP server 21 via the outside SMTP server 11 and the firewall 3. The control mail includes a VPN connection request ID information for an IP telephone (for example, the header may include VPN connection request ID information for the intranet relay like the fourth embodiment). Thus, the control mail can be distinguished from ordinary e-mails. Information, such as the IP address of the PC 12, necessary for VPN connection for IP telephone is added to the PC 12 from the "A" company's intranet. This mail is first transferred to the SMTP server application D1 through the connection P1.

(2) The outside SMTP server 11 receives the control mail through the connection P1 using the SMTP server application D1 and transfers it to the office POP server 21. When receiving the e-mail (control mail) from the outside SMTP server, the office POP server 21 records and stores the e-mail (control mail) by mail address using the POP server application E1.

(3) The gateway device 22 regularly accesses the office POP server 21 through connection P3 using the control mail reception application B1, inquires whether or not there is an arrived e-mail, captures the mail when there is an arrived e-mail, and decides whether or not the e-mail is a control mail. (When the header includes VPN connection request ID information, only the header is checked.)

(4) When the e-mail to self is a control mail, the control mail reception application B1 in the gateway device 22 instructs to delete the control mail from the office POP server 21. The authentication module B14 performs authentication through the connection P7 based on the ID and password of the captured control mail. When the authentication is correct, the control mail reception application B1 instructs the IP telephone client application B22 to set the VPN connection P4 linked to the relay server application A2, to the IP address of the VPN connection request source (PC 12). The IP telephone client application B22 sets the VPN connection P4 linked to the IP telephone server application A22 to the IP address of the VPN connection request source (PC 12) for IP telephone in accordance with the control mail reception application B1.

(5) When the VPN connection P4 for an IP telephone is established, the IP telephone server application A22 in the PC 12 processes calls by the handset A21 (P5). In the gateway device 22, the IP telephone client application B22 processes calls by the handset B21 (P6). Till the VPN connection P4 for the IP telephone is cut, calls are established between the handsets A21 and B21.

Figure 25:
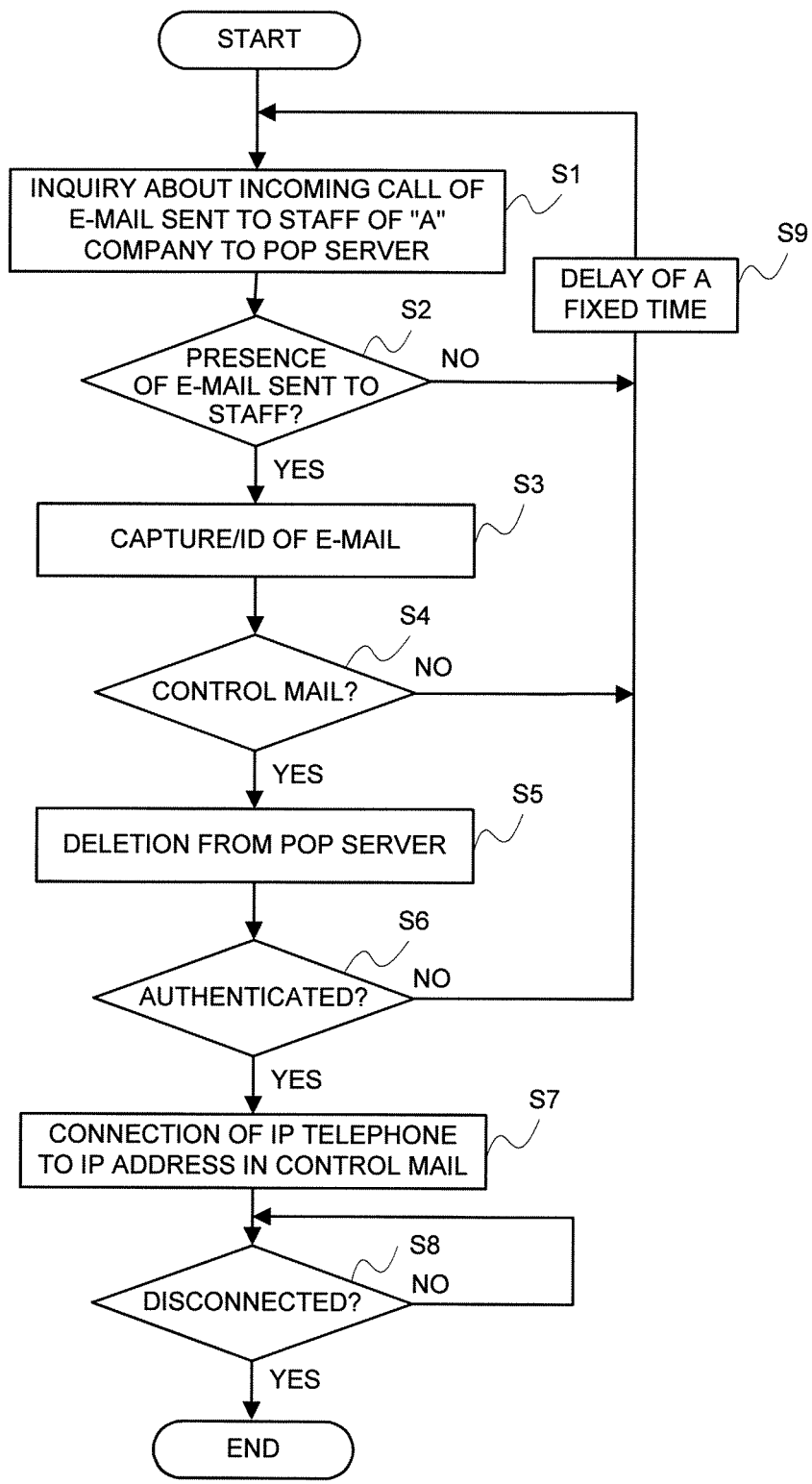
FIG. 25 shows an operational flowchart of a gateway device in the eighth embodiment.

FIG. 25 is a diagram illustrating the operational flowchart of the gateway device according to the eighth embodiment. The gateway device 22 inquires of the office POP server 21 whether or not an e-mail to self (a staff member of "A" company) has arrived (step S1). The gateway device 22 captures a list of subjects (headlines) of e-mails or the whole of the mails when there are arrived e-mails (YES in step S2), and decides whether or not an e-mail is a control mail (in steps S3 and S4). When an e-mail to self is a control mail (YES in step S4), the gateway device 22 removes the control mail from the office POP server 21 (step S5) and the authentication module performs authentication based on the control mail (step S6). When the authentication is correct, the VPN connection for the IP telephone is performed to an IP address of the VPN connection request source for an IP telephone based on the control mail (S6). Till the VPN connection for an IP telephone is disconnected (step S7), an IP telephone call can be established between the handset B22 of the gateway device 22 and the handset A21 of the PC 12. When a mail to self (a staff member of "A" company) does not exist in the step S2 (NO), an e-mail is not a control mail in the step S4 (NO), or authentication proves illegal in the step S6 (NO), the inquiry operation in the step S1 is again repeated after a fixed period of time (step S8).

As described above, the VPN connection for IP telephones can be established between the Internet 1, or an outside network, and the "A" company's intranet 2, an office network, without changing the setting of the firewall 3 and the VPN-GW or without installing the relay server in the outside network. For that reason, the VPN connection for IP telephones can be simply established with e-mails advantageous in communication charge, without involving difficulties in the approval procedure of the firewall administrator and the installation and use of the relay server. Thus, the security can be sustained by authentication. The conventional servers for exchanging e-mails may be used as the office POP server 21 and the outside SMTP server 11, without any change. The conventional accounts for exchanging e-mails may be used as the account of the POP server 21, without any change. However, this is limited to only the case where the company sets the firewall 3 to permit access from the intranet 2 to the office POP server 21.

Ninth Embodiment

In the above-mentioned embodiment, the office POP server and the gateway device are shown independently but may be combined together. An example of the VPN connection with an authentication function will be explained below as an embodiment using a doubled gateway device (referred to as an office POP server and gateway device).

(Explanation of Configuration)

Figure 26:
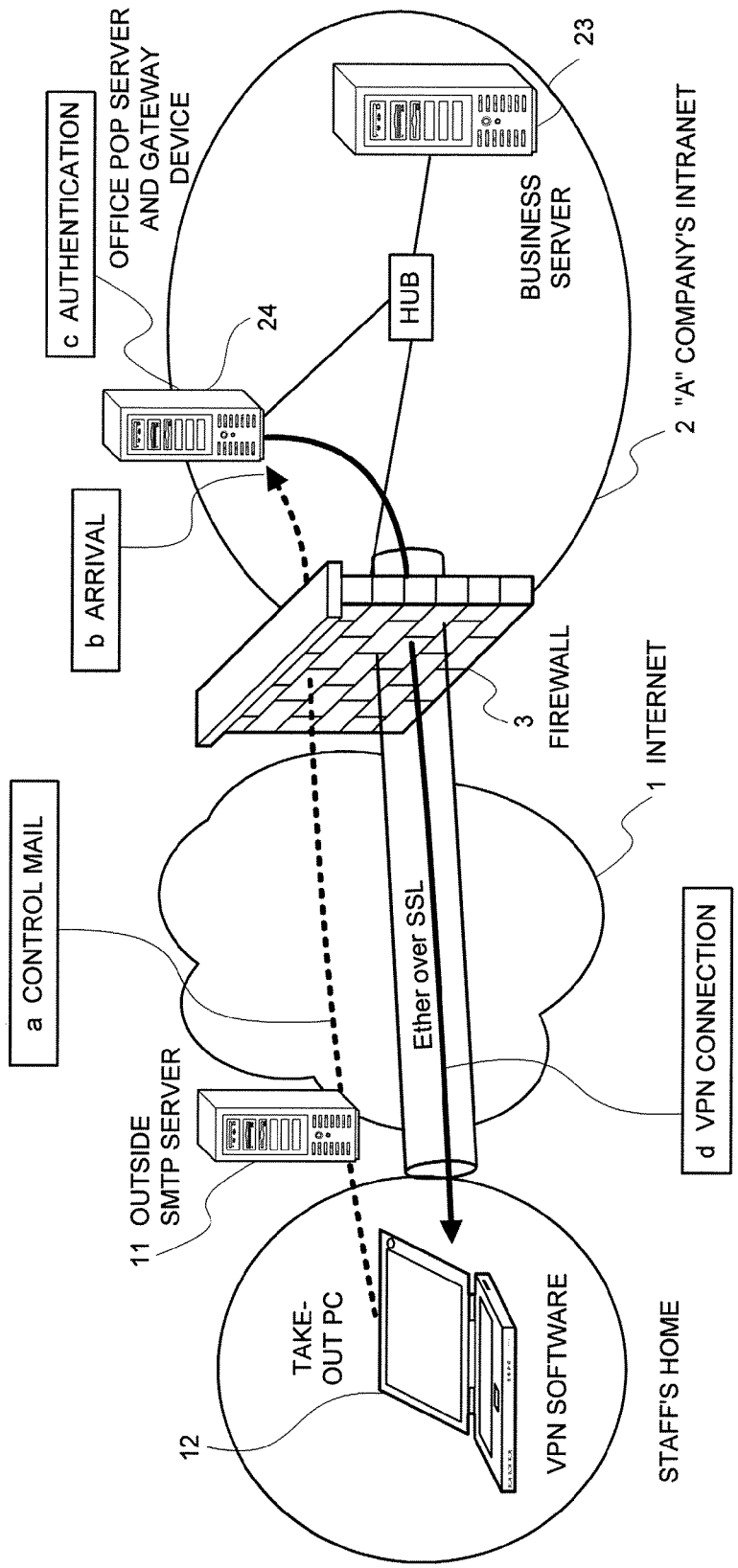
FIG. 26 is a diagram illustrating a network configuration according to a ninth embodiment of the present invention.

FIG. 26 is a diagram illustrating a network configuration according to the ninth embodiment of the present invention. The network configuration comprises the Internet 1, an intranet 2 of "A" company, and a firewall 3 disposed between the Internet 1 and the Intranet 2. The intranet 2 includes an office POP server and gateway device (or a gateway device having an office POP server and authentication device) 24, which is a gateway device working as an office POP server, and a business server 23. The Internet side includes an outside SMTP server 11 and an information processing terminal, which is taken out by a staff member of "A" company.

The office POP server and gateway device 24 includes all the function of the POP server 21 and the function of the gateway device 20, explained in the seventh embodiment. In other words, the office POP server and gateway device 24 has as a mail server a mail reception function, an identification function of a transmission destination address of a received e-mail, and a received e-mail memory function. The office POP server and gateway device 24 also has as a gateway device a function for identifying whether or not a received e-mail is a control mail, an authentication function, a VPN connection function to required connection destination. Furthermore, the office POP server and gateway device 24 further has a function of executing processes by respective functions in nearly real time upon an e-mail reception time. When being used in the intranet, the PC 12 is linked to the office POP server and gateway device 24 and the business server 23 via HUB. When the PC 12 is used on the Internet, the VPN connection is set between the PC 12 and the office POP server and gateway device 24. The VPN connection relays the PC 12 and the business server 23. Thus, the VPN connection can be established between the PC 12 and the business server 23.

Figure 27:
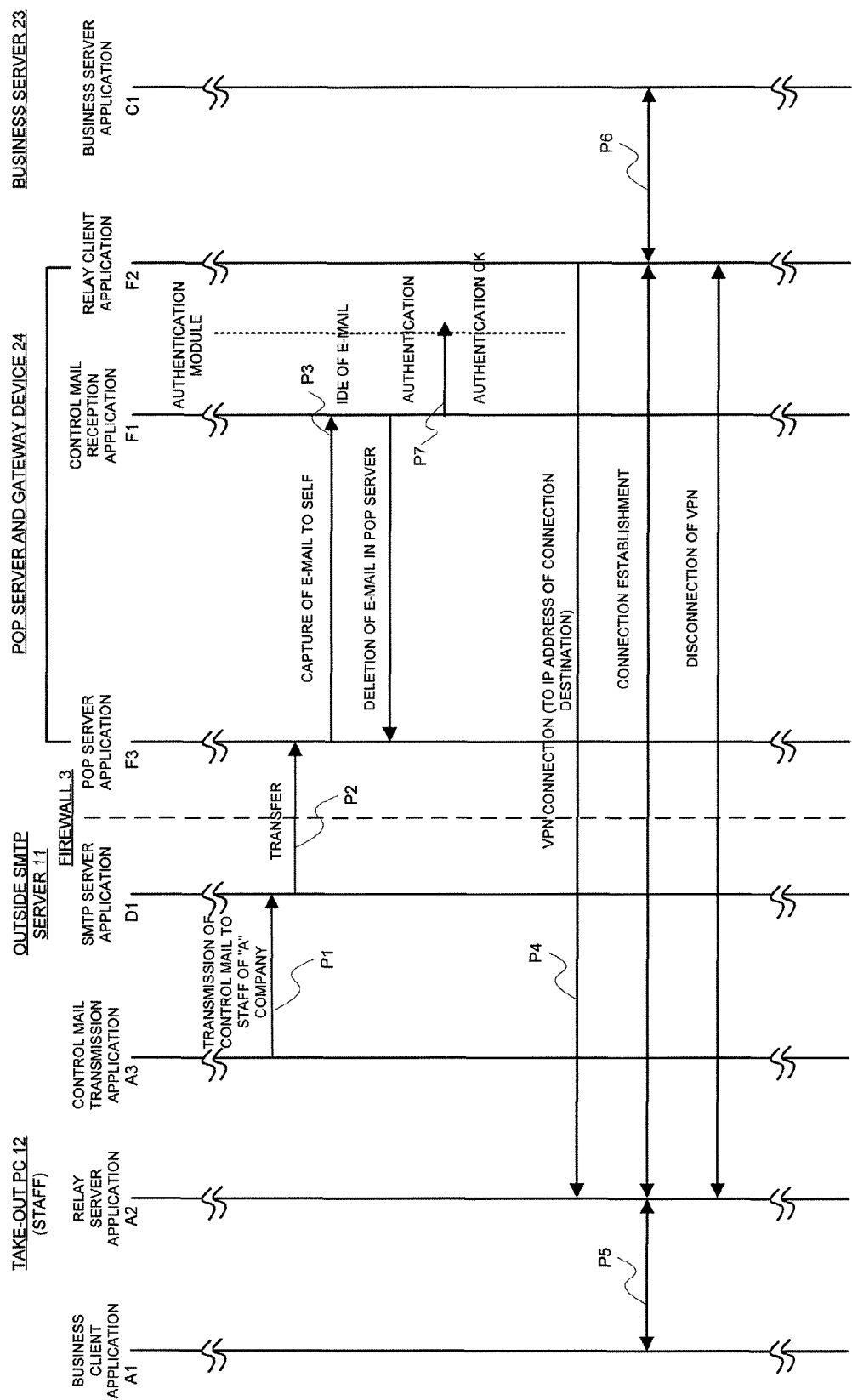
FIG. 27 shows an operational procedure in the ninth embodiment.

FIG. 27 is a diagram illustrating the operation of the ninth embodiment. In the present embodiment, after authentication, the VPN connection is established between the PC 12 and the office POP server and gateway device 24. The PC 12 is installed with the business client application A1 for in-house works as an application for communication processing in-house works between the PC 12 and the business server 23. The business server 23 is installed with the corresponding business server application C1. The PC 12 is installed with the control mail transmission application A3 for realizing an e-mail transmission function enabling access from the Internet to the firewall and the relay server application A2 for realizing a relay function to the business client application A1. The office POP server and gateway device 24 is installed with the POP server application F3 in the gateway device for realizing the e-mail reception function, the control mail reception application F1, and the relay client application F2 for realizing a relay function to the business server application C1.

(Explanation of Operation)

Referring to FIG. 27, the operation of the present embodiment will be explained below.

(1) Using the control mail transmission application A3 of the PC 12, the staff member of "A" company transmits a VPN connection request control mail to the mail address of the staff member set in the POP server and gateway device 24, via the outside SMTP server 11. The control mail includes identification information about a VPN connection request (for example, the header may include identification information about a VPN connection request). The control mail can be distinguished from ordinary e-mails. Information, such as the IP address, ID and passwords of the PC 12, necessary for authentication on the intranet side and the VPN connection to the PC 12 carried out from the intranet side are added to the control mail. The mail is transferred from the control mail transmission application A3 to the SMTP server application D1 through the connection P1.

(2) The outside SMTP server 11 receives the control mail from the SMTP server application D1 through the connection P1 and transfers it to the POP server and gateway device 24 through the connection P2 by referring to the header information.

(3) When receiving an e-mail to the mail address of the staff member under control, the POP server and gateway device 24 records and stores the e-mail using the POP server application F3 and transfers it to the control mail reception application F1 through connection P3.

(4) The control mail reception application F1 identifies e-mail information every in-coming call, decides whether or not the e-mail is a control mail (when the header includes VPN connection request ID information, only the header is checked and decided.) When the e-mail is a control mail, the control mail reception application F1 instructs the POP server application F3 to delete the mail. The authentication module performed authentication through the connection P7 based on the authentication information of the control mail.

(5) When the control mail reception application F1 receives a notice saying that the authentication of the control mail is correct, from the authentication module B14 through the connection P7, the relay client application F2 establishes the VPN connection P4 between the relay server application A2 and the IP address of the VPN connection request source (PC 12) based on the control mail.

(6) When the VPN connection P4 is established, the relay server application A2 in the PC 12 relays the connection P5 and the VPN connection P4. The communication between the business client application A1 and the business server application C1 is relayed through the VPN connection P4. The relay client application F2 in the POP server and gateway device 24 relays the connection P6 and the VPN connection P4. The communication between the business server application C1 of the business server 23 and the business client application A1 is established through the VPN connection P4.

As a result, till the VPN connection P4 is cut, the communication between the business applications can be established between the PC 12 and the business server 23 in the Intranet.

Figure 28:
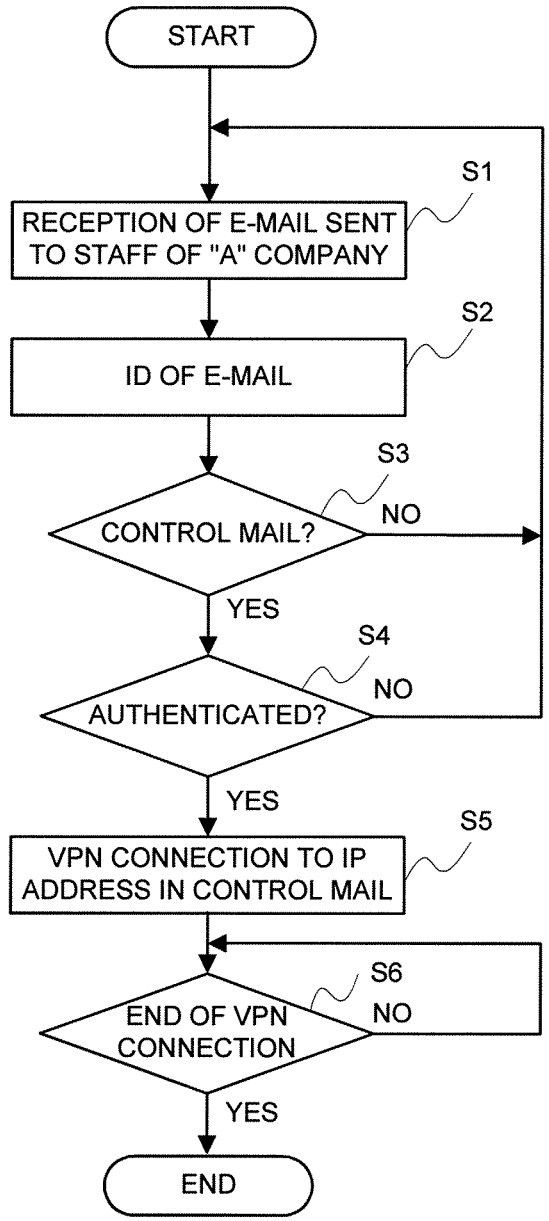
FIG. 28 shows an operational flowchart of a gateway device in the ninth embodiment.

FIG. 28 is an operational flowchart of an office POP server and gateway device according to the ninth embodiment. The POP server and gateway device 24 has an e-mail reception function and a function of simultaneously processing identification, authentication, and VPN connection to a required connection destination, of a received e-mail. When receiving as a POP server e-mail to the mail address of a staff member (for example, a staff member of "A" company) under control (step S1), the POP server and gateway device 24 identifies information on the header as a control mail reception function at an arrival time of the e-mail (step S2) and decides whether or not the e-mail is a control mail (step S3). When the e-mail is a control mail (YES in step S3), the POP server and gateway device 24 deletes the e-mail. The authentication module performs authentication based on the control mail. When authentication is correct (YES in step S4), VPN connection is established to the IP address specified by the control mail (step S5). Thus, till the VPN connection ends (step S6), communication can be established between the PC 12, the office POP server and gateway device 24, and the business server 23. When an e-mail is not a control mail in the e-mail identification step S3 or authentication are incorrect in the e-mail authentication step S4, the step goes back to the e-mail reception waiting step S1.

According to the present embodiment, the office POP server function and the gateway device function are integrated to construct an office POP server and gateway device 24. Thus, as shown in the seventh and eighth embodiments (FIGS. 18, 20, 22 and 24), the process that the gateway device (20, 22) regularly inquires of the office POP server 21 is omitted. In this embodiment, the setting of the mail server (and DNS) is necessary.

As described above, VPN connection can be established from the outside network without changing the setting of the firewall 3 and the router (VPN-GW) in the firewall or without installing the relay server in the outside network. The VPN connection can be simply established with e-mails advantageous in communication charge, without being involved in difficulties such as the approval procedure of the firewall administrator or the installation and use of the relay server. Moreover, the integration of the POP server and the gateway device can eliminate the inquiry process and establish the VPN connection immediately after an arrival of the control mail, so that the time which is taken for a completion of connection can be reduced.

In the seventh to ninth embodiments (FIGS. 18, 22 and 26), the POP server installed in the intranet and the gateway device with an authentication function have been explained as an example. However, the gateway device that includes a similar POP server installation configuration but has no authentication function may be constructed in another embodiment.

Tenth Embodiment

Next, in place of e-mails, telephone lines or radio lines may be utilized as means for accessing from a firewall to a firewall. A gateway device with authentication function will be explained below as the embodiment.

(Explanation of Configuration)

Figure 29:
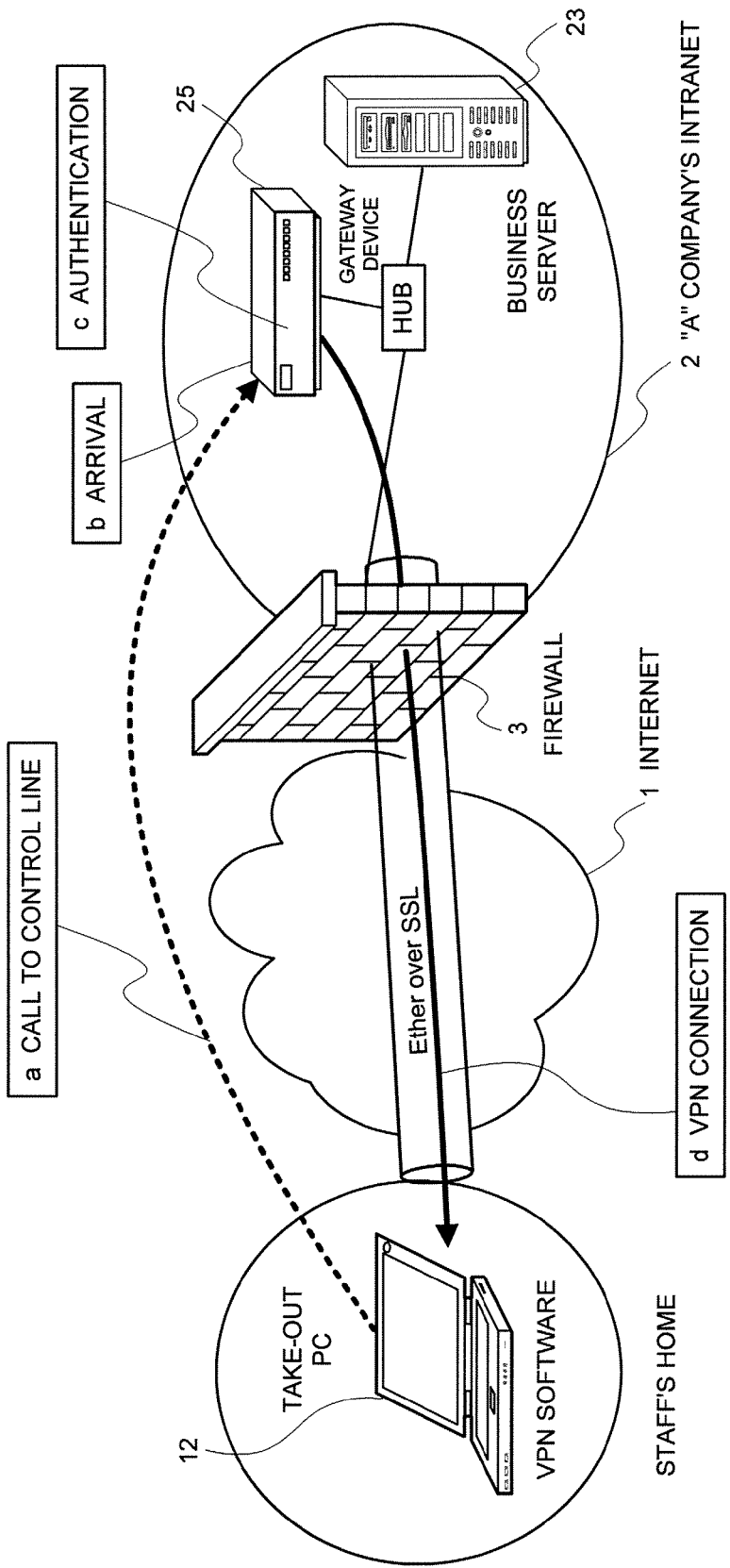
FIG. 29 is a diagram illustrating a network configuration according to a tenth embodiment of the present invention.

FIG. 29 shows a network configuration according to the tenth embodiment of the present invention. The network configuration includes the Internet 1, an intranet of "A" company 2, and a firewall 3 disposed between the Internet 1 and the intranet 2. The intranet 2 includes a gateway device 25 with an authentication device and a business server 23. The internet side includes as an information processing terminal taken out by a staff member of the "A" company or the PC 12 which is installed with dedicated VPN software including a setting application for requiring VPN connection through telephone communication and an object application for VPN capsulation. Moreover, the Internet side includes a telephone line connectable from the PC 12 to the gateway device 25.

The PC 12 is a portable terminal such as a notebook PC. In the Internet 1, the PC 12 can be placed as shown in FIG. 29. In the intranet 2, the PC 12 can be placed at the position of the gateway device 25 shown in FIG. 29, in place of the gateway device 25. In the intranet 2, the PC 12 is communicated with the firewall 3 or the business server 23 via HUB. When the PC 12 is used in the Internet (outside the intranet), the gateway device 25 may be installed in the intranet 2 via HUB. The connection between the gateway device 25 and the PC 12 is set via the firewall 3. Thus, the communication between the PC 12 and the business server 23 can be established.

The PC 12 includes a modem connected to the telephone line. The modem has the telephone communication function of sending a self IP address or a code number with call origination and multi-frequency signals (touch tones) associated with the caller ID and the function of requiring a VPM connection callback to the gateway device 25.

(Explanation of Operation)

Figure 30:
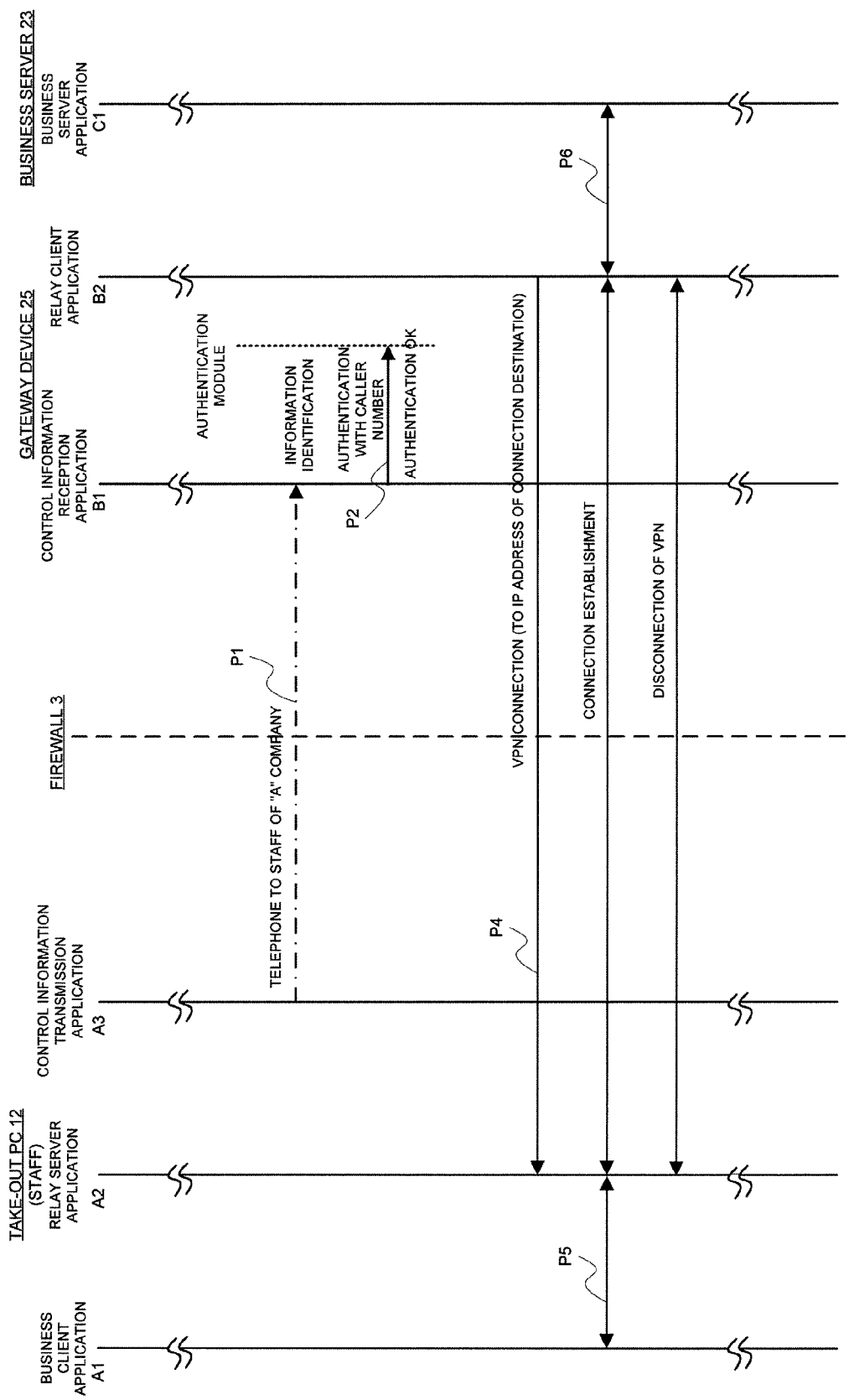
FIG. 30 shows an operational procedure in the tenth embodiment.

FIG. 30 is a diagram illustrating the operational procedure according to the tenth embodiment. The PC 12 is installed with the business client application A1 for in-house works. The business server 23 is installed with the corresponding business server application C1. The PC 12 includes the control information transmission application A3 realizing a control information transmission function enabling access from the Internet to the firewall and the relay server application A2 realizing a relay function to the business client application A1. The gateway device 25 includes the control information reception application B1 realizing a control information reception function and the relay client application B2 realizing a relay function to the business server application C1.

The operation of the present embodiment will be explained below:

(1) In the PC 12 of a staff member of "A" company, the modem transmits control information to the gateway device 25, to the connection P1 of the telephone line, using the control information transmission application A3. The PC 12 originates a VPN connection request associated with a caller ID (but not essential) and transmits a connection destination IP address (IP address of the PC 12) or a code number from the gateway device 25 using touch tone. The header of control information includes identification information for a VPN connection request to distinguish from ordinary information. Information necessary for authentication and VPN connection on the intranet side, such as IP address, ID and password of the PC 12, may be added to the control information.

(2) When the control information is received through the telephone line using the control information reception application B1, the gateway device 25 identifies whether or not the received information is the control information based on the information such as header. In the case of the control information to self, the authentication module performs authentication through the connection P2 using a caller's telephone number captured with the caller ID or a code number captured with touch-tone. When the received caller's telephone number is a previously registered one, the gateway device 25 establishes the VPN connection P4 to the captured connection destination IP address using the relay client application B2.

(3) When the VPN connection P4 is established, the relay server application A2 of the PC 12 relays the connection P5 and the VPN connection P4 and relays communication between the business client application A1 and the business server application C1 through the VPN connection P4. The relay client application B1 of the gateway device 25 relays the connection P6 and the VPN connection P4 and relays communication between the business server application C1 of the business server 23 and the business client application A1 through the VPN connection P4.

As a result, the PC 12 enables communications between business applications of the business servers 23 in the intranet till the VPN connection P4 is disconnected.

Figure 31:
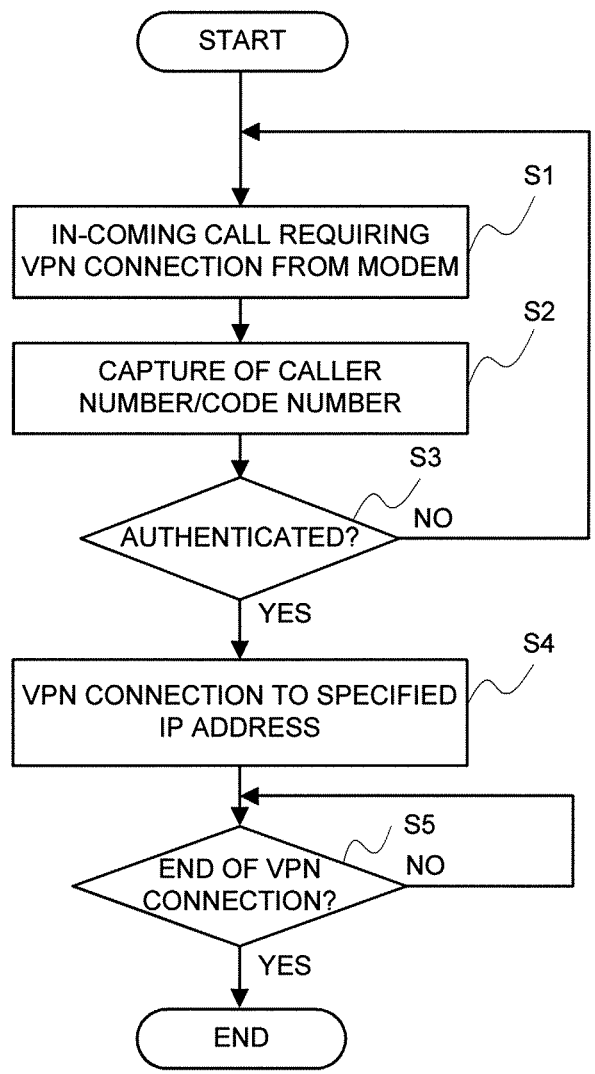
FIG. 31 shows an operational flowchart of a gateway device in the tenth embodiment.

FIG. 31 is a diagram illustrating the operational flowchart of a gateway device in the tenth embodiment. When receiving an incoming telephone call (step S1), the gateway device 25 captures a caller's telephone number captured with the caller ID or a code number captured with touch-tone (step 2) and checks it against previously registered information for the purpose of authentication (step S3). When authentication is correct, the VPN connection is established to the IP address specified by the touch-tone from the telephone (step S5). Till the VPN connection ends, the communication between the gateway device 25 and the business server 23 is established (step S5). When the authentication result is illegal in the authentication step 3, the flow returns to the step 1 waiting a new incoming call.

According to the present embodiment, the VPN connection for linkages between the outside and the inside of the intranet can be simply established in response to a request from the outside of the Intranet, without requiring the setting of the firewall 3 and the router in the firewall. Compared with the embodiments shown in FIGS. 4 to 9 (FIGS. 6 to 28), the transmission/reception of an e-mail and identification of a control mail are not eliminated. Hence, the VPN connection (VPN configuration) can be constructed very simply. Moreover, the present embodiment can prevent illegal uses by the caller ID.

As another example of the present embodiment, which a VPN connection request is issued via the telephone line, portable telephones or general telephones may be used in place of modems. Bar codes on FAX documents, carrier signals, television image signals, audio signals, Morse codes, and the like may be used as the connection request signal.

Eleventh Embodiment

Figure 32:
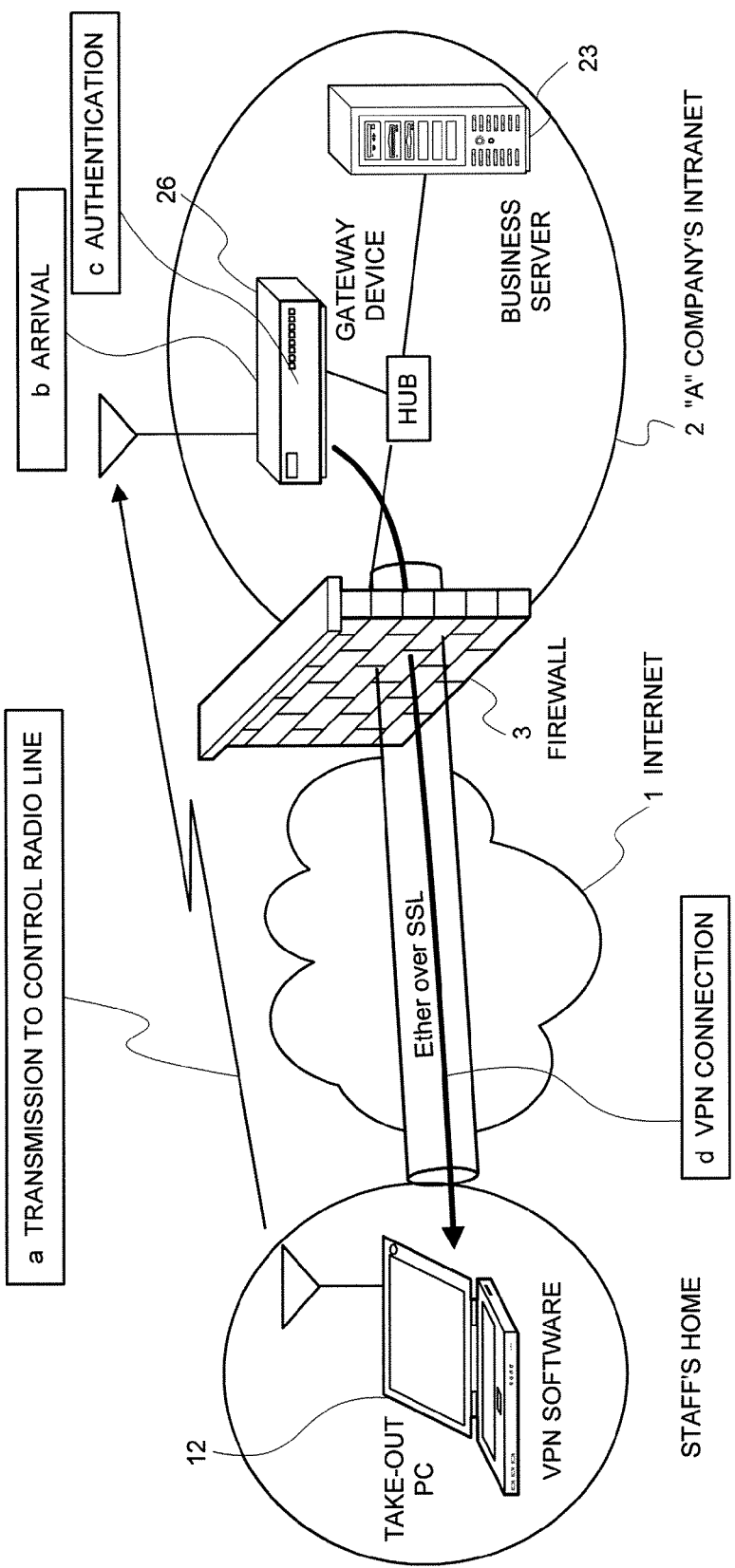
FIG. 32 is a diagram illustrating a network configuration according to an eleventh embodiment of the present invention.

FIG. 32 is a diagram illustrating a network configuration according to the eleventh embodiment. The network configuration includes the Internet 1, an intranet 2 of "A" company, and a firewall 3 installed between the Internet 1 and the intranet 2. The intranet 2 includes a gateway device 26, which has an authentication device, and a business server 23. The Internet side includes a PC 12, which is an information processing terminal taken out by a staff member of "A" company, and a radio trunk connectable from the PC 12 to the gateway device 26. The PC 12 is installed with dedicated software including a setting application for requiring VPN connection through radio communication and an object application for capsulation such as for VPN.

The PC 12 is a portable terminal such as a notebook PC. In the Internet 1, the PC 12 may be placed as shown in FIG. 32. In the intranet 2, the PC 12 can be substitutingly placed at the location of the gateway device 26 as shown in FIG. 32. In the intranet 2, the PC 12 communicates with the firewall 3 and the business server 23 via HUB. When the PC 12 is used in the Internet (outside the intranet), the gateway device 26 is installed via HUB in the intranet 2. The connection between the gateway device 26 and the PC 12 is set via the firewall 3. Thus, the communication between the PC 12 and the business server 23 is established.

Moreover, the PC 12 includes a transmitter/receiver to the radio trunk and has the radio transmission function for transmitting the IP address or code number of self, with radio signals, and the function for requiring a callback for VPN connection to the gateway device 26.

Figure 33:
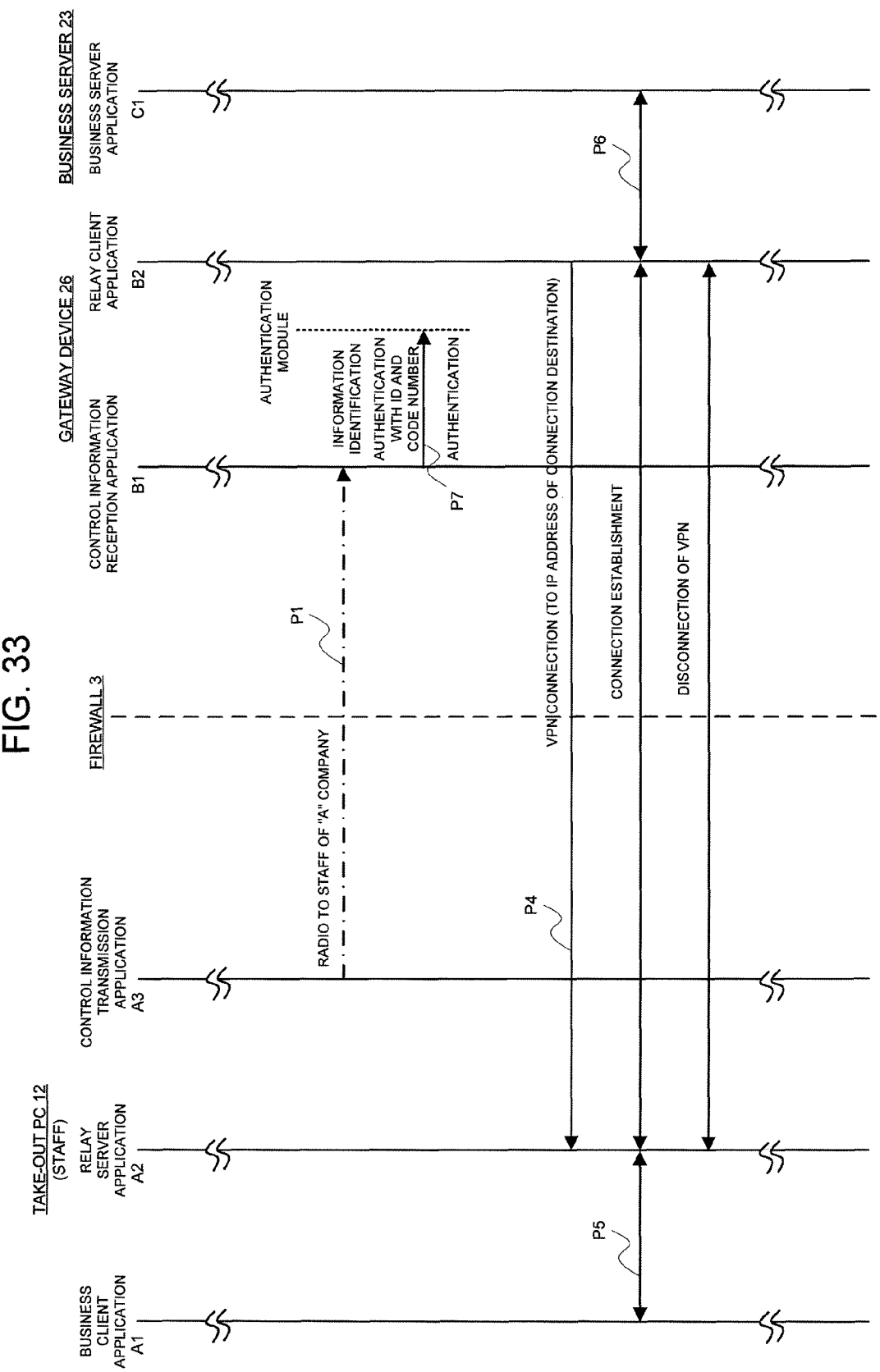
FIG. 33 shows an operational procedure of the eleventh embodiment.

FIG. 33 is a diagram illustrating the operational procedure of the eleventh embodiment. The PC 12 is installed with the business client application A1 for the in-house works and the business server 23 is installed with the corresponding business server application C1. The PC 12 is installed with the control information transmission application A3 realizing the function of transmitting a control information transmission function enabling access from the Internet to the firewall and the relay server application A2 realizing the relay function to the business client application A1. The gateway device 26 is installed with the control information reception application B1 realizing the function of realizing a control information reception function and the relay client application B2 realizing a relay function to the business server application C1.

The operation of the present embodiment is as follows:

(1) Using the control information transmission application A3 in the PC 12, a staff member of "A" company uses a radio transmitter to originate control information, such as the connection destination IP address and code number, to the gateway device 26 via the connection P1 by the radio line. In the control information, the header includes ID information for VPN connection request to distinguish from common information. Information, such as IP address, ID, and password of the PC 12, necessary for authentication on the intranet side and the VPN connection may be added to the control information.

(2) When receiving radio signals using the control information reception application B1, the gateway device 22 identifies whether or not the information such as header of the radio signal is control information. When the header information is control information to self, the authentication module performs authentication via the connection P2 with the code number captured. When the received telephone number of the originator is a previously registered one, the gateway device 26 establishes the VPN connection P4 to the captured connection destination IP address, using the relay client application B2.

(3) When the VPN connection P4 is established, the relay server application A2 in the PC 12 relays the connection P5 and the VPN connection P4 and relays the communication between the business client application A1 and the business server application C1 through the VPN connection P4. In the gateway device 26, the relay client application B1 relays the connection P6 and the VPN connection P4 and relays the business server application C1 of the business server 23 and the business client application A1 through the VPN connection P4.

As a result, till the VPN connection P4 is disconnected, the PC 12 can establish communications between business applications in the business servers 23 inside the intranet.

Figure 34:
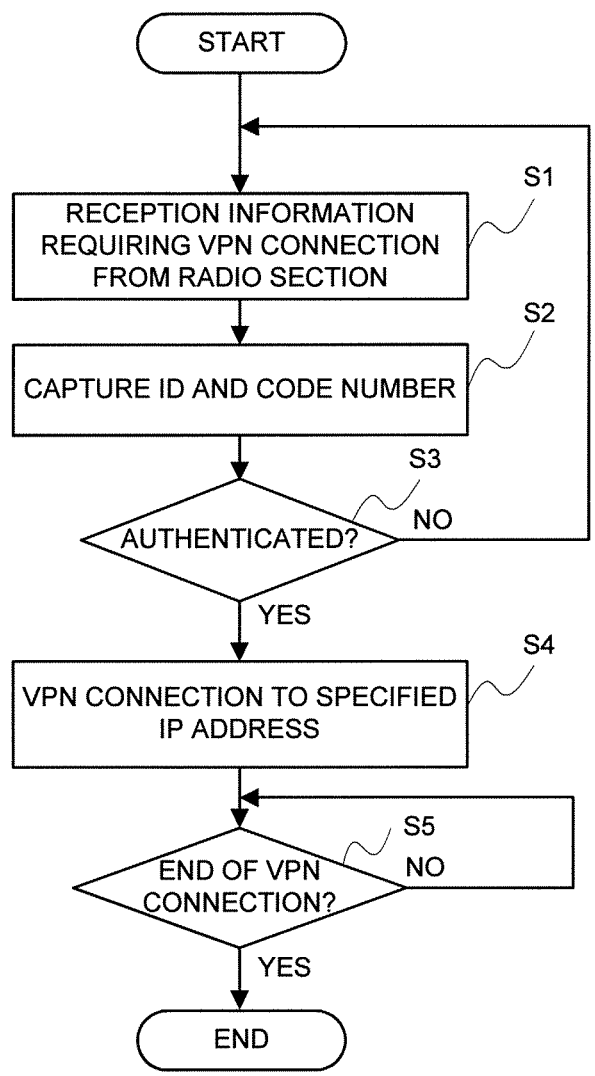
FIG. 34 shows an operational flowchart of a gateway device in the eleventh embodiment.

FIG. 34 is a diagram illustrating the operational flowchart of a gateway device in the eleventh embodiment. When the wireless device receives connection request control information (step S1), the gateway device 26 captures a code number from control information (step S2) and checks it against previously registered information for the purpose of authentication (step S3). If the authentication is correct, the gateway device 26 establishes VPN connection to the IP address specified from the control information (step S5). Communication can be established between the gateway device 26 and the business server 23 till the VPN connection ends (step S5). When the authentication result is illegal in the authentication step S3, the flow goes back to the step 1 for waiting the reception of new radio signals.

According to the present embodiment, the VPN connection can be simply realized to the outside of the company, without requiring the setting of the router in the firewall 3 or the firewall. Compared with the fourth to ninth embodiments (FIGS. 6 to 28), the transmission and reception of e-mails and identification of control mails are not required. Compared with the tenth embodiment (FIG. 29), since the use and setting of telephone lines are not required, the VPN connection can be established very simply.

In the PC and the gateway device, each having a wireless device, when a VPN connection request and a callback to the request are performed with information transmitted through the radio trunk, CB, TV, radio, ham radio, and the like may be used as the radio trunk. Touch tones, bar codes on FAX document, carrier signals, television image signals, audio signals, Morse codes and the like, in a manner similar to those in the tenth embodiment, may be used as the information mode transmitted for connection requests.

Next, both the PC and the gateway device constructing a communication system according to an embodiment of the present invention will be explained below.

Twelfth Embodiment

Figure 35:
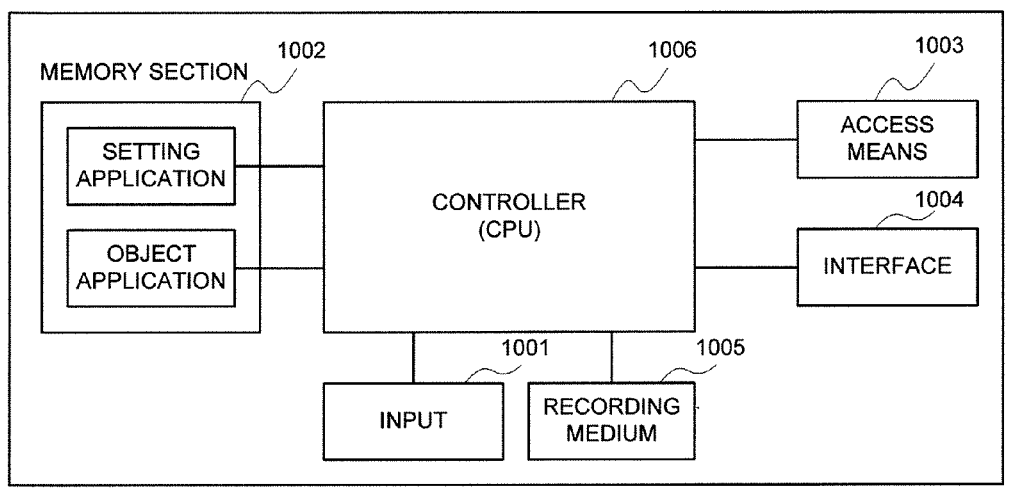
FIG. 35 is a diagram illustrating a take-out PC configuration according to a twelfth embodiment of the present invention.

FIG. 35 is a diagram illustrating the configuration of a PC according to the present invention. The PC comprises an input section 1001, a memory 1002, a recording medium 1005, access means 1003, an interface 1004, and a controller (CPU) 1006. The input section 1001 performs a key entry by a user. The memory 1002 stores a communication application, a setting application, a business application, and an object application. The communication application communicates with the PC, the gateway device in the intranet, and various devices. The setting application is a control program to execute various processes and makes a connection request for VPN connection to the gateway device or VPN connection to IP telephones. The business application performs a predetermined business processing through connection with the gateway device. The object application includes an application that relays the business application. The recording medium 1005 records the programs to be stored in the memory 1002. The access means 1003 is an e-mail, a telephone modem, or a wireless device. The interface 1004 is NIC for connection to a network cable. The controller 1006 realizes predetermined functions between the controller 1006 the gateway device.

Programs, such as the setting application and the object application are initially in the recording medium 1005. The controller 1006 reads out the programs from the recording medium 1005 to control the operation of the controller 1006. The programs may be downloaded from the Internet. The controller 1006 executes the following process in accordance with the program.

When a user performs a connection request operation for VPN connection from the input section 1001 to the gateway device (20, 22, 24, 25, 26) or VPN connection for IP telephones, the controller 106 creates control information using the setting application (such as control mail transmission application) and transmits it to the gateway device via the Internet, a telephone line or a radio line. The gateway device of the connection destination is set as the address of a connection request destination (the address of a staff member of "A" company when a gateway device is installed in place of the take-out PC). The header includes connection request ID information. Information necessary for authentication and connection on the intranet side, such as the address of the PC, if necessary, ID and password, are added to the header.

In the PC, when the interface 1004 receives a connection callback for VPN connection or IP telephone VPN connection from the gateway device (20, 22, 24, 25, 26) via the firewall, the controller 1006 performs predetermined business process relaying or IP telephone call processing, using the object application (relay application). Thus, connection is established.

The control program in the PC is the control program for connecting the gateway device in the office network to the external network through the firewall 3. The control program instructs the controller 1006 in the PC. Thus, for example, both the function of requesting connection by means accessible to the internal network and the function of instructing the gateway device to issue a connection request by callback to the connection requesting PC via the firewall, in response to the connection request, are realized. Moreover, the control program realizes the function for transmitting a control mail for connection request to the mail server and the function for instructing the gateway device to issue a connection callback via the firewall 3 based on the control mail of the mail server. Moreover, the control program realizes the function for transmitting control information, which issues a connection request by telephone line or by wireless line, to the controller 1006 in the PC and the function for instructing the gateway device to issue a connection callback via the firewall 3 based on the control information.

Figure 36:
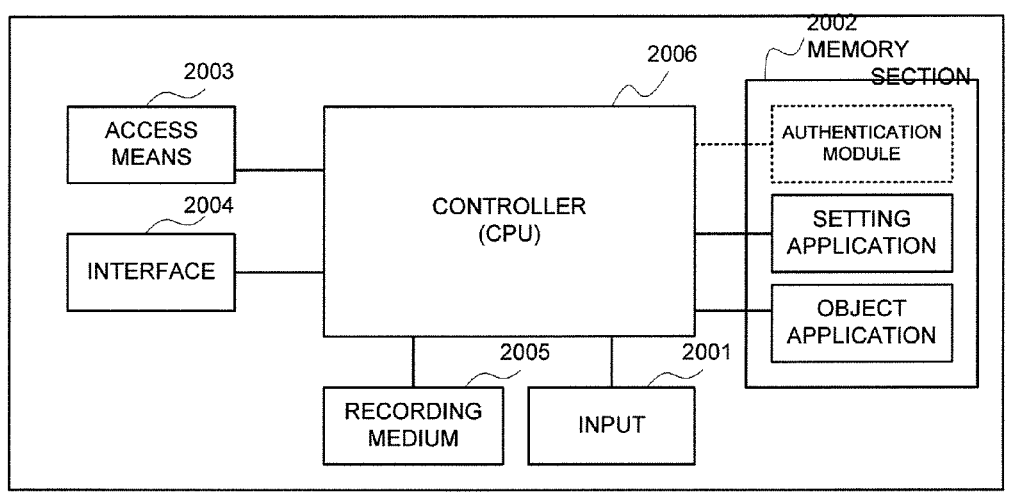
FIG. 36 is a diagram illustrating the configuration of a gateway device according to a twelfth embodiment of the present invention.
Figure 37:
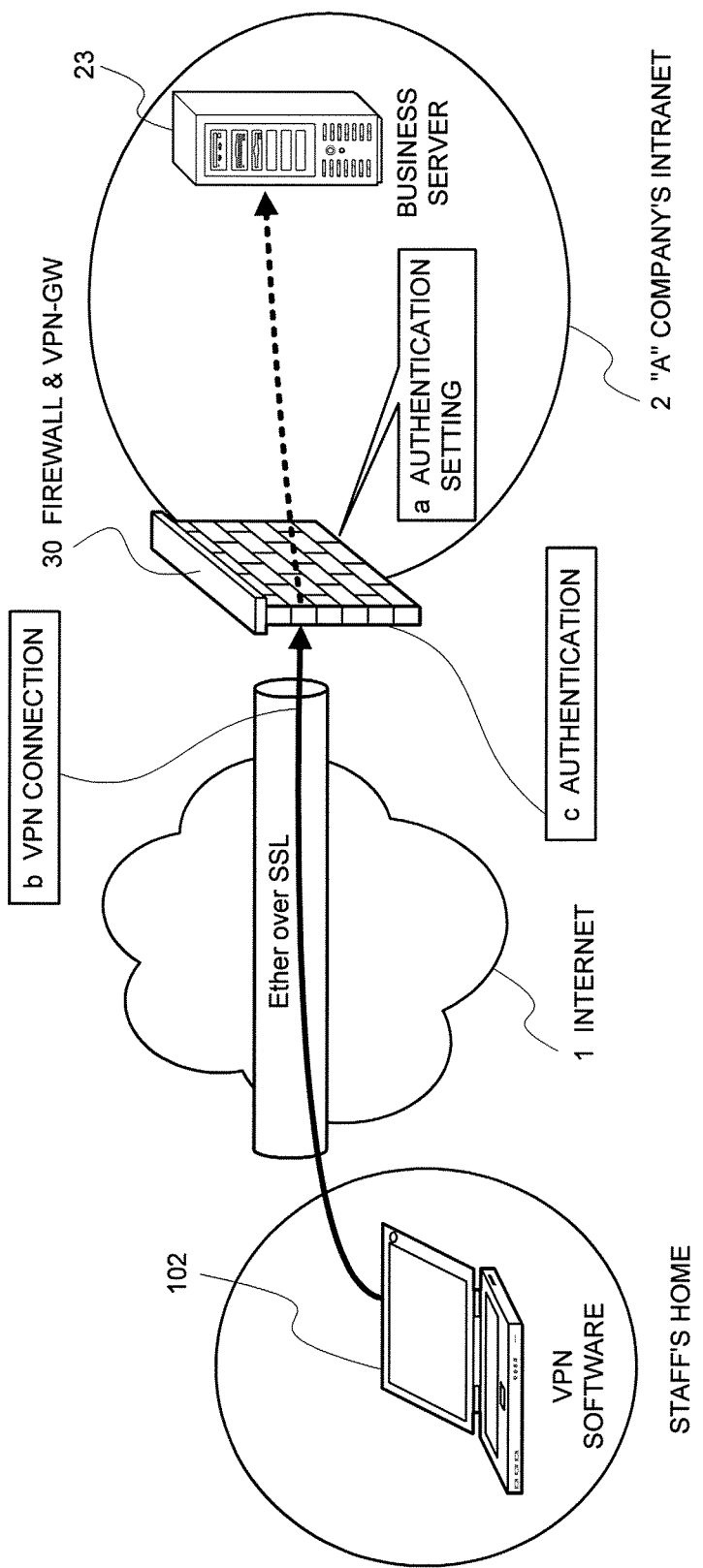
FIG. 37 is a diagram illustrating an example in a related art.
Figure 38:
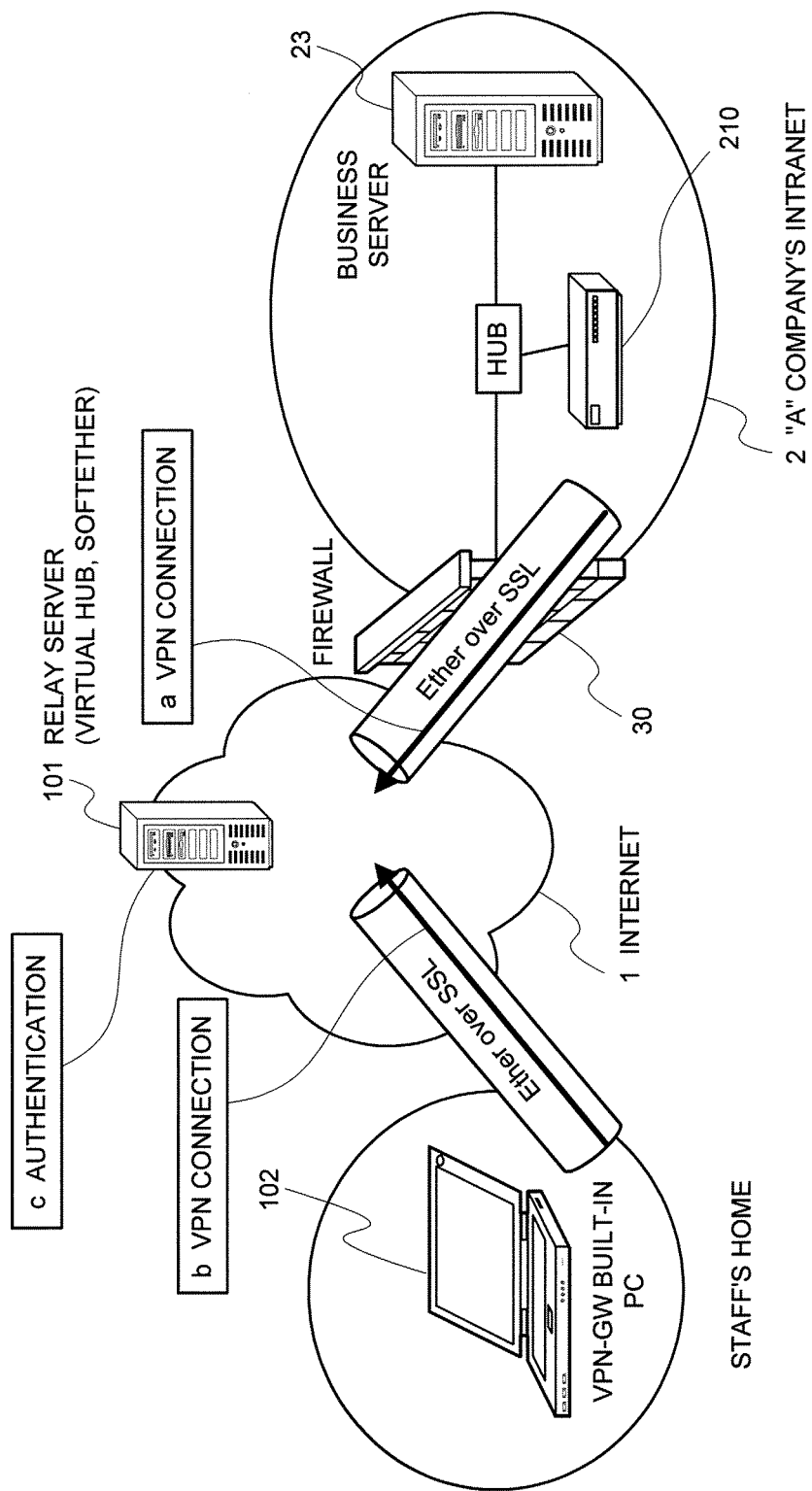
FIG. 38 is a diagram illustrating another example in a related art.
Figure 39:
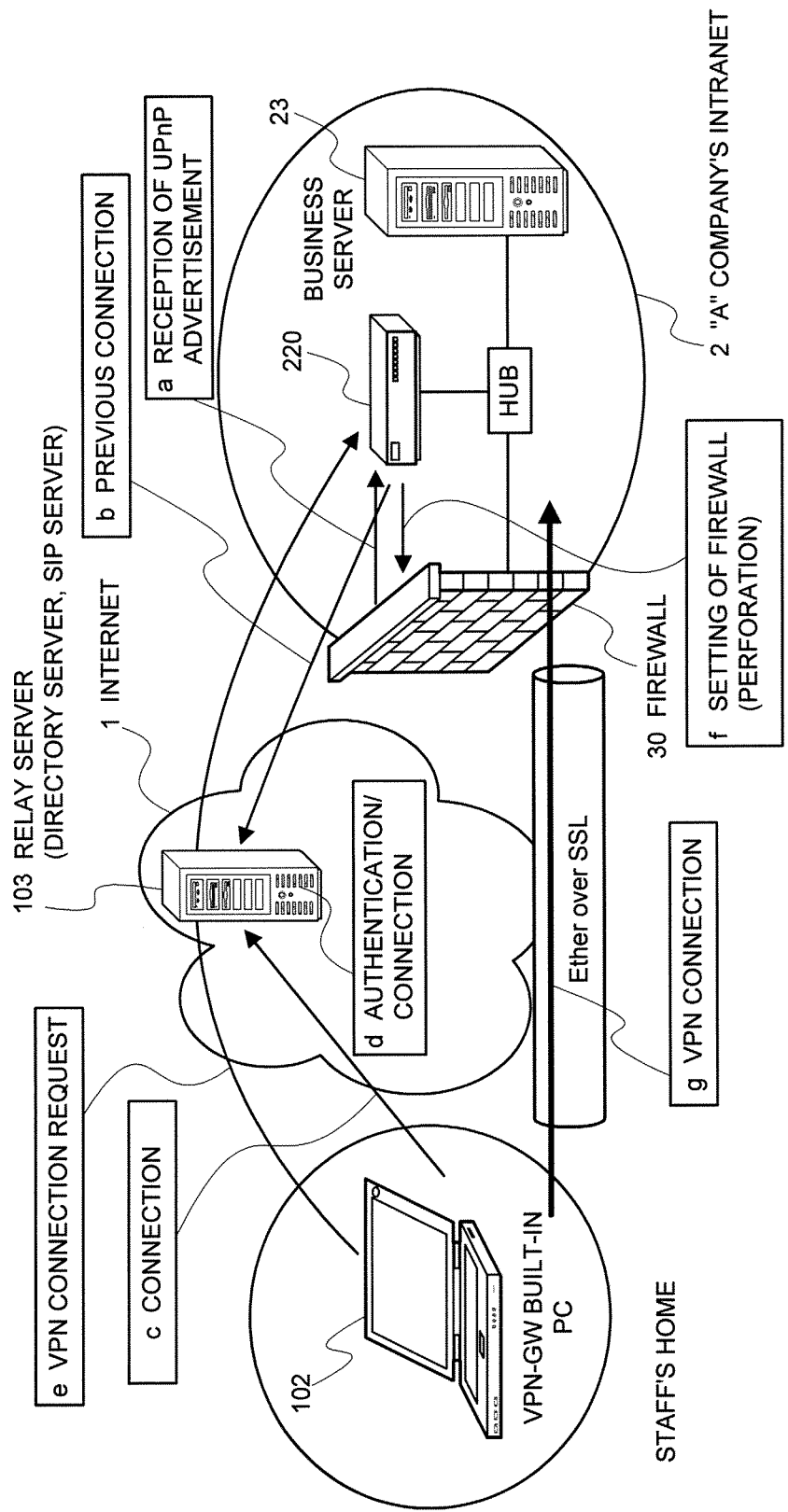
FIG. 39 is a diagram illustrating further another example in a related art.

FIG. 36 is a diagram illustrating the configuration of a gateway device according to the present invention. According to the embodiment, the gateway device comprises an input section 2001, a memory 2002, a recording media 2005, access means 2003, an interface 2004, and a controller 2006. The input section 2001 accepts a key entry by a user. The recording media 2005 stores various data, an application for communicating with the PC on the Internet, and an object application. The object application is a control program for executing various processes and includes an application for relaying connection with the PC. The recording medium 2005 records the program stored in the memory 2002. The access means 2003 is an e-mail, a telephone medium, or a wireless device. The interface 2004 is NIC for connection with a network cable. The controller 2006 includes a central processing unit (CPU) for realizing predetermined functions between the CPU and the PC. The authentication module (authentication program) is read out of, if necessary, the recording medium 2005 and is installed in the memory 2002.

The programs such as the setting application, the authentication module, and the business application are initially stored in the recording medium 2005. The controller 2006 reads out the program from the recording medium 2005 to control the operation of the controller 2006. The programs may be downloaded from the network. The controller 2006 executes the following process using the programs.

When a user takes the PC out of the company (on the Internet), the authentication function for security can be realized if necessary. Authentication information, such as user's ID and code number, used for a connection request time from the Internet are set from the input section 2001 of the gateway device or the input section 1001 of the PC.

When the access means 2003 receives control information on VPN connection or IP telephone VPN connection from the PC, the setting application detects the IP address of a connection request source based on the control information and detects, if necessary, the ID and code number of the connection request source. Thus, the setting application performs authentication in accordance with the ID and code number. When authentication is correct, the object application (relay application) controls connection to the IP address of a connection request source via the interface 2004.

When the connection is established, the gateway device establishes communications to the business application such as the business server, using the object application (relay application), thus allowing communications between the business application of the gateway device and the business application of the business server.

The control program for the gateway device corresponds to the control program for the gateway device in the internal network connected to the external network through the firewall, to link the gateway device and the PC in the external network. The control program instructs the controller 2006 in the gateway device to execute, for example, the function of receiving access for a connection request from the PC and the function of issuing a callback for a connection request to the information processing terminal, which has sent the connection request, via the firewall in response to the connection request. Moreover, the control program instructs the controller 2006 to execute the function of capturing a control mail for issuing a connection request transmitted from the PC, from the mail server and the function of performing a callback for connection to the PC via the firewall 3 based on the control mail. Moreover, the control program instructs the controller 2006 to execute the function of regularly inquiring the reception of an e-mail to self, the function of capturing the e-mail to self and deciding whether or not the e-mail is a control mail, and function of authenticating the control mail. Moreover, the control program instructs the controller 2006 to execute the function of deciding whether or not the e-mail is a control mail every time the mail server receives e-mail, as the function of the mail server, and the function of authenticating the control mail.

Moreover, the control program for the gateway device in the internal network connected to the external network via the firewall to link the gateway device and the PC in the external network is provided. The control program instructs the controller of the gateway device to execute the function of receiving control information about a connection request transmitted from the PC via a telephone line and the function of issuing a callback for connection to the PC via the firewall based on the control information. The control program further includes the program for realizing the function of performing authentication based on the telephone number captured based on the caller number notification from the PC.

The control program for the gateway device in the internal network connected to the external network via the firewall to link the gateway device and the PC in the external network is provided. The control program instructs the controller of the gateway device to execute the function of receiving control information about connection requests transmitted from the PC via the radio line and the function of issuing a callback for connection to the PC via the firewall based on the control information. The control program includes the program for realizing the function of performing authentication based on the control information and the function of connecting the gateway device to the PC when the authentication is correct.

Thirteenth Embodiment

Next, the case where VPN connection is established between the information processing terminal and the gateway device by using e-mails as access means when plural firewalls exist will be explained below as an embodiment of the present invention.

The present embodiment differs from the fourth embodiment in that a department intranet 5 is connected to the intranet 2 of "A" company via the firewall 4, the department Intranet 5 including the gateway device 20 and the business server 23.

(Explanation of Configuration)

Figure 40:
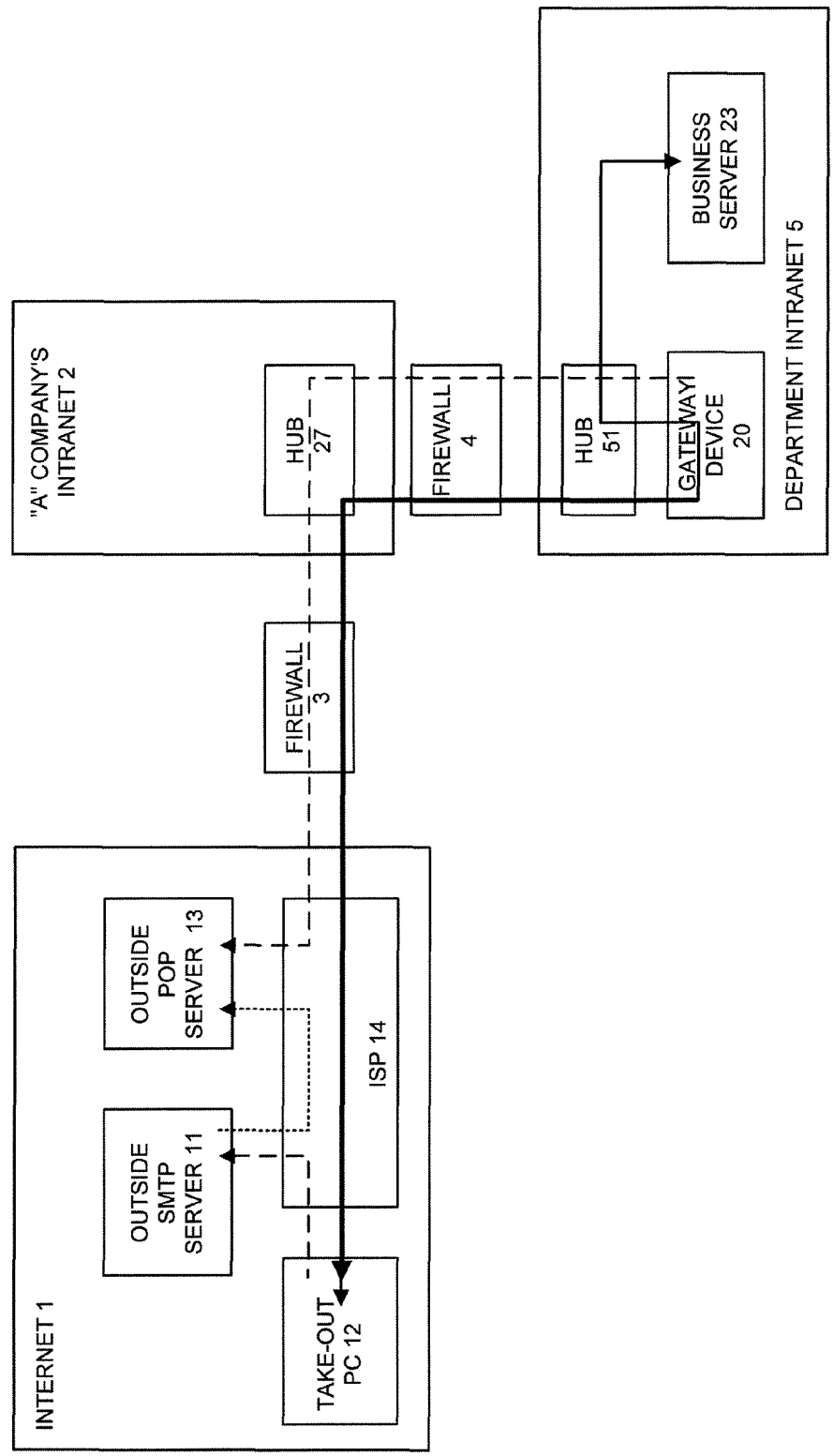
FIG. 40 is a diagram illustrating a network configuration according to a thirteenth embodiment of the present invention.

FIG. 40 is a diagram illustrating a network configuration according to the thirteenth embodiment of the present invention. The network includes the Internet 1, an intranet 2 of "A" company, a firewall 3 disposed between the Internet 1 and the intranet 2, a department intranet 5, and a firewall 4 disposed between the intranet 2 and the department intranet 5.

The department intranet 5 includes a gateway device 20, for VPN connection to the Internet side, linked via the firewall 4 and HUB 51, and a business server 23 linked via the gateway device 20 and the HUB 51.

The Internet 1 includes an outside SMTP server 11, an outside POP server 13, and a PC 12 taken out by a staff member of "A" company, which are mutually connected together via the ISP 14, respectively.

The intranet 2 connects the firewall 3 and the firewall 4 via HUB 27.

The firewall 4 restricts the communication from the intranet 2 (other than the firewall) to the department intranet 5 and protects devices in the department intranet 5 and communication security. Specifically, the firewall 4 authorizes the communication from a device (the gateway device 20, the business server 23, or the like) in the department intranet 5 to the intranet 2, except special cases. However, the firewall 4 denies the communication from the intranet 2 to the department intranet 5, except the response (return) communication from the department intranet 5.

The firewall 3 authorizes the communication from the intranet 2 (inside the firewall) to the Internet 1 (outside the firewall), except special cases. However, the firewall 4 denies the communication from the Internet 1 to the intranet 2, except the response (return) to communication from the intranet 2.

Therefore, in consideration of the operation of the firewalls 3 and 4, the communication sent from the department intranet 5 to the Internet 1 is authorized except special cases. However, the communication sent from the Internet 1 to the department intranet 5 is denied except the response (return) to communication from the department intranet 5.

The department intranet 5, which is a network managed by a department of "A" company, is linked to the internet 2 via the firewall 4. Since the department intranet 5 requires a higher confidentiality than that in the intranet 2, the security measures are doubled with the firewalls 3 and 4 to the Internet 1.

HUB 51, which is a hub within the department intranet 5, decides the destination of a frame in accordance with the MAC address and connects the gateway device 20, the business server 23, and the firewall 4, respectively.

HUB 27, which is a hub within the intranet 2, decides the destination of a frame in accordance with the MAC address and connects the firewall 3 and the department intranet 5, respectively.

ISP 14, which is an internet service provider within the Internet 1, decides the destination of a packet in accordance with the IP address and connects the PC 12, the outside SMTP server 11, and the output POP server 13, respectively.

Figure 41:
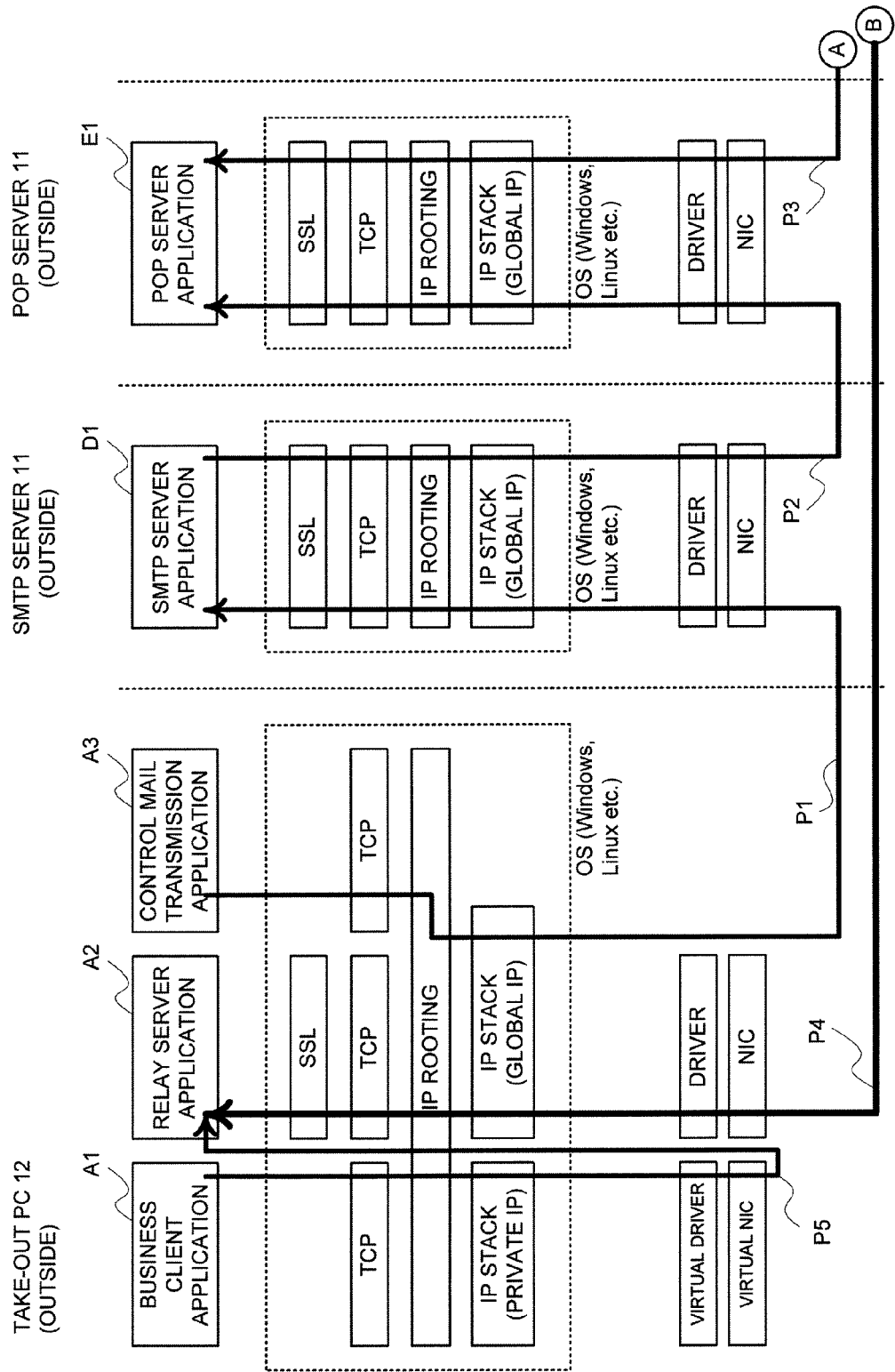
FIG. 41 is a diagram partially illustrating software installed in the thirteenth embodiment and a communication processing on a protocol.
Figure 42:
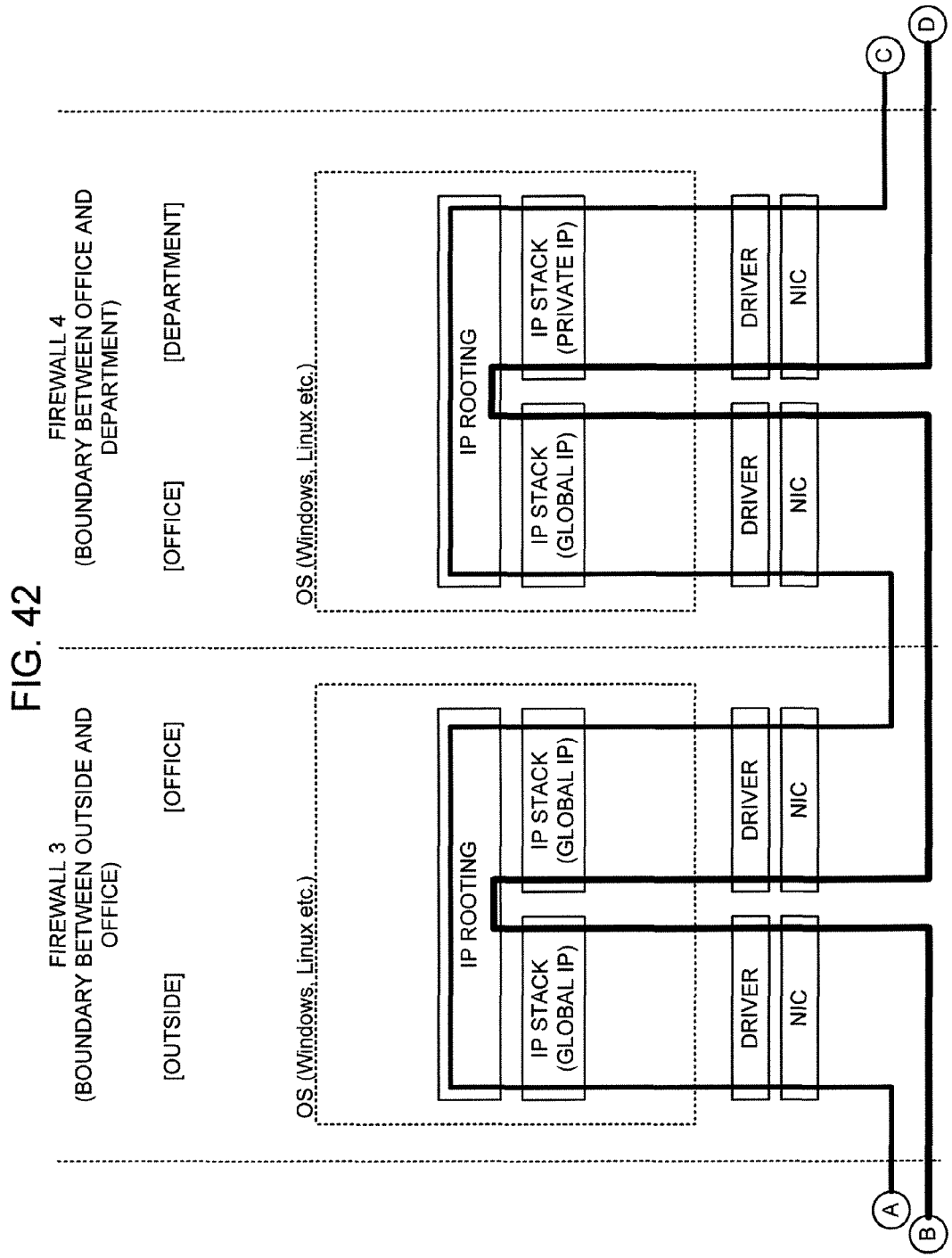
FIG. 42 is a diagram partially illustrating software installed in the thirteenth embodiment and a communication processing on a protocol.
Figure 43:
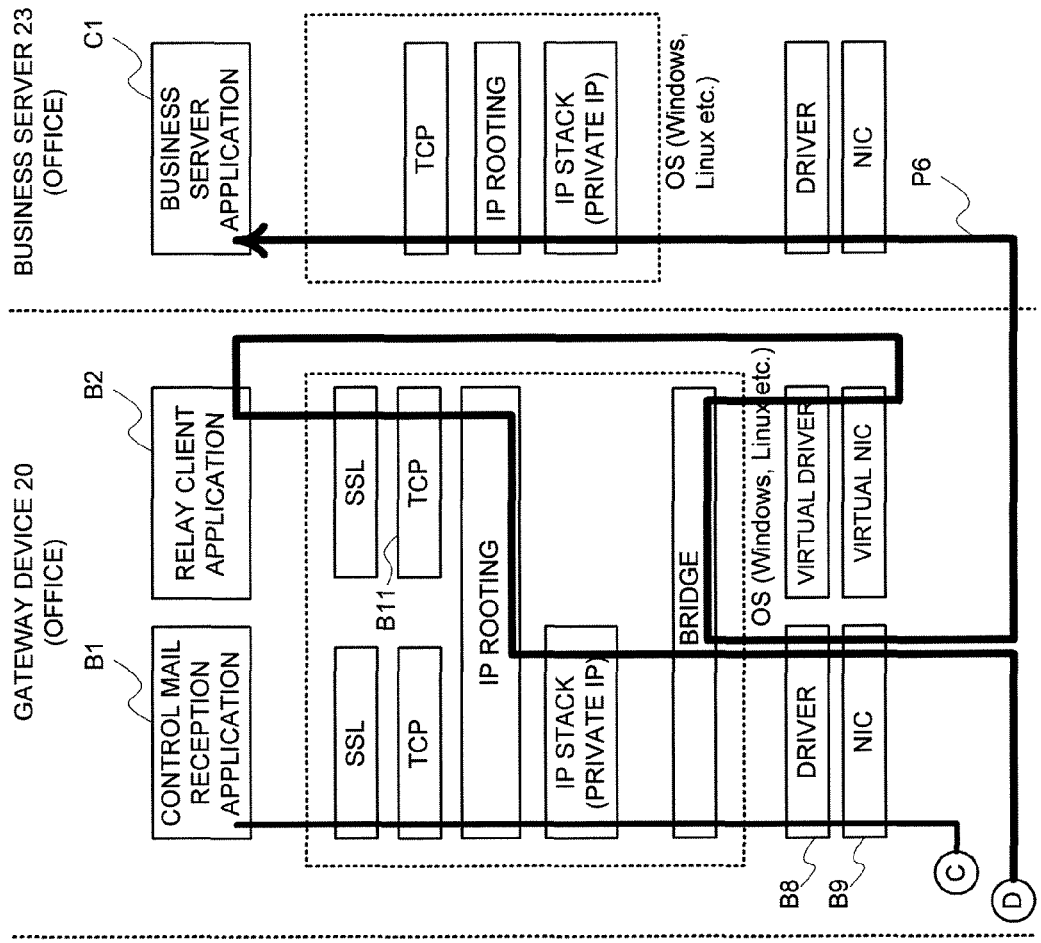
FIG. 43 is a diagram partially illustrating software installed in the thirteenth embodiment and a communication processing on a protocol.

FIGS. 41, 42 and 43 are diagrams each illustrating software installed in respective devices according to the present embodiment and the communication process on a protocol. The present embodiment resembles the fourth embodiment in FIG. 7. That is, in the present embodiment, each of the PC 12, the gateway device 20, the SMTP server 11, the POP server 13, the business server 23, and the firewall 3 includes a predetermined OS, application for realizing various functions, NIC of hardware for OS to OS communications, a software driver, a virtual driver, and a virtual NIC.

However, the present embodiment differs from the fourth embodiment in FIG. 7 in that a firewall 4 is provided between the firewall 3 and the gateway device 20. The outlines of each module in the firewall 4 and the function thereof are similar to those of the firewall 3. Outlines of each of other modules in FIGS. 41, 42 and 43 and the function thereof are similar to those in the fourth embodiment.

In FIG. 41 and FIG. 42, labels "A" are connected together and labels "B" are connected together. Similarly, in FIG. 42 and FIG. 43, labels "C" are connected together and labels "D" are connected together.

(Explanation of Operation)

Figure 44:
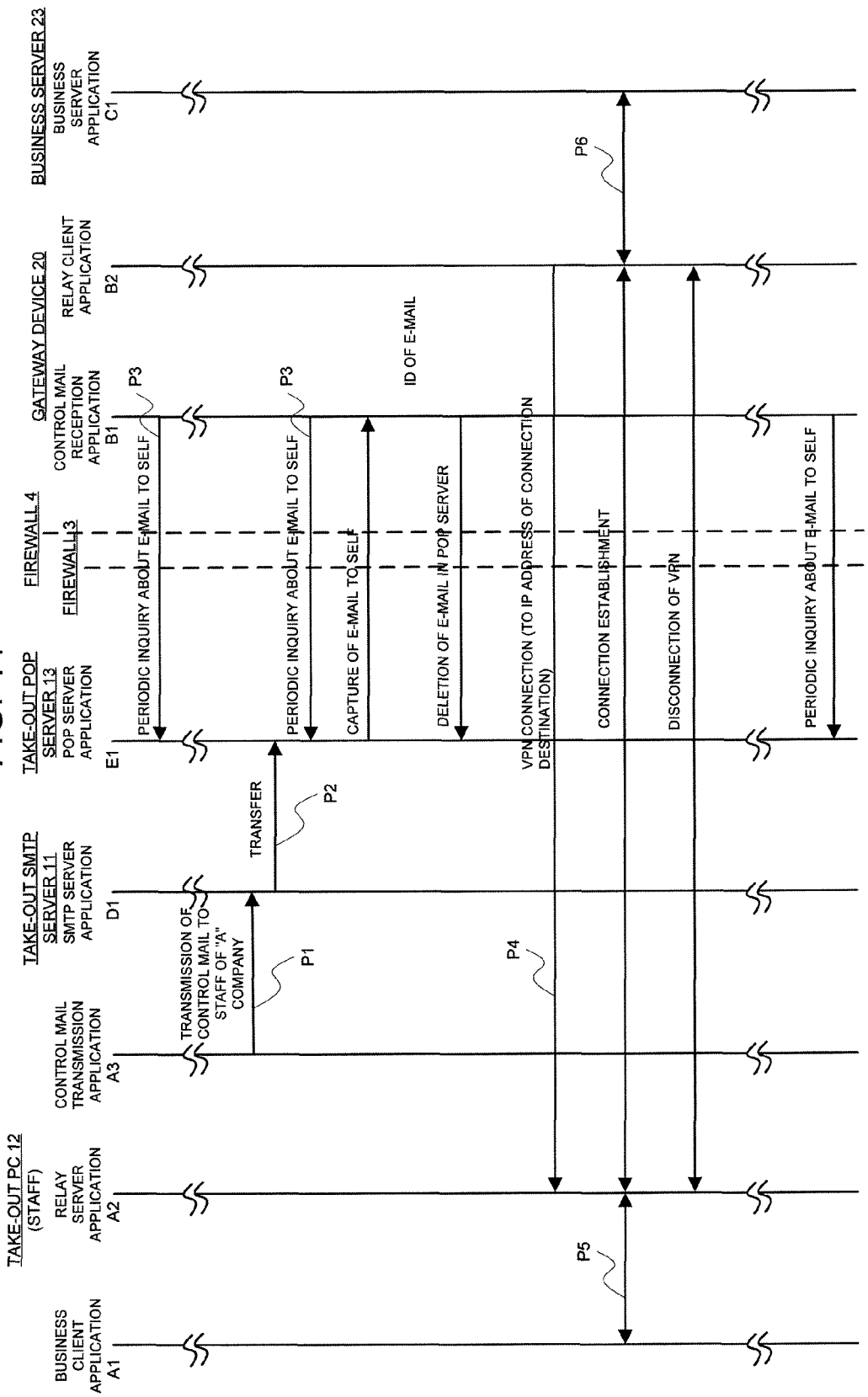
FIG. 44 is a diagram illustrating an operational procedure in the thirteenth embodiment.

FIG. 44 is a diagram showing the operational procedure of the present embodiment. The operation of the present embodiment will be described below by referring to FIG. 44.

(1) A staff member of "A" company transmits a control mail to the mail address of the staff member set to the POP server 13 via the outside SMTP server 11, using the control mail transmission application (e-mail transmission software) A3 in the PC 12. The control mail includes information for VPN connection request identification (for example, the header may include information for VPN connection request identification). Information, such as IP address of the PC 12, necessary for VPN connection from the "A" company's intranet side to the PC 12 is added to the control mail to distinguish from ordinary e-mails. The mail is first transferred to the SMTP server application D1 through the connection P1.

(2) The outside SMTP server 11 receives the control mail through the connection P1 using the SMTP server application D1, refers to the header information, and transfers the control mail to the outside POP server 13 through the connection P2. When receiving the e-mail (control mail) transmitted from the outside SMTP server, the outside POP server 13 records and stores it by mail address using the POP server application E1.

(3) The gateway device 20 regularly accesses the outside or office POP server 13 via the firewalls 4 and 3 using the control mail reception application B1, inquires through the connection P3 whether or not e-mail to self has arrived, captures the e-mail through the connection P3 when there is a received e-mail, and decides whether or not the e-mail is a control mail (when the header includes information for VPN connection request identification, the header is checked).

(4) When the e-mail to self is a control mail, the control mail reception application B1 in the gateway device 20 instructs the outside POP server 13 to delete the control mail through the connection P3. The authentication module B14 performs authentication through the connection P7 based on the ID and password in the captured control mail. When the authentication is correct, the control mail reception application B1 instructs the relay client application B2 to set the VPN connection P4 to the relay server application A2 to the IP address of the VPN connection request source (PC 12). The relay client application B2 sets the VPN connection P4 to the relay server application A2 to the IP address of the VPN connection request source (PC 12) in accordance with the instruction from the control mail reception application B1.

(5) When the VPN connection P4 is established, the relay server application A2 in the PC 12 links the connection P5 and the VPN connection P4 and establishes the communication between the business client application A1 and the business server application C1 through the connection P4.

Moreover, the relay client application B2 in the gateway device 20 links the connection P6 and the VPN connection P4 and establishes the communication between the business server application C1 of the business server 23 and the business client application A1 via the VPN connection P4. As a result, till the VPN connection P4 is cut, the communication can be established between the business application of the PC 12 and the business application of the business server 23 in the intranet.

As described above, the VPN connection between the Internet 1, or an external network, and the department intranet 5 in the intranet 2, or an office network, can be established, without changing the firewalls 3 and 4 and the setting of VPN-GW and without disposing the relay server in the outside network.

Therefore, VPN connection can be simply constructed with e-mails advantageous in communication charge even from the department intranet inside plural firewalls, without being associated with difficulties in approval procedure of each firewall administrator on the line or in installation and use of a relay server.

Fourteenth Embodiment

Next, the case where VPN connection is established between the information processing terminal and the gateway device will be explained below as the embodiment of the present invention. That is, the PC is disposed in the domestic LAN connected to the Internet via the firewall. When the firewall accepts the setting by the universal plug and play (UPnP), e-mails are utilized as access means.

The present embodiment differs from the fourth embodiment in that the domestic LAN 7 is connected to the Internet 1 via the firewall 6 and the domestic LAN 7 includes the PC 12 and HUB 71.

(Explanation of Configuration)

Figure 45:
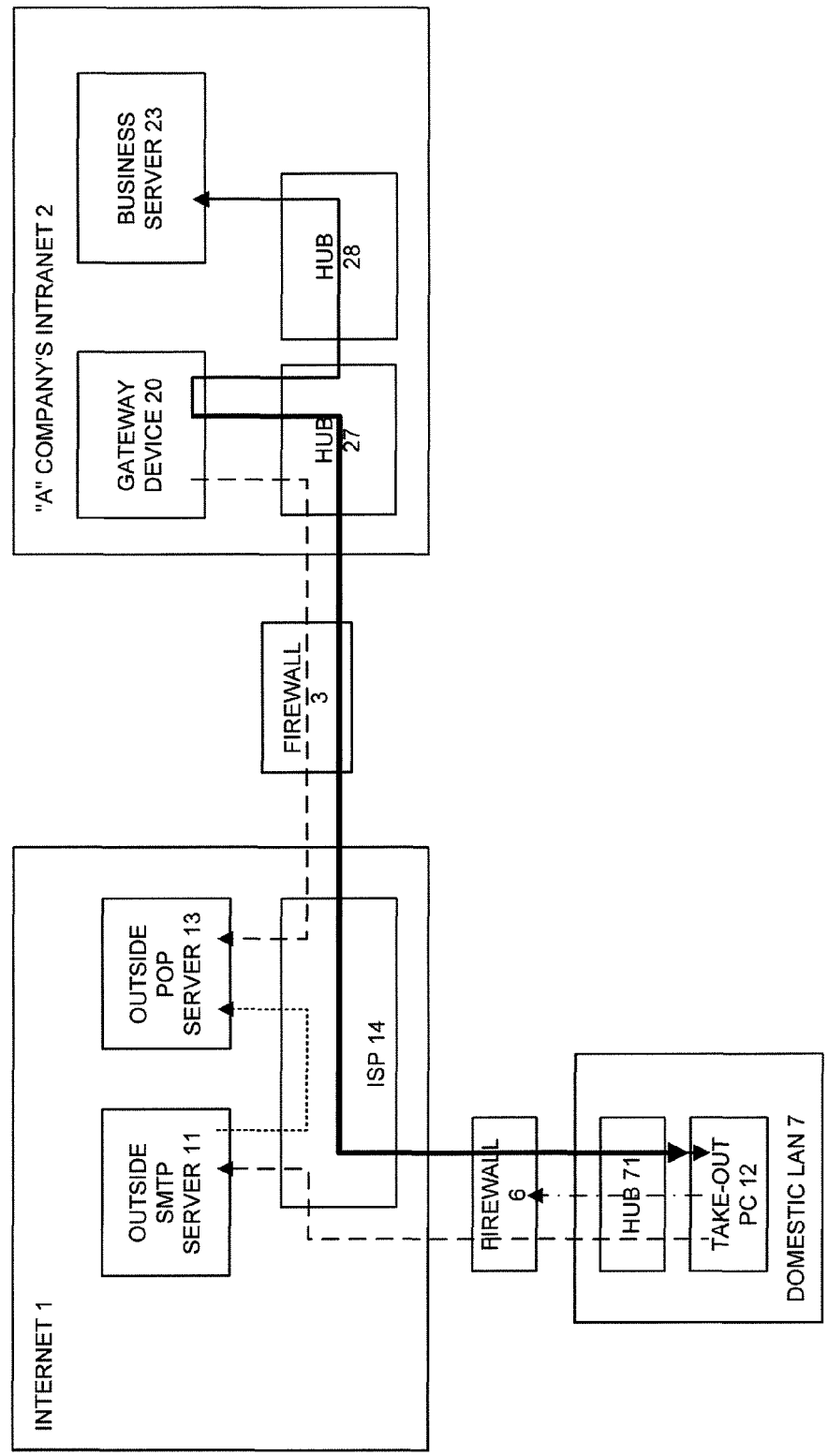
FIG. 45 is a diagram illustrating a network configuration according to a fourteenth embodiment of the present invention.

FIG. 45 is a diagram illustrating a network configuration according to the fourteenth embodiment of the present invention. The network includes the Internet 1, the intranet 2, the firewall 3 disposed between the Internet 1 and the intranet 2, and the firewall 6 disposed between the Internet 1 and the LAN 7.

The LAN 7 provides the PC 12 connected to the firewall 6 via HUB 71.

The Internet 1 includes an outside SMTP server 11 and an outside POP server 13, each being connected to the ISP 14.

The intranet 2 includes a gateway 20 and a business server 23, which are connected to the firewall 3 via HUB 27.

The firewall 6 restricts the communication from the Internet 1 (outside the firewall) to the LAN 7 (inside the firewall) to prevent devices in the LAN 7 and communication security. Specifically, the firewall 6 permits the communication established from the device (PC 12) in the LAN 7 to the Internet 1, except special cases. The firewall 6 denies the communication established from the Internet 1 to the LAN 7, except response (return) to the communication from LAN 7.

Moreover, the firewall 6 has the universal plug and play (UPnP) function to remotely control the setting of connection permission and non-permission from the device (PC 12) in the domestic LAN 7.

LAN 7, which is a network in a staff member's home or in a hotel on a business destination, is connected to the Internet 1 via the firewall 6 having the UPnP function.

HUB 71, which is a hub in LAN 7, decides the destination of a frame with the MAC address and connects the PC 12 and the firewall 6.

Figure 46:
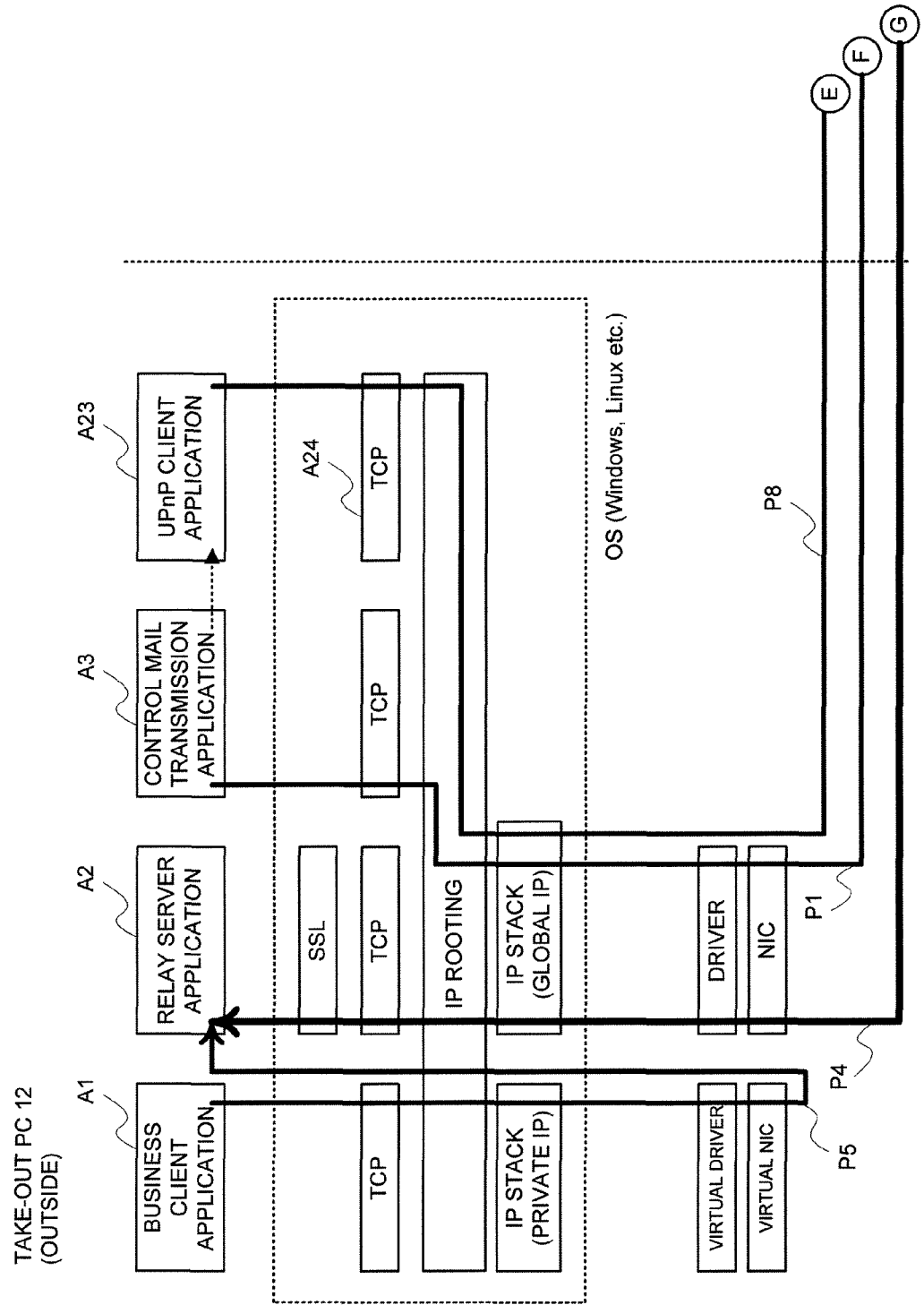
FIG. 46 is a diagram partially illustrating software installed in the fourteenth embodiment and a communication processing on a protocol.
Figure 47:
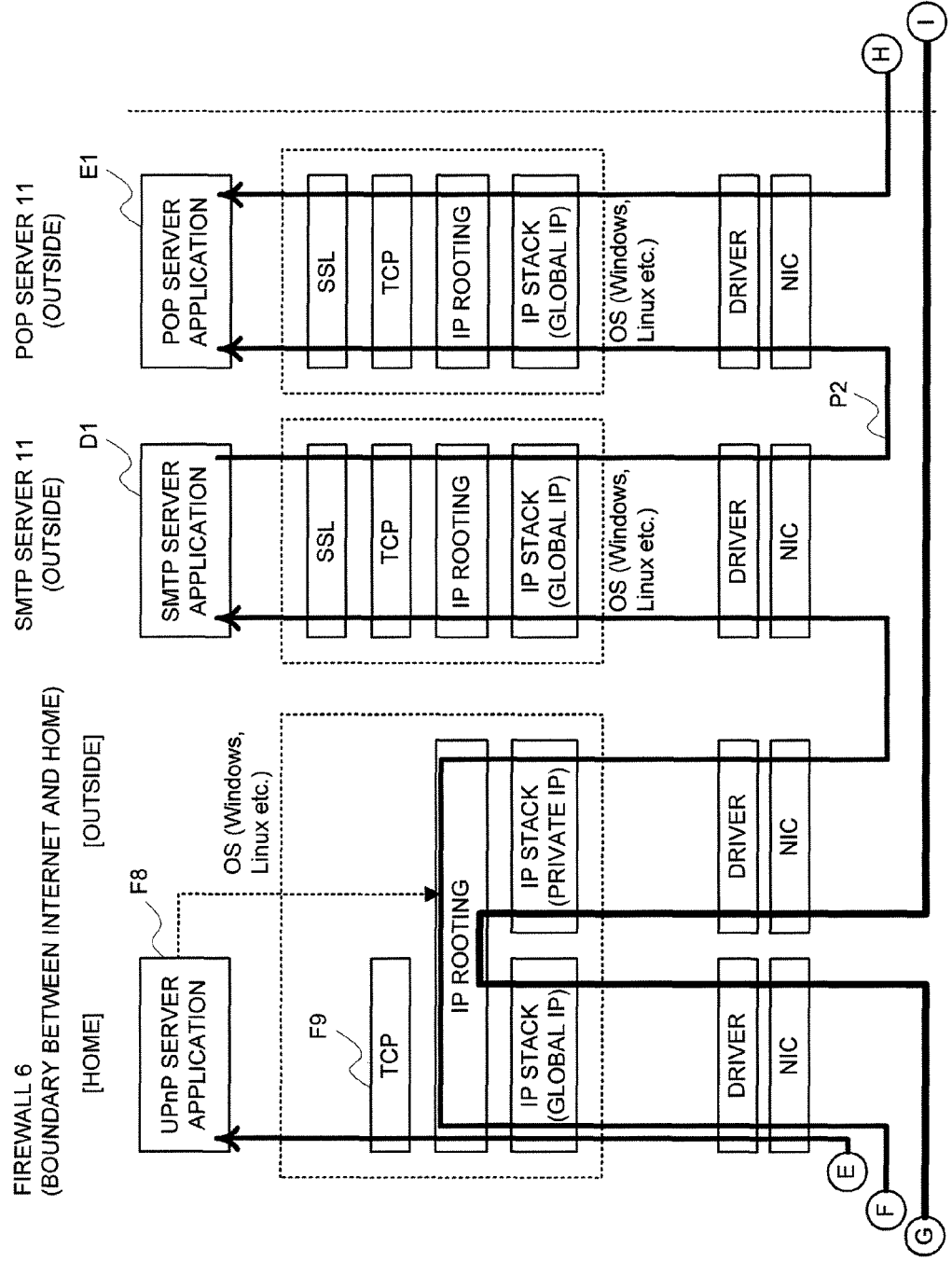
FIG. 47 is a diagram partially illustrating software installed in the fourteenth embodiment and a communication processing on a protocol.
Figure 48:
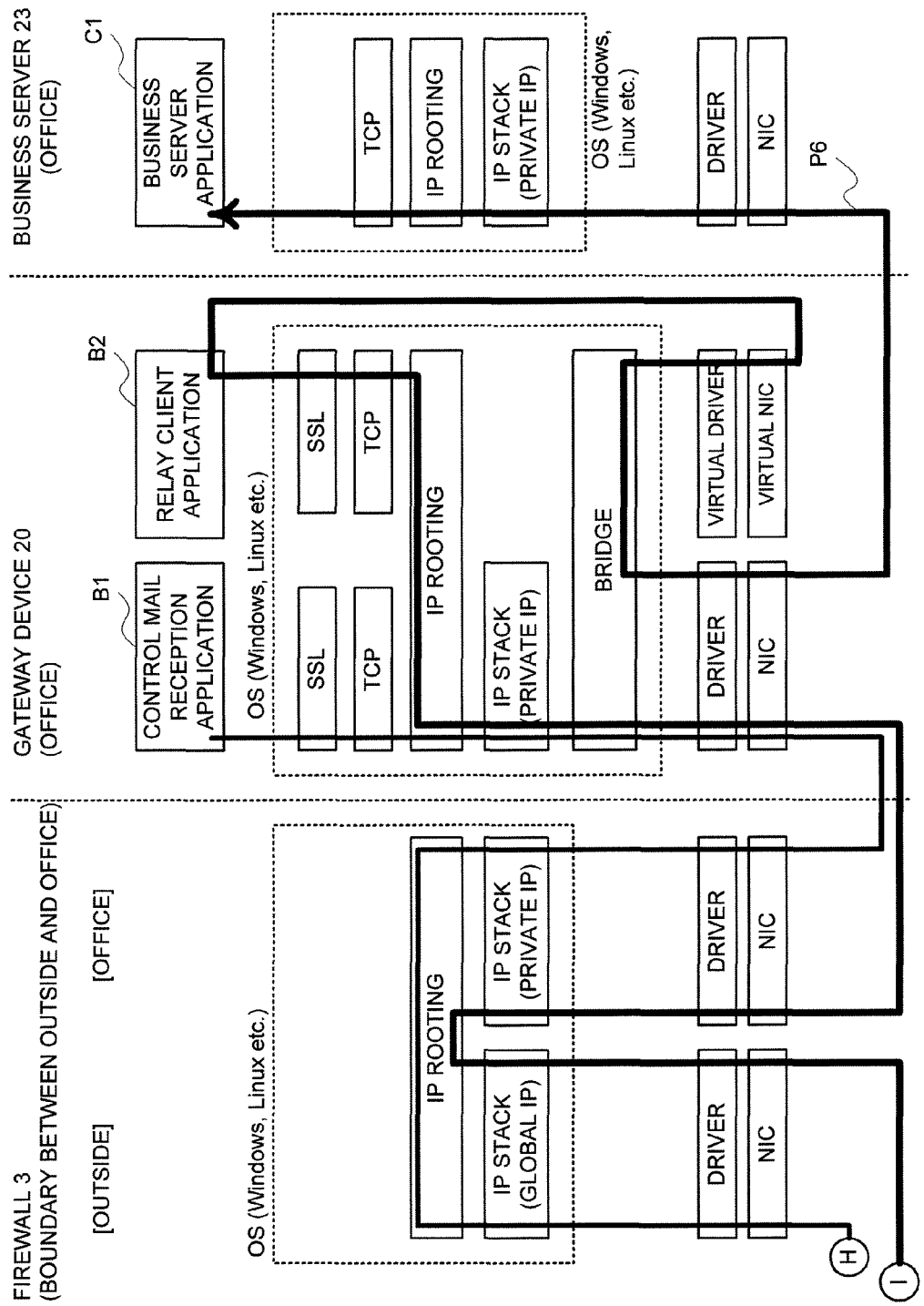
FIG. 48 is a diagram partially illustrating software installed in the fourteenth embodiment and a communication processing on a protocol.

FIG. 46, FIG. 47 and FIG. 48 are diagrams, each illustrating software installed in each device of the present embodiment and a communication process on a protocol. The present embodiment is similar to the fourth embodiment (FIG. 7). Each of the gateway device 20, the SMTP server 11, the POP server 13, the business server 23, and the firewall 3 has a predetermined OS, an application realizing various functions, NIC of hardware for OS to OS communications, a software driver, a virtual driver, and a virtual NIC.

The present embodiment differs from the fourth embodiment in FIG. 7. However, the firewall 6 is disposed between the PC 12 and the SMTP server 11. The PC 12 includes UPnP client application A23 and TCP A24, which aids the communication between the UPnP client application A23.

In FIGS. 46 and 47, labels "E" are connected together, labels "F" are connected together, and labels "G" are connected together. In FIGS. 47 and 48, labels "H" are connected together and labels "I" are connected together.

Each module in the firewall 6 and the function thereof are basically similar to those in the firewall 3. The firewall 6 differs from the firewall 3 in that the firewall 6 includes UPnP server application F8 and TCP F9, which aids the communication of the UPnP server application F8.

The connection P8 is established between the UPnP client application A23 and the UPnP server application F8. TCP relays the connection P8 between the UPnP client application A23 and the UPnP server application F8. Once the connection P8 is completed, the bi-directional communication is available till the connection is disconnected.

Other modules shown in FIGS. 46, 47, and 48 and the functions thereof are similar to those the fourth embodiment.

(Explanation of Operation)

Figure 49:
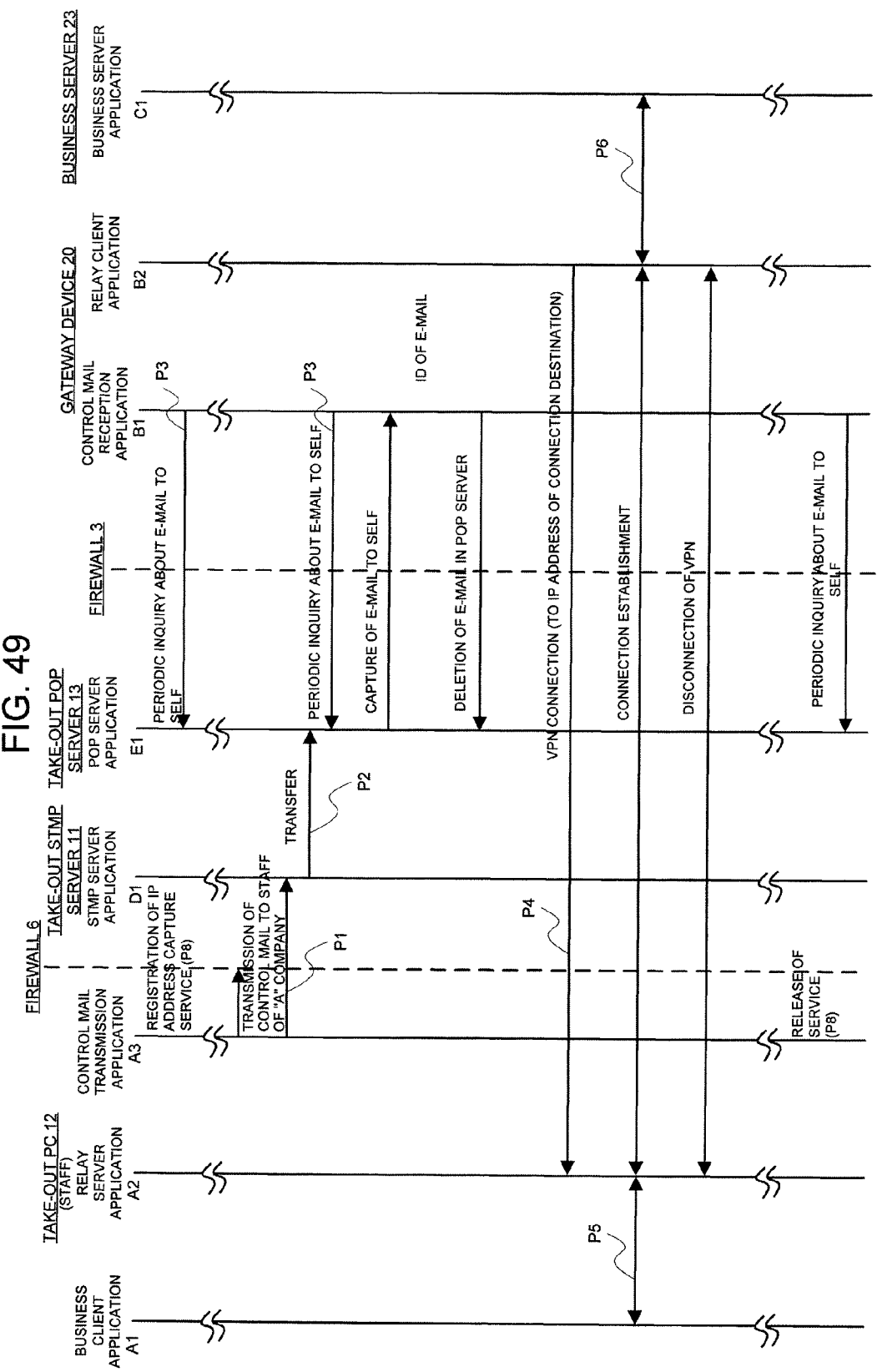
FIG. 49 is a diagram illustrating an operational procedure in the fourteenth embodiment.

FIG. 49 is a diagram illustrating the procedure of the present embodiment. The operation of the present embodiment will be explained below by referring to FIG. 49.

(1) A staff member of "A" company instructs the control mail transmission application (e-mail transmission software) A3 in the PC 12 to start VPN connection. By doing so, the control mail transmission application A3 performs a notification request of the IP address (global IP address) on the Internet side 1 of the firewall 6 and a service registration request to the firewall 6 (a setting request that the firewall 6 exceptionally permits the VPN connection P4 from the Internet side 1 to the domestic LAN 7), to the UPnP client application A23. The UPnP client application A23 connects to the UPnP server application F8 in the firewall 6 through the connection P8. Moreover, the UPnP client application A23 performs a notification request of the IP address (global IP address) of the Internet side 1 and a service registration request to the firewall 6 (a setting request that the firewall 6 exceptionally permits the VPN connection P4 from the Internet side 1 to the domestic LAN 7). Thus, the UPnP client application A23 notifies the control mail transmission application (e-mail transmission software) A3 of the IP address of the Internet side 1 of the firewall 6, captured with the notification request of the IP address (global IP address). The control mail transmission application (e-mail transmission software) A3 transmits a control mail to the mail address of the staff member set in the POP server 13 via the outside SMTP server 11. The control mail includes information about VPN connection request identification (for example, the header may include information about VPN connection request identification). Thus, the control mail can be distinguished from ordinary e-mails. Information necessary for VPN connection between the intranet and the PC 12, such as the IP address (global IP address) of the Internet side 1 of the firewall 6 notified from the UPnP client application A23, is added to the control mail. The mail is first transferred to the SMTP server application D1 through the connection P1.

(2) The outside SMTP server 11 receives the control mail through the connection P1 using the SMTP server application D1, refers to the header information, and transfers the control mail to the outside POP server 13 through the connection P2. When receiving an e-mail (control mail) transmitted from the outside SMTP server, the outside POP server 13 records and stores the e-mail (control mail) by mail address using the POP server application E1.

(3) The gateway device 20 regularly accesses the outside or office POP server 13 via the firewall 4 or 3 using the control mail reception application B1, inquires through the connection P3 whether or not the e-mail to self has received, captures the e-mail through the connection P3 when the e-mail has received, and decides whether or not the e-mail is a control mail (when the header includes information about VPN connection request identification, only the header is checked).

(4) When the e-mail to self is a control mail, the control mail reception application B1 in the gateway device 20 instructs the outside POP server 13 to delete the control mail through the connection P3. The authentication module B14 performs authentication through the connection P7 based on the ID and password in the captured control mail. When authentication is correct, the control mail reception application B1 instructs the relay client application B2 to set the VPN connection P4 to the relay server application A2 to the IP address of the VPN connection request source (PC 12). The relay client application B2 sets the VPN connection P4 to the relay server application A2 to the IP address of the VPN connection request source (PC 12) in accordance with the instruction from the control mail reception application B1.

(5) When the VPN connection P4 is established, the relay server application A2 in the PC 12 relays the connection P5 and the VPN connection P4, and establishes the communication between the business client application A1 and the business server application C1 through the connection P4. The relay client application B2 in the gateway device 20 relays the connection P6 and the VPN connection P4 and establishes the communication between the business server application C1 of the business server 23 and the business client application A1 through the VPN connection P4. As a result, the PC 12 can establish the communication between the business application of the PC 12 and the business application of the business server 23 in the intranet till the VPN connection P4 is disconnected.

(6) When a staff member of "A" company instructs the control mail transmission application (e-mail transmission software) A3 of the PC 12 to cut the VPN connection, the control mail transmission application A3 instructs the relay server application A2 to cut the VPN connection P4. Then, the control mail transmission application A3 issues a service release request from the firewall 6 to the UPnP client application A23 (a deletion request that the firewall 6 exceptionally permits the VPN connection P4 from the Internet 1 to the domestic LAN 7). The UPnP client application A23 connects the UPnP server application F8 in the firewall 6 through the connection P8 and issues the service release request to the firewall 6 (performs a deletion request that the firewall 6 exceptionally permits the VPN connection P4 established from the Internet 1 to the domestic LAN 7).

As described above, the VPN connection can be established between the domestic LAN 7, being an outside network, and the intranet 2 of "A" company, without manually changing the setting of the firewall 3 or 6 or without disposing the relay server in the outside network.

Fifteenth Embodiment

Next, the case where VPN connection is established between the information processing terminal and the gateway device will be explained in the embodiment. In this case, HUB 28 is added to the intranet 2. The HUB 28 is connected to NIC additionally mounted in the gateway device 20. When the business server 23 is connected to the HUB 28, e-mails are used as access means.

The present embodiment differs from the fourth embodiment. However, (1) the control mail transmission application A2 in the PC 12 adds VLAN subscription information to the control mail at the time of VPN connection request. (2) When transferring the frame received through the connection P4 to the connection P6, the relay client application B2 in the gateway device 20 adds a VLAN tag based on the VLAN subscription information in the control mail. (3) The relay client application B2 in the gateway device 20 deletes the VLAN tag from the flame with the VLAN tag received through the connection P6 and transfers it to the connection P6.

(Explanation of Configuration)

Figure 50:
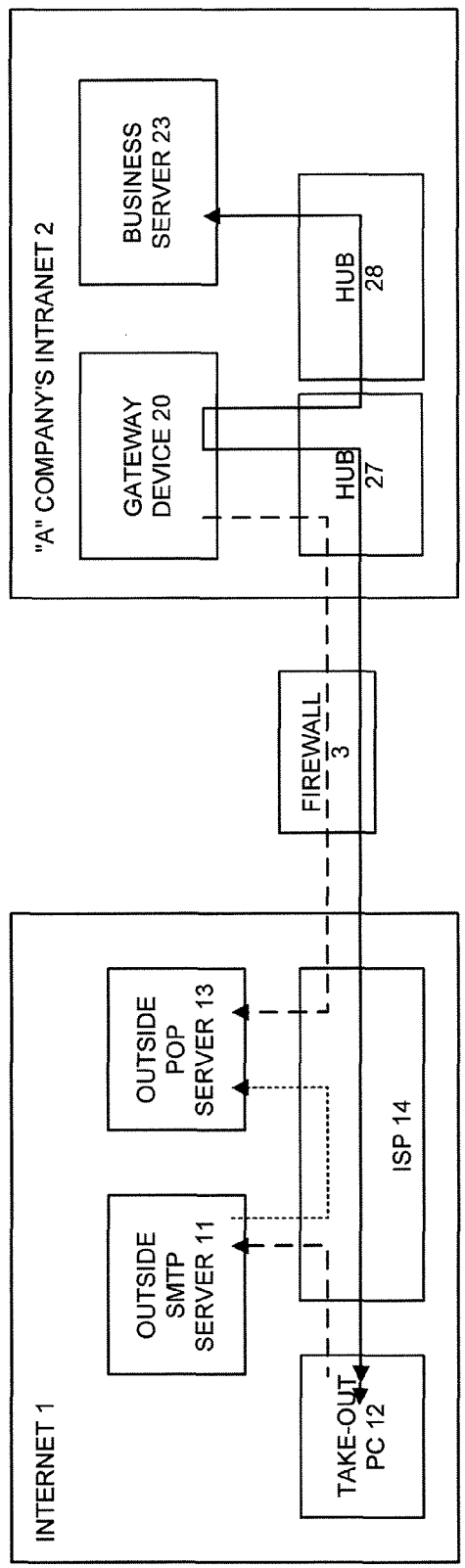
FIG. 50 is a diagram illustrating a network configuration according to a fifteenth embodiment of the present invention.

FIG. 50 is a diagram illustrating a network configuration according to the fifteenth embodiment of the present invention. The present embodiment in FIG. 50 differs from the fourth embodiment in FIG. 6. However, HUB 28 is added in the intranet of "A" company 2. The HUB 28 is connected to NIC additionally installed in the gateway device 20. The business server 23 is connected to the HUB 28.

HUB 28, which is a hub in the intranet 2, decides a frame destination based on the MAC address and connects the gateway device 20 with the business server 23.

Figure 51:
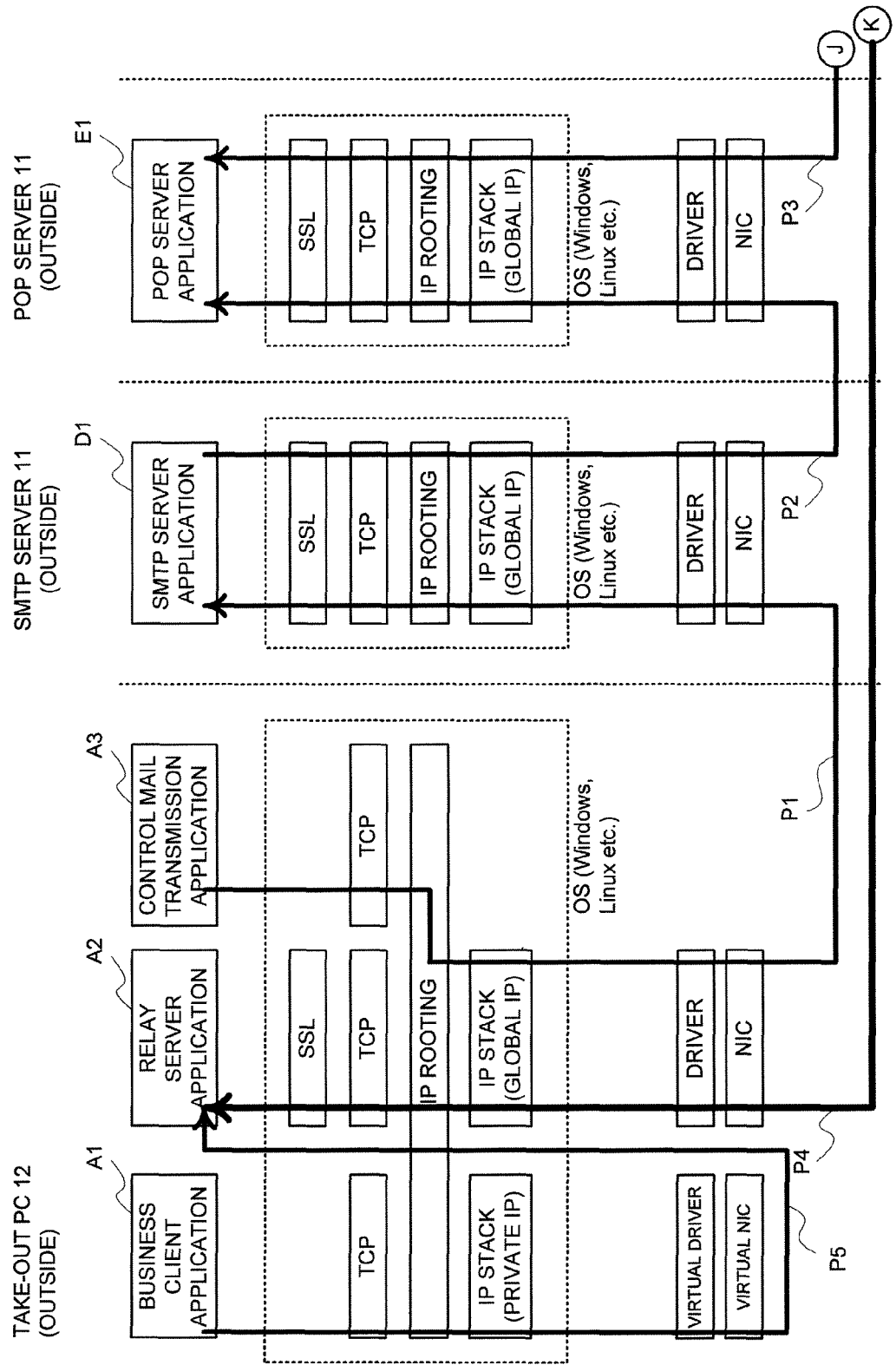
FIG. 51 is a diagram partially illustrating software installed in the fifteenth embodiment and a communication processing on a protocol.
Figure 52:
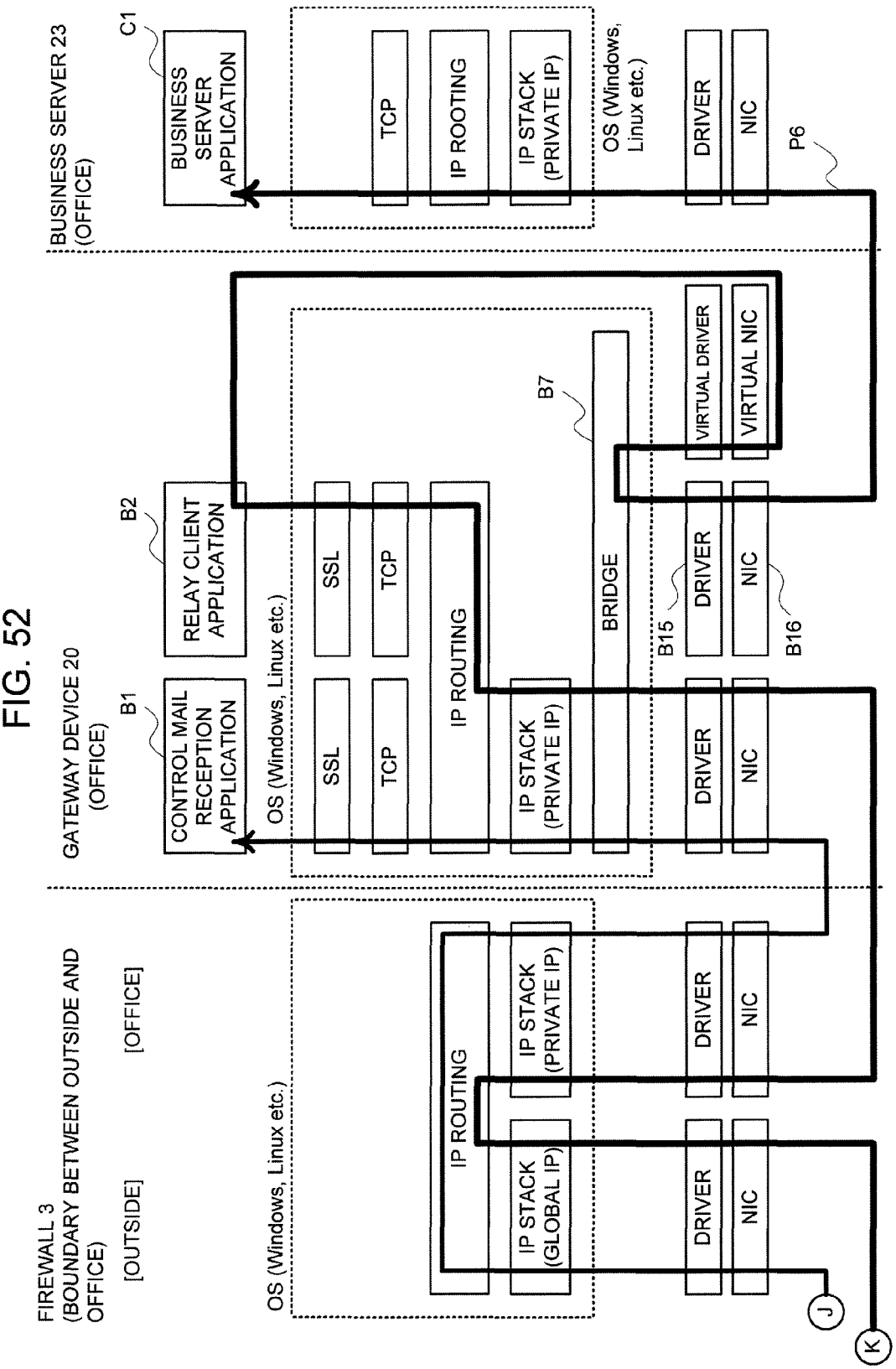
FIG. 52 is a diagram partially illustrating software installed in the fifteenth embodiment and a communication processing on a protocol.

FIG. 51 and FIG. 52 are diagrams, each illustrating software installed in each device according to the fifteenth embodiment of the present invention and the communication process on a protocol. The present embodiment differs from the fourth embodiment in FIG. 7 in that the gateway device 20 includes the driver B15 and NIC B16.

In FIGS. 51 and 52, labels "J" are connected together and labels "K" are connected together.

The driver B15 resembles the driver B8.

The NIC B16 resembles the NIC B9.

The bridge B7 has the learning function of a MAC address that records every VLAN whether or not a terminal with a MAC address is connected to which NIC. The bridge B7 decides the destination of a frame destination arrived from the driver B8, B12, or B15, or the IP stack B6, using both the MAC address and a VLAN tag, and transfers it to any one of the driver B8, B12, and B15, and the IP stack B6. If necessary, the bridge may copy and broadcast the input frame.

(Explanation of Operation)

The operational procedure of the present embodiment is similar to the fourth embodiment in FIG. 8. However, both the embodiments differ from each other in the details, for example, in that the control mail includes VLAN information. The operation of the embodiment will be explained below by referring to FIG. 8.

In the bridge B7 in the gateway device, it is assumed that the drivers B8, B12 and the IP stack B6 are previously registered to the default VLAN (VLAN 1) with no tag and the drivers B12 and B15 are registered at VLAN 2 with a VLAN tag.

(1) A staff member of "A" company instructs the control mail transmission application (e-mail transmission software) A3 of the PC 12 to start the VPN connection to VLAN 2. By doing so, the control mail transmission application (e-mail transmission software) A3 transmits a control mail to the e-mail address of the staff member set in the POP server 13 via the outside SMTP server 11. The control mail includes information about VPN connection request identification (for example, the header may include the information about VPN connection request identification). The control mail can be distinguished from ordinary e-mails. Information, such as the IP address of the PC 12 and VLAN of a desired connection destination (herein referred to as VLAN 2), necessary for VPN connection from the intranet side to the PC 12 is added to the control mail. This mail is first transferred to the SMTP server application D1 through the connection P1.

(2) The outside SMTP server 11 receives the control mail through the connection P1 using the SMTP server application D1, refers to the header information and transfers the control mail to the outside POP server 13 through the connection P2. When receiving an e-mail (control mail) transmitted from the outside SMTP server, the outside POP server 13 records and stores the e-mail (control mail) by mail address using the POP server application E1.

(3) The gateway device 20 regularly accesses the outside or office POP server 13 via the firewall 3 using the control mail reception application B1, inquires whether or not an e-mail to self has received through the connection P3, captures it when the e-mail has arrived, and decides whether or not the e-mail is a control mail. (When the header includes information about VPN connection request identification, only the header is checked.)

(4) When the e-mail is a control mail, the control mail reception application B1 in the gateway device 20 instructs the outside POP server 13 to delete the control mail. The authentication module B14 performs authentication through the connection P7 based on the ID and password in the captured control mail. When authentication is correct, the control mail reception application B1 instructs the relay client application B2 to set VPN connection P4 to the relay server application A2 to the IP address of the VPN connection request source (the PC 12). The relay client application B2 sets the VPN connection P4 to the relay server application A2 to the IP address of the VPN connection request source (PC 12) in accordance with the instruction from the control mail reception application B1.

(5) When the VPN connection P4 is established, the relay server application A2 in the PC 12 relays the connection P5 and the VPN connection P4 and establishes the communication between the business client application A1 and the business server application C1 through the connection P4. The relay client application B2 in the gateway device 20 relays the connection P6 and the VPN connection P4 and establishes the communication between the business server application C1 of the business server 23 and the business client application A1 through the VPN connection P4. The relay client application B2 in the gateway device 20 adds a VLAN tag of the VLAN 2 based on the VLAN subscription information in the control mail when transferring the frame received through the connection P4 to the virtual NIC B13. When the frame with the VLAN tag of the VLAN 2 is received from the virtual NIC B13, the relay client application B2 deletes the VLAN tag and transfers only the frame to the connection P6.

As described above, adding the VLAN information in the control mail allows VLAN of the VPN connection destination to be selected.

Other Embodiment

In the fourth to ninth embodiments (FIGS. 6 to 28), addition or various modification of the configuration can be performed, regarding the control format of a control mail, the handling of a control mail received by the mail server, and notification to the originating source of connection results of VPN or IP connection based on a control mail.

For example, the authentication VLAN which utilizes e-mails can be realized by inserting connection destination VLAN information or authentication information as connection destination information from the PC into a control mail enabling the VPN connection compatible with plural VLANs. Moreover, the configuration can be realized such that information about global IP address, desired connection VLAN or the like can be inserted into the control mail and the control mail is controllably connected to any one of plural VLANs.

For example, the system may be constructed such that the VPN connection request is issued to the gateway device. That is, by issuing a connection request to the PC by a user, the PC may write a connection request title in a control mail and may write control characters in the headline (subject) of an e-mail and may write control characters in a meta-extended tag (X-VPN), which is a header extended zone of an e-mail.

Moreover, the system may be constructed such that when the format of a control mail, on which control characters are written, is used, only the mail, on which the control characters are written, of mails stored in the mail server are captured or deleted from the mail server.

The gateway device may be constructed such that the gateway device controls VPN connection or IP connection to the IP address specified by the control mail based on reception of the control mail, recognizes the communication status such as success or failure in establishment of VPN connection or IP connection, and notifies another mail address, such as i-mode of a portable telephone, related to the control mail transmission source of the communication status.

In the tenth embodiment (FIG. 29), caller IDs and touch tones have been utilized as the form of control information when VPN connection or IP connection requests are issued from the PC to the gateway device side, using the telephone line, fixed-line hone, or portable telephone such as PHS. However, the system may be constructed such that the format of information transmitted between the PC and the gateway device is previously registered and authentication and IP address for VPN or IP connection are captured using an arbitrary information format. For example, the tenth embodiment may utilize the facsimile function performed via a telephone line between the PC and the gateway device and may utilize bar codes to transmit control information with a FAX document. Moreover, the tenth embodiment may utilize to control transmission of similar information or VPN connection or IP connection by transmitting and receiving image data or audio data for control. The above-mentioned features are applicable even in communication systems for VPN or IP connection utilizing the radio line.

In the configuration of the above-mentioned embodiments, serial number information is added to a request for VPN connection or IP connection of a control mail. The gateway device transmits the serial number to the PC of a connection request source at the time of VPN connection or IP connection. Thus, the PC is constructed to detect a match with the transmitted serial number for VPN or IP connection request to check whether or not the VPN connection or IP connection is established in normal state.

As described above, VPN connection and VPN connection for IP telephones have been explained as embodiments of the present invention. However, it should be noted that the present invention is not only to the above mentioned connections. The present invention may be applicable to establishment of TCP connection as well as various types of connection methods, communication systems, communication devices, and programs.

The invention claimed is:

1. A method for connecting between an information processing terminal on an external network via a first firewall, the first firewall being external to the information processing device and included in the external network, and a gateway device and a business server on an internal network, the gateway device being connected to the external network via a second firewall, and the business server being connected to the external network via the gateway device, comprising:
the information processing terminal capturing an IP address from the first firewall by UPnP;
the information processing terminal transmitting a control e-mail to a mail server, the control e-mail including the captured IP address and requesting a connection between the information processing terminal and the business server through the gateway device; and
the gateway device acquiring the control e-mail from the mail server via the second firewall and establishing a VPN connection from the business server to the to the first firewall based on the captured IP address included in the control e-mail to connect the information processing terminal and the business server via the first and second firewalls.

2. The method of claim 1, wherein the mail server automatically identifies the control e-mail and forwards the control e-mail to the gateway device.

3. The method of claim 1, wherein the internal network is a VLAN and wherein the control e-mail includes VLAN information identifying the location of the business server on the VLAN.

4. The connection method defined in claim 3, wherein the control e-mail-includes an IP address captured by UPnP and information processing terminal performs a service registration to a firewall.

5. The connection method defined in claim 3, wherein the gateway device inserts or deletes a tag of VLAN described in the control e-mail.

6. The method of claim 3, wherein the mail server automatically identifies the control e-mail and forwards the control e-mail to the gateway device.

7. A communication system, comprising:
an information processing terminal on an external network connected to a private internal network via a public network;
a first firewall on the external network disposed between the information processing terminal and the public network;
a business server on a virtual local area network (VLAN) of a private internal network;
a gateway device on the private internal network connecting the business server to the external network via a second firewall;
the information processing terminal programmed to:
capture an IP address from the first firewall using UPnP,
transmit a control e-mail to a mail server, the control e-mail including the captured IP address and requesting a connection between the information processing terminal and the business server and including VLAN information identifying the location of the business server on the VLAN; and
the gateway device being programmed to:
acquire the control e-mail from the mail server via the second firewall, and
establish a VPN connection between the information processing terminal and the business server to the first firewall via the second firewall based on the captured IP address and the VLAN information contained in the control e-mail to connect the business server to the information processing terminal.

8. The communication system defined in claim 7, wherein the control e-mail includes an IP address captured by UPnP and information processing terminal performs a service registration to a firewall.

9. The communication system defined in claim 7, wherein the gateway device inserts or deletes a tag of VLAN described in the control e-mail.

10. The system of claim 7, wherein the mail server automatically identifies the control e-mail and forwards the control e-mail to the gateway device.

11. A gateway device for a private internal network containing a business server, a virtual local area network (VLAN) on which the business server is located and a second firewall for connecting the business server to an external network connected to the private internal network via public network, the external network including an information processing terminal and a first firewall connecting the information processing terminal to the public network, the gateway device being programmed to:
acquire a control e-mail sent by the information processing terminal to a mail server, the control e-mail requesting a connection between the information processing terminal and the business server and including VLAN information identifying the location of the business server on the VLAN and an IP address captured by the information processing terminal from the first firewall via UPnP; and
acquire the control e-mail from the mail server via the second firewall, and
establish a VPN connection between the information processing terminal and the business server to the first firewall via the second firewall based on the captured IP address and the VLAN information contained in the control e-mail to connect the business server to the information processing terminal.

12. The gateway of claim 11, wherein the control e-mail includes an IP address captured by UPnP and the information processing terminal performs a service registration to a firewall.

13. The gateway of claim 11, wherein the gateway device inserts or deletes a tag of VLAN described in the control e-mail.

14. A gateway device according to claim 11, wherein the gateway device is programmed to check with the e-mail server to see if it has received a control e-mail and, if so, authenticating the received control e-mail.

15. A gateway device according to claim 11, wherein the gateway device is programmed to:
act as a mail server;
decide whether or not the e-mail is a control email every time the mail server receives an e-mail; and
if a control e-mail has been received, authenticating the control e-mail.

* * * * *